US012679621B2

(12) United States Patent
Corrigan et al.

(10) Patent No.: US 12,679,621 B2
(45) Date of Patent: Jul. 14, 2026

(54) SINGLE SLIT PATTERNED, TENSION-ACTIVATED, EXPANDING ARTICLES

(71) Applicant: 3M INNOVATIVE PROPERTIES COMPANY, St. Paul, MN (US)

(72) Inventors: Thomas R. Corrigan, St. Paul, MN (US); Patrick R. Fleming, Lake Elmo, MN (US); Anne C.F. Gold, South St. Paul, MN (US); Silvia G. Guttmann, St. Paul, MN (US); Nicholas K. Lee, Minneapolis, MN (US); Dylan T. Cosgrove, Oakdale, MN (US); Delony L. Langer-Anderson, Hugo, MN (US); Lisa M. Miller, Spring Valley, WI (US); Manoj Nirmal, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 385 days.

(21) Appl. No.: 17/785,971

(22) PCT Filed: Dec. 16, 2020

(86) PCT No.: PCT/IB2020/062048
§ 371 (c)(1),
(2) Date: Jun. 16, 2022

(87) PCT Pub. No.: WO2021/130612
PCT Pub. Date: Jul. 1, 2021

(65) Prior Publication Data

US 2023/0022987 A1 Jan. 26, 2023

Related U.S. Application Data

(60) Provisional application No. 62/952,789, filed on Dec. 23, 2019.

(51) Int. Cl.
*B65D 81/03* (2006.01)
*B31D 3/02* (2006.01)
(Continued)

(52) U.S. Cl.
CPC ........... *B65D 81/03* (2013.01); *B31D 5/0065* (2013.01); *B65B 11/004* (2013.01); *B65D 81/05* (2013.01);
(Continued)

(58) Field of Classification Search
CPC .......... B65D 81/03; B31D 5/0065; B32B 5/04
See application file for complete search history.

(56) References Cited

U.S. PATENT DOCUMENTS 3,018,205 A 1/1962 Barut
3,655,501 A * 4/1972 Tesch ...................... B32B 27/00 428/137
(Continued)

FOREIGN PATENT DOCUMENTS

CN 107902257 A 4/2018
DE 3432705 A1 3/1986
(Continued)

OTHER PUBLICATIONS

Krishnamurti, Descriptive Geometry Chapter 7: Method of Revolution (Rotation) p. 197-198. https://www.andrew.cmu.edu/user/ramesh/teaching/course/48-175/lectures/7.MethodOfRevolution.pdf Accessed May 28, 2025 (Year: 2025).*
(Continued)

*Primary Examiner* — Frank J Vineis

(57) ABSTRACT

The present disclosure relates generally to tension-activated, expanding articles that include single slit patterns. In some embodiments, these articles are used as cushioning films
(Continued)

and/or packaging materials. The present disclosure also relates to methods of making and using these tension-activated, expanding articles.

20 Claims, 48 Drawing Sheets

(51) Int. Cl.

| | |
|---|---|
| ***B31D 5/00*** | (2017.01) |
| ***B65B 11/00*** | (2006.01) |
| ***B65B 55/20*** | (2006.01) |
| ***B65D 81/05*** | (2006.01) |

(52) U.S. Cl.

CPC .......... *B31D 3/0207* (2013.01); *B31D 3/0292* (2013.01); *B31D 2205/0058* (2013.01); *B65B 55/20* (2013.01)

(56) References Cited

U.S. PATENT DOCUMENTS

| | | | | |
|---|---|---|---|---|
| 3,762,629 | A | 10/1973 | Bruno | |
| 3,951,730 | A | 4/1976 | Wennberg et al. | |
| 3,958,751 | A | 5/1976 | Bruno | |
| 3,992,162 | A | 11/1976 | Gewiss | |
| 4,105,724 | A | 8/1978 | Talbot | |
| 4,516,891 | A | 5/1985 | Wnuk et al. | |
| 4,596,541 | A * | 6/1986 | Ward, Sr. | B31F 1/10 83/881 |
| 5,334,276 | A | 8/1994 | Meier | |
| 5,389,059 | A | 2/1995 | Corwin | |
| 5,431,980 | A | 7/1995 | McCarthy | |
| 5,667,871 | A | 9/1997 | Goodrich et al. | |
| 5,688,578 | A | 11/1997 | Goodrich | |
| 6,183,836 | B1 | 2/2001 | Pflug | |
| 6,372,322 | B1 | 4/2002 | Devaguptapu | |
| 6,726,974 | B1 | 4/2004 | Pflug et al. | |
| 6,832,461 | B2 | 12/2004 | Crye et al. | |
| 6,929,843 | B2 | 8/2005 | Kuchar | |
| 7,541,085 | B2 | 6/2009 | Burdon | |
| 7,850,896 | B2 | 12/2010 | Endres et al. | |
| 8,302,733 | B2 | 11/2012 | Peiffer et al. | |
| 8,613,993 | B2 | 12/2013 | Kuchar | |
| 9,005,096 | B2 | 4/2015 | Kling | |
| 9,533,809 | B2 | 1/2017 | Kuchar et al. | |
| 9,550,336 | B2 | 1/2017 | Bradford | |
| 9,932,162 | B2 | 4/2018 | Stack, Jr. | |
| 10,226,907 | B2 | 3/2019 | Goodrich | |
| D948,223 | S | 4/2022 | Gold et al. | |
| 2005/0089675 | A1 | 4/2005 | Christiansen | |
| 2010/0330330 | A1* | 12/2010 | Luca | B29C 44/5654 428/137 |
| 2016/0067938 | A1 | 3/2016 | Goodrich | |
| 2016/0136877 | A1 | 5/2016 | Rogers et al. | |
| 2017/0182723 | A1 | 6/2017 | Calisch et al. | |
| 2019/0187345 | A1 | 6/2019 | Gold et al. | |
| 2021/0031996 | A1* | 2/2021 | Goodrich | D21H 27/30 |
| 2022/0009690 | A1 | 1/2022 | Nirmal et al. | |

FOREIGN PATENT DOCUMENTS

| | | | |
|---|---|---|---|
| DE | 19601172 | A1 | 1/1997 |
| DE | 19606195 | A1 | 9/1998 |
| DE | 19716637 | A1 | 10/1998 |
| EP | 0222534 | B1 | 9/1991 |
| EP | 0686089 | B1 | 12/1995 |
| EP | 0531251 | B1 | 4/1996 |
| EP | 0465719 | B1 | 2/1997 |
| EP | 0768948 | B1 | 10/1998 |
| EP | 0839088 | B1 | 11/1999 |
| EP | 1123199 | B1 | 9/2002 |
| EP | 1426173 | A2 | 6/2004 |
| EP | 1662064 | A1 | 5/2006 |
| EP | 1807229 | A1 | 7/2007 |
| EP | 1995052 | A1 | 11/2008 |
| EP | 2069131 | A1 | 6/2009 |
| EP | 2091725 | A1 | 8/2009 |
| EP | 1824667 | B1 | 7/2010 |
| EP | 1917138 | B1 | 7/2010 |
| EP | 2281942 | A1 | 2/2011 |
| EP | 1704044 | B1 | 3/2011 |
| EP | 1807616 | B1 | 5/2015 |
| EP | 3178642 | A1 | 6/2017 |
| EP | 3221155 | A1 | 9/2017 |
| EP | 2376277 | B1 | 11/2017 |
| EP | 2774753 | B1 | 12/2017 |
| EP | 2292839 | B1 | 1/2018 |
| EP | 3041756 | B1 | 2/2020 |
| EP | 2882546 | B1 | 4/2020 |
| EP | 2047043 | B1 | 5/2021 |
| JP | 0450647 | B2 | 8/1992 |
| JP | 2003285875 | A | 10/2003 |
| JP | 4347709 | B2 | 10/2009 |
| JP | 5133587 | B2 | 1/2013 |
| WO | 2015035335 | A1 | 3/2015 |
| WO | 2014170650 | A2 | 4/2015 |
| WO | 2017160022 | A1 | 9/2017 |
| WO | 2018045316 | A1 | 3/2018 |
| WO | 2018191012 | A1 | 10/2018 |
| WO | 2019043621 | A1 | 3/2019 |
| WO | 2021130613 | A1 | 7/2021 |
| WO | 2021130616 | A1 | 7/2021 |
| ZA | 955630 | B | 2/1996 |

OTHER PUBLICATIONS

Farber, "Consumers Are Now Doing Most of their Shopping Online", Fortune Media IP Limited, [available in internet on Jun. 8, 2016] URL: <https://fortune.com/2016/06/08/online-shopping-increases/>, 9 pages.

International Preliminary Report on Patentability Ch II for PCT Application No. PCT/IB2020/062048, mailed on Mar. 16, 2022, 9 pages.

International Search Report for PCT Application No. PCT/IB2020/062048, mailed on Mar. 17, 2021, 5 pages.

McNicoll, "For Every Amazon Package it Delivers, The Postal Service Loses $1.46", [available on internet on Sep. 1, 2017], URL:<https://www.washingtonexaminer.com/for-every-amazon-package-it-delivers-the-postal-service-loses-146>, 3 pages.

* cited by examiner

SINGLE SLIT PATTERNED, TENSION-ACTIVATED, EXPANDING ARTICLES

CROSS REFERENCE TO RELATED APPLICATIONS

This application is a national stage filing under 35 U.S.C. 371 of PCT/IB2020/062048, filed 16 Dec. 2020, which claims the benefit of U.S. Provisional Application No. 62/952,789, filed 23 Dec. 2019, the disclosures of which are incorporated by reference in their entireties herein.

TECHNICAL FIELD

The present disclosure relates generally to tension-activated, expanding articles that include single slit patterns. In some embodiments, these articles are used as cushioning films and/or packaging materials. The present disclosure also relates to methods of making and using these tension-activated, expanding articles.

BACKGROUND

In 2016, consumers bought more products online than in stores. (*Consumers Are Now Doing Most of their Shopping Online*, Fortune Magazine, Jun. 8, 2016). Specifically, consumers made 51% of their purchases online and 49% in brick-and-mortar stores. Id. One result of this change in consumer behavior is the growing number of packages mailed and delivered each day. Over 13.4 billion packages are delivered to homes and businesses around the world each year (about 5.2 billion by the United States Postal Service, about 3.3 billion by Fed Ex, and about 4.9 billion by UPS). While delivery of non-package mail is decreasing annually, package delivery is growing at a rate of about 8% annually. This growth has resulted in 25% of the U.S. Postal Service's business being package delivery. (Washington Examiner, *"For every Amazon package it delivers, the Postal Service loses* $1.46," Sep. 1, 2017). Amazon ships about 3 million packages a day, and Alibaba ships about 12 million packages a day.

It is not just businesses shipping packages. The growing Maker culture creates opportunities for individuals to ship their handmade products around the world through websites like Etsy™. Further, the increased focus on sustainability causes many consumers to resell used products on sites like eBay™ rather than throwing them into landfills. For example, over 25 million people sell goods on eBay™, and over 171 million people buy these goods.

Individuals and businesses shipping these goods often ship them in shipping containers, typically boxes, including the product to be shipped, cushioning, and air. Boxes have many advantages, including, for example, the box can stand upright, it is lightweight, stored flat, is recyclable, and is relatively low cost. However, boxes come in standard sizes that often do not match the size of the item being shipped, so the user must fill the box with a large amount of filler or cushioning material to try to protect the item being shipped from jostling around in a box that is too large and becoming damaged.

Package cushioning materials protect items during shipment. The effects of vibration and impact shock during shipment and loading/unloading are mitigated by the cushioning materials to reduce the chance of product damage. Cushioning materials are often placed inside the shipping container where they absorb energy by, for example, buckling and deforming, and/or by dampening vibration or transmitting the shock and vibration to the cushioning material rather than to the item being shipped. In other instances, packaging materials are also used for functions other than cushioning, such as to immobilize the item to be shipped in the box and fix it in place. Alternatively, packaging materials are also used to fill a void such as, for example, when a box that is significantly larger than the item to be shipped is used.

Some exemplary packaging materials include plastic Bubble Wrap™, bubble film, cushion wrap, air pillows, shredded paper, crinkle paper, shredded aspen, vermiculite, cradles, and corrugated bubble film. Many of these packaging materials are not recyclable.

One example packaging material is shown in FIGS. 1A-1D. Film 100 is made of a paper sheet including pattern of a plurality of cuts or slits 110 that is often referred to as a "skip slit pattern," a type of single slit pattern. When film 100 is tension-activated (pulled along the tension axis (T), which is substantially perpendicular to cuts or slits 110), a plurality of beams 130 are formed. Beams 130 are regions between adjacent coaxial rows of slits. The beams 130 formed by slits 110 collectively experience some degree of upward and downward movement (see, for example, FIGS. 1B and 1D). This upward and downward movement results in the two-dimensional article (a substantially flat sheet) of FIG. 1C becoming the three-dimensional article of FIGS. 1A, 1B and 1D when tension-activated. When this film is used as packaging material, the three-dimensional structure provides some degree of cushioning as compared to a two-dimensional, flat structure.

The cut or slit pattern of film 100 is shown in FIG. 1C and is described in U.S. Pat. No. 4,105,724 (Talbot) and U.S. Pat. No. 5,667,871 (Goodrich et al.). The pattern includes a plurality of substantially parallel rows 112 of multiple individual linear slits 110. Each of the individual linear slits 110 in a given row 112 is out of phase with the individual linear slits 110 in the directly adjacent and substantially parallel row 112. In the specific construction of FIGS. 1A-1C, the adjacent rows 112 are out of phase by one half of the vertical (relative to FIG. 1C) spacing. The pattern forms an array of slits 110 and rows 112, and the array has a regular, repeating pattern across the array. Between directly adjacent rows 112 of slits 110 are formed beams 130 of material.

FIG. 2A shows the cut or slit pattern of film 100 of FIG. 1C rotated 90°. Each linear slit 110 has a length (L) that extends between a first terminal end 114 and a second terminal end 116. Each linear slit 110 also has a midpoint 118 that is halfway between the first and second terminal ends 114, 116. Midpoint 118 is shown by a dot on some slits 110 of FIG. 2A. The midpoints 118 of parallel and aligned slits 110 substantially align with one another. In other words, the midpoint 118 of an individual linear slit 110 substantially aligns with the midpoint 118 of an individual linear slit 110 on a directly adjacent beam 130 along the tension axis (T). Such slits 110 are not in directly adjacent slit rows 112; instead, they are on alternating rows 112. Further, the midpoint 118 of an individual slit 110 is between the terminal ends 114, 116 of the directly adjacent slits or cuts 110 along the tension axis (T). The distance between the center of two directly adjacent slits 110 in a row 112 of slits 110 is identified as the transverse spacing (H), which is the horizontal spacing relative to FIG. 2A. The thickness of beam 130 or distance between two adjacent rows 112 of adjacent linear slits 110 is identified as the axial spacing (V), which is the vertical spacing relative to FIG. 2A.

More specifically, in the embodiment of FIG. 2A, midpoint 118A of slit 110A aligns axially (in the vertical direction relative to the figure) with midpoint 118B of slit 110B, meaning that the midpoints 118A, 118B align with an axis that extends in the axial direction. Slit 110B is on the beam 130B directly adjacent to beam 130A on which slit 110E lies. Also, midpoint 118A of slit 110A is between terminal end 114C of slit 110C and terminal end 116D of slit 110D. Slits 110C and 110D are directly adjacent to slit 110B axially. FIG. 2A also shows the transverse pitch (H) between transversely adjacent midpoints 118, the axial pitch (V) or beam 130 height, the slit length (L), and the tension axis (T) along which tension can be provided to cause upward and downward movement of beams 130.

FIG. 2B shows the primary tension lines (e.g., the lines approximating the highest tensile stress path) formed when an article including the slit pattern of FIG. 2A is deployed with tension along the tension axis T. FIG. 2B shows in dotted lines the primary tension lines 140, which are where the greatest tensile stress will occur. Tension lines are imaginary paths through the material that carry the greatest load when tension is applied to the material along the tension axis T. When tension is applied along tension axis T, the primary tension lines 140 move more closely into alignment with the applied tension axis, causing the material or sheet into which the pattern has been formed to distort. When single slit patterns are deployed, the activation of tension along the primary tension lines 140 causes substantially all regions of the pattern to experience some tension or compression (tensile stress or compressing stress) and then buckle and bend out of the plane of the original two-dimensional film. In some embodiments, when the film is fully deployed and/or tension is applied to the desired extent, substantially no regions exist in the film that remain parallel to the original plane of the sheet.

Another exemplary single slit pattern was disclosed in U.S. Pat. No. 8,613,993 (Kuchar) and is shown in FIG. 3. In this single slit pattern 300, slits 310 bend in the center to form a shape called a "tilde."

SUMMARY

The inventors of the present disclosure invented novel single slit patterns. These single slit patterns can be used to form tension-activated, expanding articles. In some embodiments, the articles can be used for shipping and packaging applications. However, the articles and patterns can also be used for a plethora of other uses or applications. So, the present disclosure is not meant to be limited to shipping or packaging material applications, which are merely one exemplary use or application.

Some embodiments relate to an expanding material, comprising: a material including a plurality of slits that form a single slit pattern; each slit including a first terminal end and a second terminal end; wherein an imaginary straight line connects the first and second terminal ends of each of the slits in the plurality of the slits in a row and wherein the imaginary straight lines relating to a row of slits are all colinear with one another but not with a region of each of the slits between the terminal ends.

Some embodiments relate to an expanding material, comprising: a material including a plurality of slits that form a single slit pattern; wherein the material is substantially planar in an pretensioned form but wherein the single slit pattern enables at least portions of the material to rotate 90 degrees or greater from the plane of the material in its pretensioned form when tension is applied along the tension axis.

Some embodiments relate to an expanding material, comprising: a material including a plurality of slits that form a single slit pattern; each slit including a first terminal end and a second terminal end; wherein at least one of the first or second terminal ends are curved.

Some embodiments relate to an expanding material, comprising: a material including a plurality of slits that form a single slit pattern; each slit including a first terminal end and a second terminal end; wherein each of the slits in the plurality of slits includes three or more extrema.

Some embodiments relate to an expanding material, comprising: a material including a plurality of slits that form a single slit pattern; wherein each slit includes an interlocking feature comprising at least one of hook, loop, sine-wave, square-wave, triangle-wave, or other similar features.

Some embodiments relate to an expanding material, comprising: a material including a plurality of slits that form a single slit pattern; wherein each of the slits in the plurality of the slits includes one or more multibeams.

In some of these embodiments, the material includes at least one of paper, corrugated paper, plastic, an elastic material, an inelastic material, polyester, acrylic, polysulfone, thermoset, thermoplastic, biodegradable polymers, woven material, non-woven material, and combinations thereof. In some embodiments, the material is paper and the thickness is between about 0.003 inch (0.076 mm) and about 0.010 inch (0.25 mm). In some embodiments, the material is plastic and the thickness is between about 0.005 inch (0.13 mm) and about 0.125 inch (3.2 mm). In some embodiments, the material passes the interlocking test described herein. In some embodiments, the slits are generally perpendicular to the tension axis. In some embodiments, the slits have a slit shape that is at least one of semi-circle, u-shaped, v-shaped, concave, convex, curved, linear, or a combination thereof. In some embodiments, the slits in the plurality of slits are offset from one another in adjacent rows by 75% or less of the transverse length of the slit. In some embodiments, the slits have a slit shape and slit orientation and wherein the slit shape and/or orientation varies within a row of slits. In some embodiments, the slits have a slit shape and slit orientation and wherein the slit shape and/or orientation varies in adjacent rows. In some embodiments, the material has a thickness between about 0.001 inch (0.025 mm) and about 5 inches (127 mm). In some embodiments, the slit pattern extends through one or more of the edges of the material. In some embodiments, each slit in the plurality of slits has a slit length and a first group of slits in the plurality of slits each have a slit length that differs from the slit length of a second group of slits in the plurality of slits. In some embodiments, each slit in the plurality of slits has a slit length that is between about 0.25 inch (6.35 mm) and about 3 inches (76.2 mm). In some embodiments, each slit in the plurality of slits has a slit length and the material has a material thickness, and wherein the ratio of slit length to material thickness is between about 50 and about 1000. In some embodiments, at least a portion of the slit passes through an imaginary straight line connecting the first and second terminal ends.

Some embodiments relate to a die capable of forming any of the slit patterns described herein.

Some embodiments relate to a packaging material formed of any of the expanding materials described herein.

Some embodiments relate to a method of making any of the expanding materials described herein, comprising: forming the single slit pattern in the material by at least one of by extrusion, molding, laser cutting, water jetting, machining, stereolithography or other 3D printing techniques, laser ablation, photolithography, chemical etching, rotary die cutting, stamping, other suitable negative or positive processing techniques, or combinations thereof. In some such embodiments, the method further involves applying tension to the expanding material along a tension axis to cause the material to expand. In some embodiments, the application of tension causes one or more of (1) the slits to form openings and/or (2) the material adjacent to the slits to form flaps. In some embodiments, the tension is applied by hand or with a machine. In some embodiments, applying tension to the expanding material along the tension axis causes the material to change from a two-dimensional structure to a three-dimensional structure. In some embodiments, when exposed to tension along the tension axis, at least one of (1) the terminal ends of the slits in the expanding material are drawn toward one another transversely, causing a flap of the expanding material to move or buckle upward relative to the plane of the material in its pretensioned state and/or (2) portions of beams of the expanding material move or buckle downward relative to the plane of the material in its pretensioned state forming an opening portion. In some embodiments, the flaps have a flap shape that is at least one of scale-shaped, curved, rectangular, pointed, cusp-shaped, or combinations thereof.

Some embodiments further relate to wrapping any of the expanded materials described herein around an item. In some embodiments, the expanded material is wrapped around the item at least two fully wraps such that at least one of the flaps, openings, and/or interlocking features on the first layer or wrap interlock with at least one of the flaps, openings, and/or interlocking features on the second layer or wrap.

BRIEF DESCRIPTION OF DRAWINGS

The disclosure may be more completely understood in consideration of the following detailed description of various embodiments of the disclosure in connection with the accompanying drawings.

DETAILED DESCRIPTION

In the following detailed description, reference may be made to the accompanying set of drawings that form a part hereof and in which are shown by way of illustration several specific embodiments. It is to be understood that other embodiments are contemplated and may be made without departing from the scope or spirit of the present disclosure.

Various embodiments of the present disclosure relate to single slit patterns and to articles including single slit patterns. A "slit" is defined herein as a narrow cut through the article forming at least one line, which may be straight or curved, having at least two terminal ends. Slits described herein are discrete, meaning that individuals slits do not intersect other slits. A slit is generally not a cut-out, where a "cut-out" is defined as a surface area of the sheet that is removed from the sheet when a slit intersects itself. However, in practice, many forming techniques result in the removal of some surface area of the sheet that is not considered a "cut-out" for the purposes of the present application. In particular, many cutting technologies produce a "kerf", or a cut having some physical width. For example, a laser cutter will ablate some surface area of the sheet to create the slit, a router will cut away some surface area of the material to create the slit, and even crush cutting creates some deformation on the edges of the material that forms a physical gap across the surface area of the material. Furthermore, molding techniques require material between opposing faces of the slit, creating a gap or kerf at the slit. In various embodiments, the gap or kerf of the slit will be less than or equal to the thickness of the material. For example, a slit pattern cut into paper that is 0.007" (0.18 mm) thick might have slits with a gap that is approximately 0.007" (0.18 mm) or less. However, it is understood that the width of the slit could be increased to a factor that is many times larger than the thickness of the material and be consistent with the technology disclosed herein.

As used herein, the term "single slit pattern" refers to individual slits that form individual rows each extending across the sheet transversely, where the rows form a repeating pattern of individual rows along the axial length of the sheet, and the pattern of slits in each row is different than the pattern of slits in the directly adjacent rows. For example, the slits in one row may be axially offset or out of phase with the slits in the directly adjacent rows. In some embodiments, the slit, flap, and/or folding wall shapes described herein amplify the out-of-plane motion of the materials or articles as compared to the prior art slit shapes of FIGS. 1C and 2A.

Figure 1A:
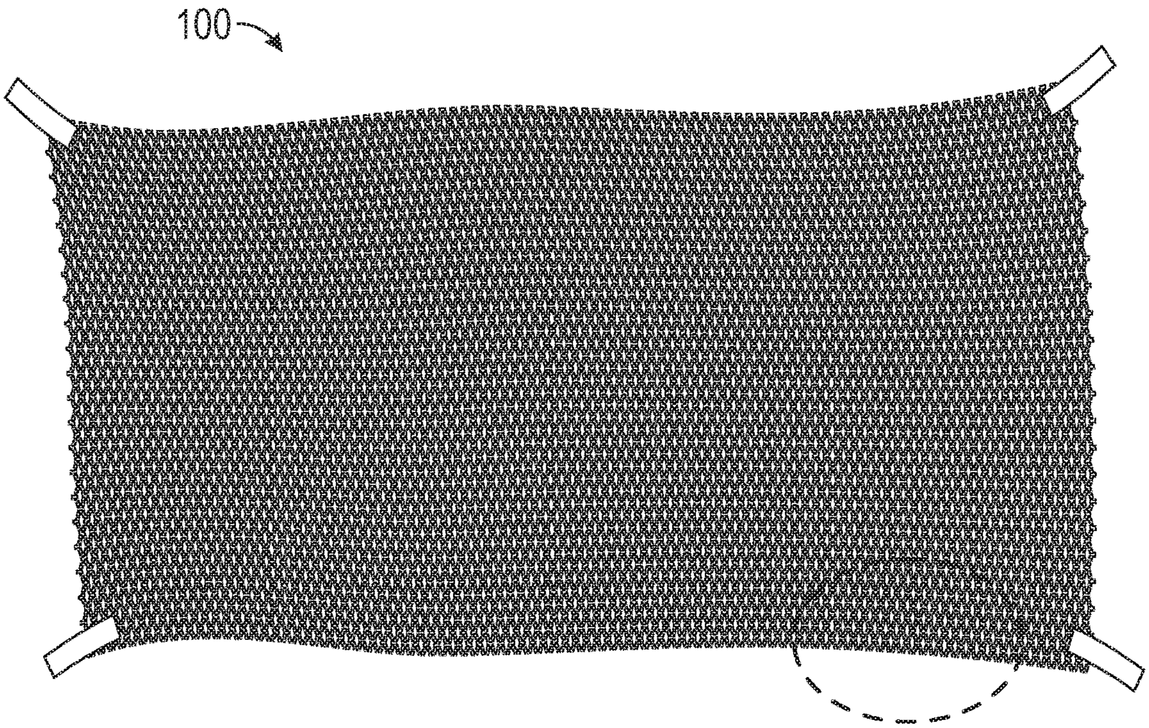
FIG. 1A (Prior Art)
FIG. 1A is top view of an exemplary prior art packaging material.
Figure 1B:
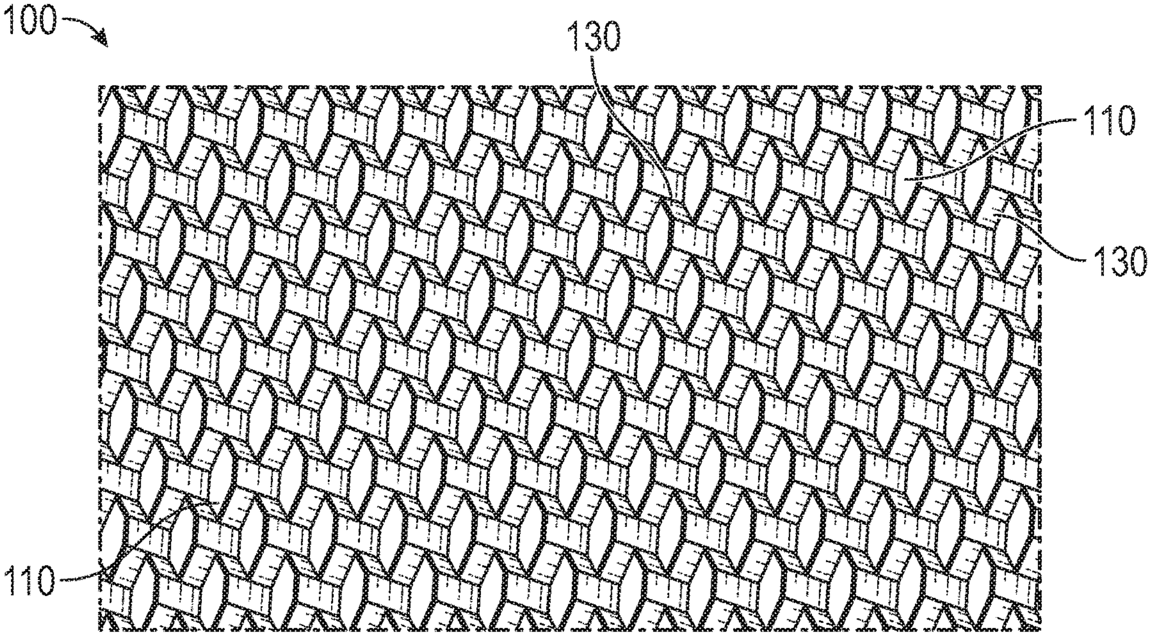
FIG. 1B (Prior Art)
FIG. 1B is a magnified view of a portion of FIG. 1A.
Figure 1C:
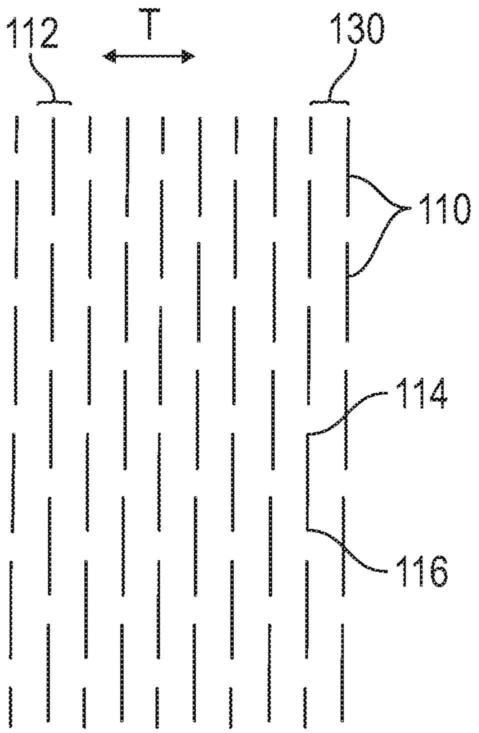
FIG. 1C (Prior Art)
FIG. 1C is a top view line drawing of the slit pattern used to form the packaging material of FIGS. 1A and 1B.
Figure 1D:
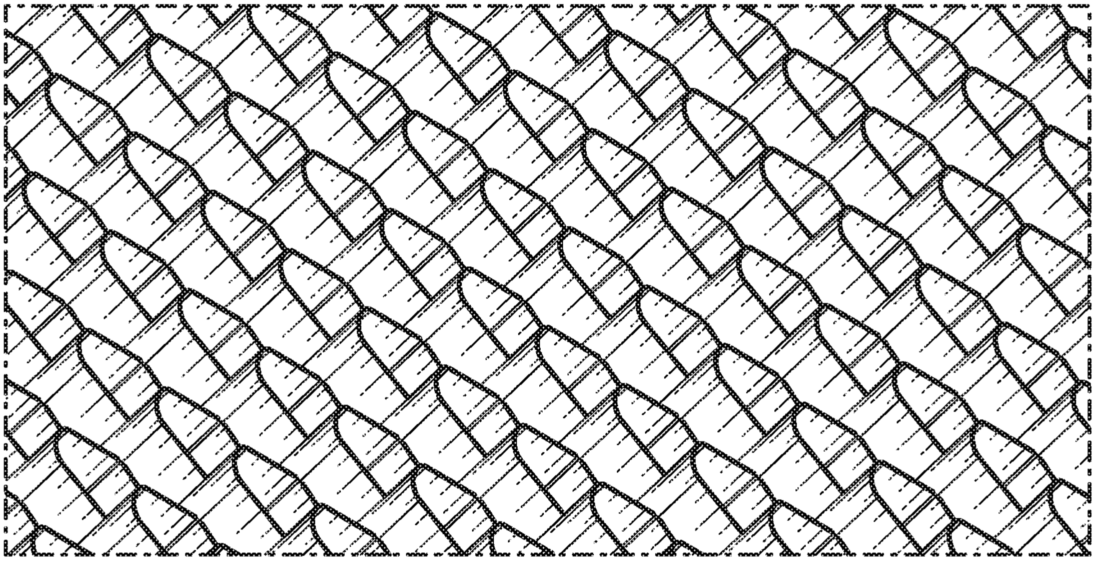
FIG. 1D is a side view drawing from a photograph of a portion of the material of FIG. 1A.
Figure 2A:
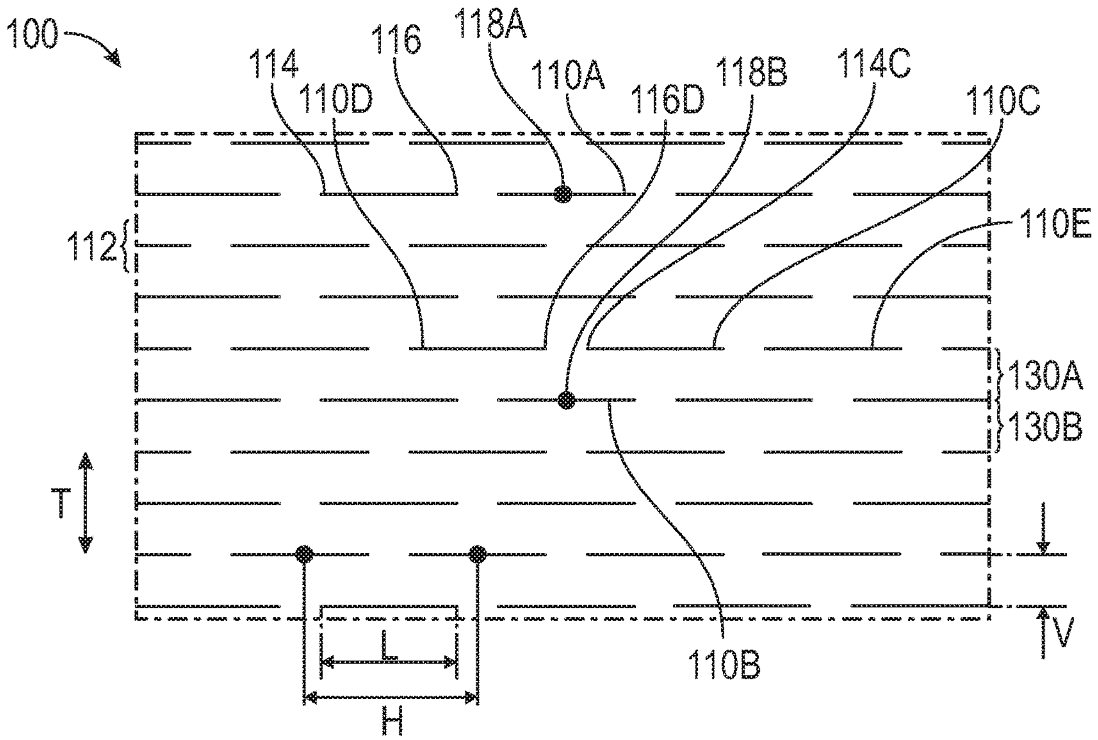
FIG. 2A (Prior Art)
FIG. 2A is a top view line drawing of the slit pattern used to form the packaging material of FIGS. 1A and 1B rotated 90 degrees.
Figure 2B:
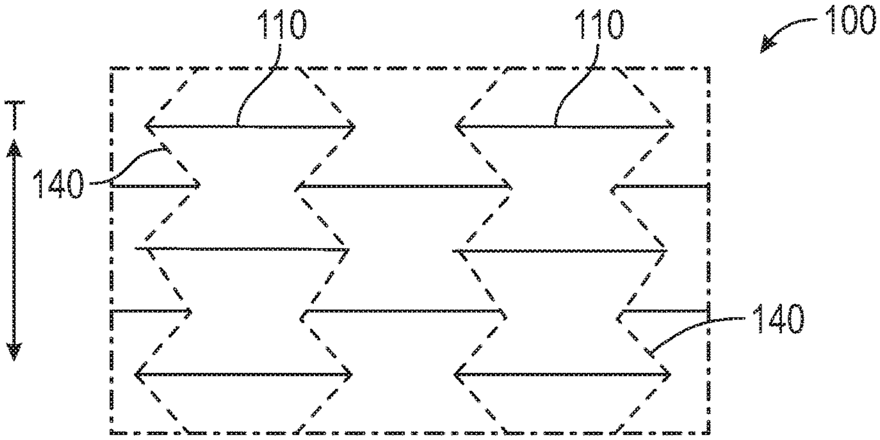
FIG. 2B (Prior Art)
FIG. 2B shows the primary tension lines of the slit pattern shown in FIG. 2A.
Figure 3:
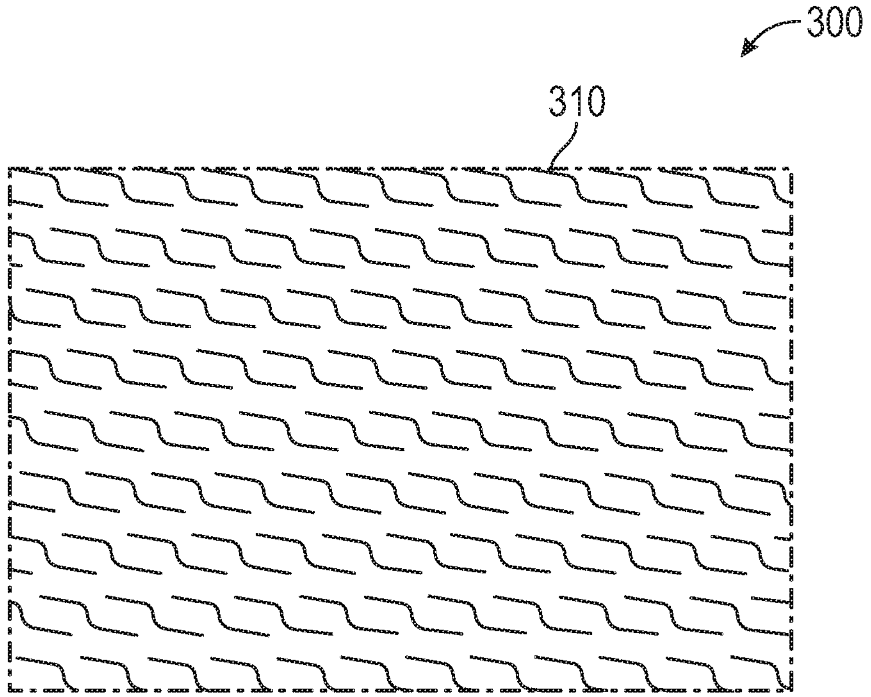
FIG. 3 (Prior Art)
FIG. 3 is a prior art top view line drawing of another exemplary single slit pattern.

The enhanced rotation of the material out of the pretensioned plane of the sheet of material compared to the prior art slit/flap shapes of FIGS. 1C and 2A advantageously creates interlocking features. Whether a material is interlocking can be determined by the following test method.

A sample measuring 36-inches (0.91 m) long and 7.5-inches (19 cm) wide was obtained. The sample was fully deployed without tearing, and was then placed directly adjacent to a smooth PVC pipe having an outer diameter (OD) of 3.15 inches (8 cm) and a length of 23 inches (58.4 cm), ensuring that the sample remained fully deployed during rolling. The sample was wrapped over the pipe ensuring that each successive layer was placed directly over the previous layer and that the sample was placed at the center (along the length) of the pipe. The sample was wrapped around the pipe a minimum of two times. After the sample was wrapped around the pipe, the sample was released and whether the sample unfolded/unwrapped was observed. If the sample did not unfold/unwrap after a 1-minute wait, the sample was slid off the pipe onto a smooth surface such as a tabletop. The sample was then lifted by the trailing edge to see if it unrolled/unwrapped or held its shape.

If the sample opened/unwrapped within a minute of being released, during sliding it off the pipe, or when lifted by the trailing edge, the sample was deemed "not interlocking". If the sample held its tubular shape during and after sliding it off the pipe and when lifted by the trailing edge, then it was deemed interlocking. The test was repeated 10 times for each sample.

Figure 4A:
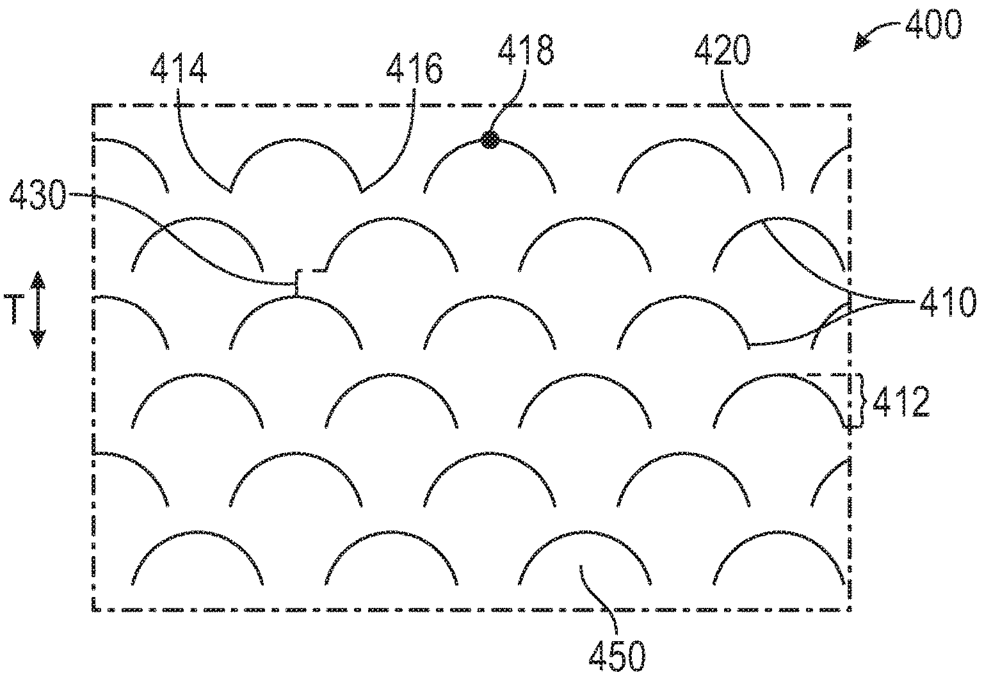
FIG. 4A is a top view schematic drawing of an exemplary single slit pattern in a material.

One exemplary embodiment of a single slit pattern in a material 400 is shown schematically in FIG. 4A. The material 400 is a sheet defining a plane having an axial direction x (which is the vertical direction relative to the figure) that is parallel to a tension axis T and a transverse direction y (which is the horizontal direction relative to the figure) that is orthogonal to the axial direction x. The material 400 defines the x-y plane in a pretensioned state; that is to say, prior to application of tension along the tension axis T. The single-slit pattern is formed in material 400 and includes a plurality of slits 410 that each include a first terminal end 414, a second terminal end 416, and a midpoint 418. A plurality of individual slits 410 are aligned to form rows 412 that are perpendicular to tension axis T. Material 420 is present between adjacent slits 410 in a row 412 that can be referred to as an axial beam. The material between directly adjacent rows 412 of slits 410 forms transverse beams 430. In the exemplary embodiment of FIG. 4A, slits 410 are not straight lines (like slits 110 of the slit pattern of FIGS. 1C and 2A) but are instead curved single slits. In the embodiment of FIG. 4A, the ends of the slits are curved. The degree of curvature shown in FIG. 4A is approximately a semicircle in shape, but the degree of curvature and slit length can vary. The flap region 450 is generally the area enclosed by the path of slit 410 and the imaginary straight line between terminal ends 414 and 416.

In this exemplary embodiment, the slits are "simple slits," which are defined herein as slits having exactly two terminal ends. In some embodiments, at least a portion of the slits can be "compound slits," which are slits having more than two terminal ends. In the current example, a straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a single row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. For example, in some embodiments, the shape will be elliptical. Alternatively, the slit length, row size or shape, and beam size or shape can vary. Further, the degrees of offset or phase offset can vary from what is shown.

Figure 4B:
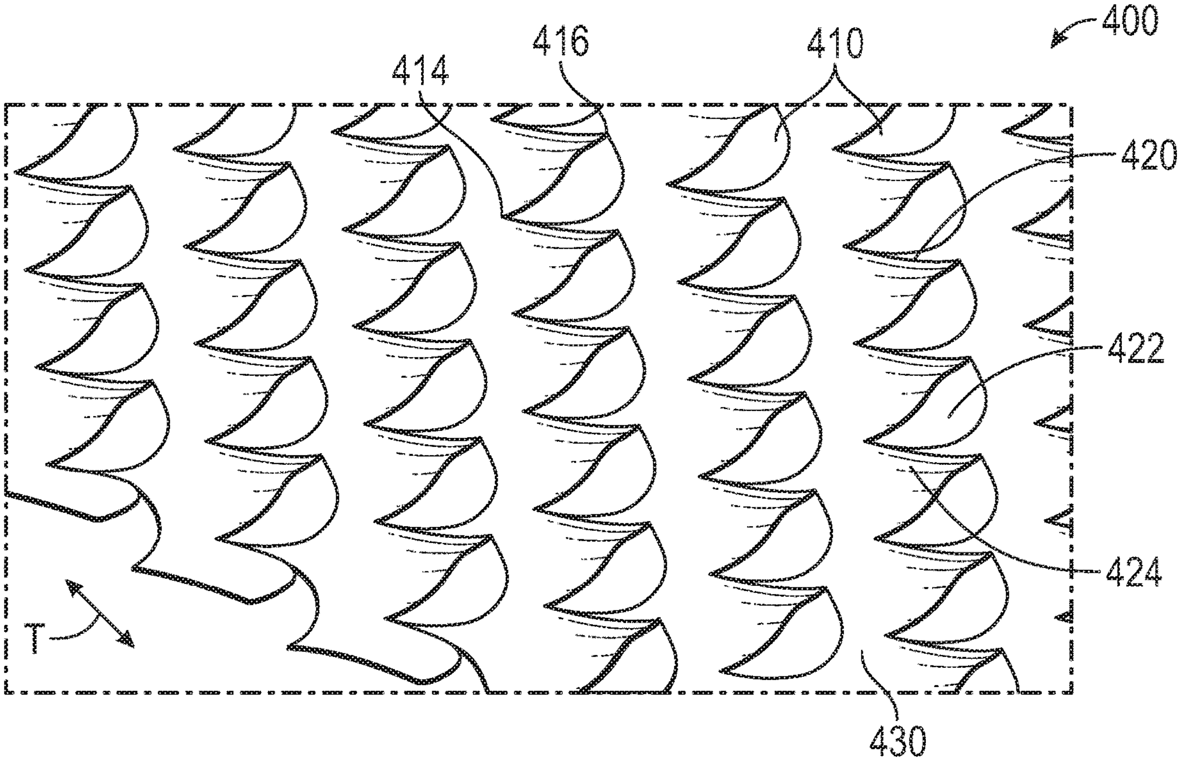
FIG. 4B is a perspective view drawing from a photograph of the slit pattern shown in FIG. 4A formed in a paper sheet and exposed to tension along the tension axis.
Figure 4C:
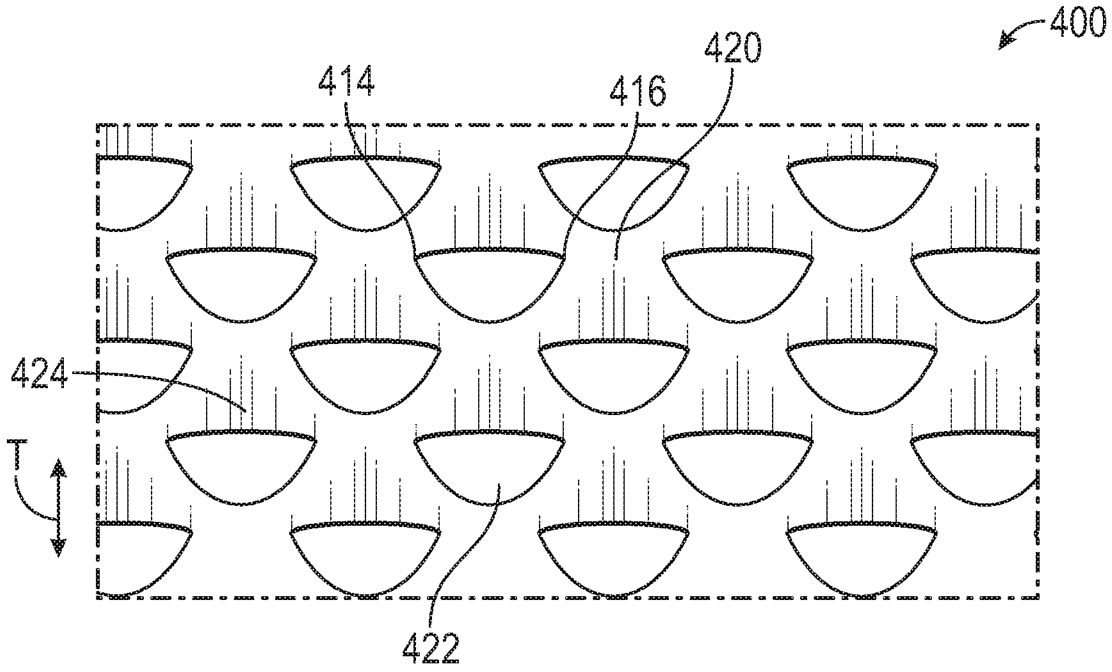
FIG. 4C is a nearly top view drawing from a photograph of the article of FIG. 4B when exposed to tension along the tension axis.
Figure 4D:
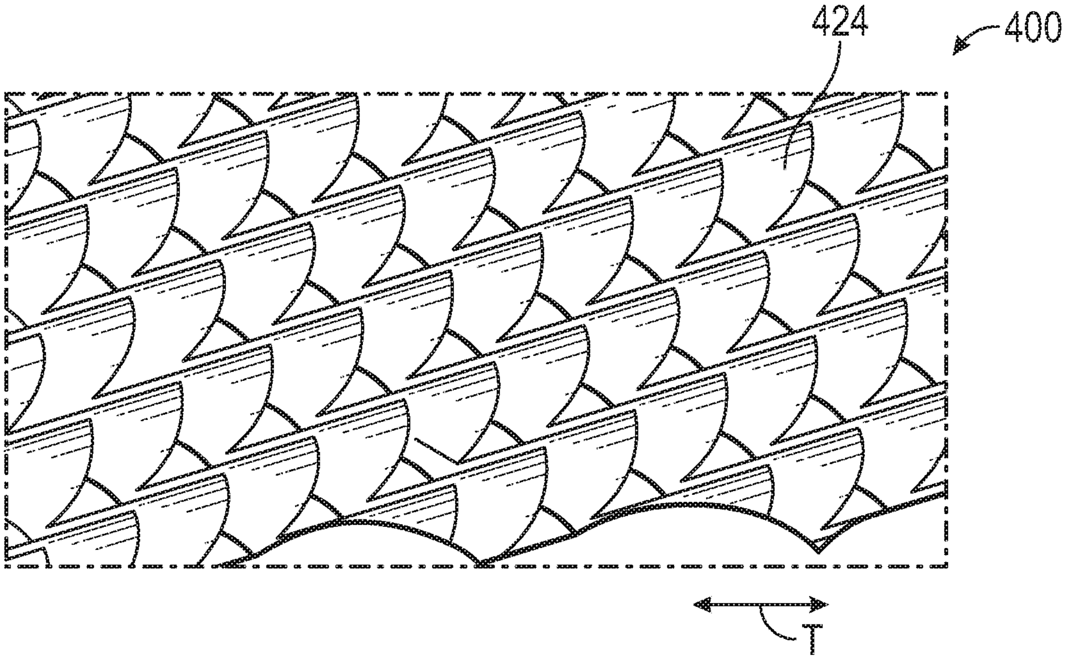
FIG. 4D is an elevated side view of the article shown in FIG. 4B.

FIGS. 4B-4D show the pattern of FIG. 4A formed in a sheet of paper and exposed to tension along the tension axis T. When material 400 is tension activated or deployed along tension axis T, portions of material 400 experience tension and/or compression that causes material 400 to move out of the original plane of material 400 in its pretensioned format. When exposed to tension along the tension axis, terminal ends 414, 416 experience compression and are drawn toward one another, causing a flap region 450 of the material 400 to move or buckle upward relative to the plane of the material 400 in its pretensioned state (FIG. 4A), creating a flap 424. Portions of beams 430 move or buckle downward relative to the plane of the material 400 in its pretensioned state (FIG. 4A), forming an opening portion 422. The material 420 between adjacent slits 410 in a row 412 primarily experiences tension perpendicular to the tension axis T. This region or area does not move substantially out of the original plane and instead bends slightly as compared to the pretensioned form of FIG. 4A. These movements in material 400 form a series of bent, fish-scale-like protrusions, as seen in FIG. 4D.

When the tension-activated material 400 is wrapped around an article or placed directly adjacent to itself, the flaps 424 interlock with one another and/or opening portions 422, to create an interlocking structure. Interlocking can be measured as stated in the interlocking test articulated above.

Figure 5A:
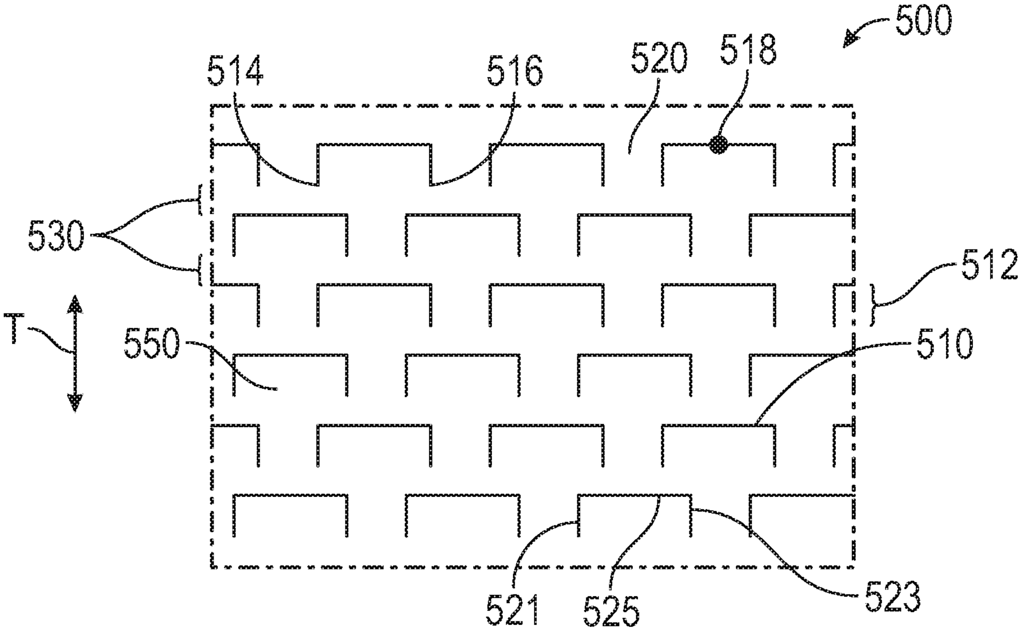
FIG. 5A is a top view schematic drawing of an exemplary single slit pattern.

Another exemplary embodiment of a single slit pattern is shown schematically in FIG. 5A. The single-slit pattern is formed in material 500 and includes a plurality of slits 510 that each include a first terminal end 514, a second terminal end 516, and a midpoint 518. A plurality of individual slits 510 are aligned to form rows 512 that are generally perpendicular to tension axis T. "Generally perpendicular" is defined herein as encompassing angles within a 5-degree margin of error or within a 3-degree margin of error. Material 520 is present between adjacent slits 510 in a row 512 to form an axial beam 520. The material between directly adjacent rows 512 of slits 510 forms transverse beams 530. In the exemplary embodiment of FIG. 5A, slits 510 are not straight lines (like slits 110 of the slit pattern of FIGS. 1C and 2A) but instead include two generally axial portions 521, 523 that are generally parallel to the tension axis T and that are connected to a generally horizontal portion 525 that is generally perpendicular to the tension axis T. In this embodiment, slits 510 are generally u-shaped and the intersection points of axial portions 521, 523 and generally transverse portion 525 are generally perpendicular to one another. The flap region 550 is generally the area enclosed by the path of slit 510 and the imaginary straight line between terminal ends 514 and 516.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary. For example, in some embodiments, the shape is u-shaped with more rounded edges than is shown in FIG. 5A. Alternatively, the slit length, row size or shape, and beam size or shape can vary. Further, the degrees of offset or phase offset can vary from what is shown.

Figure 5B:
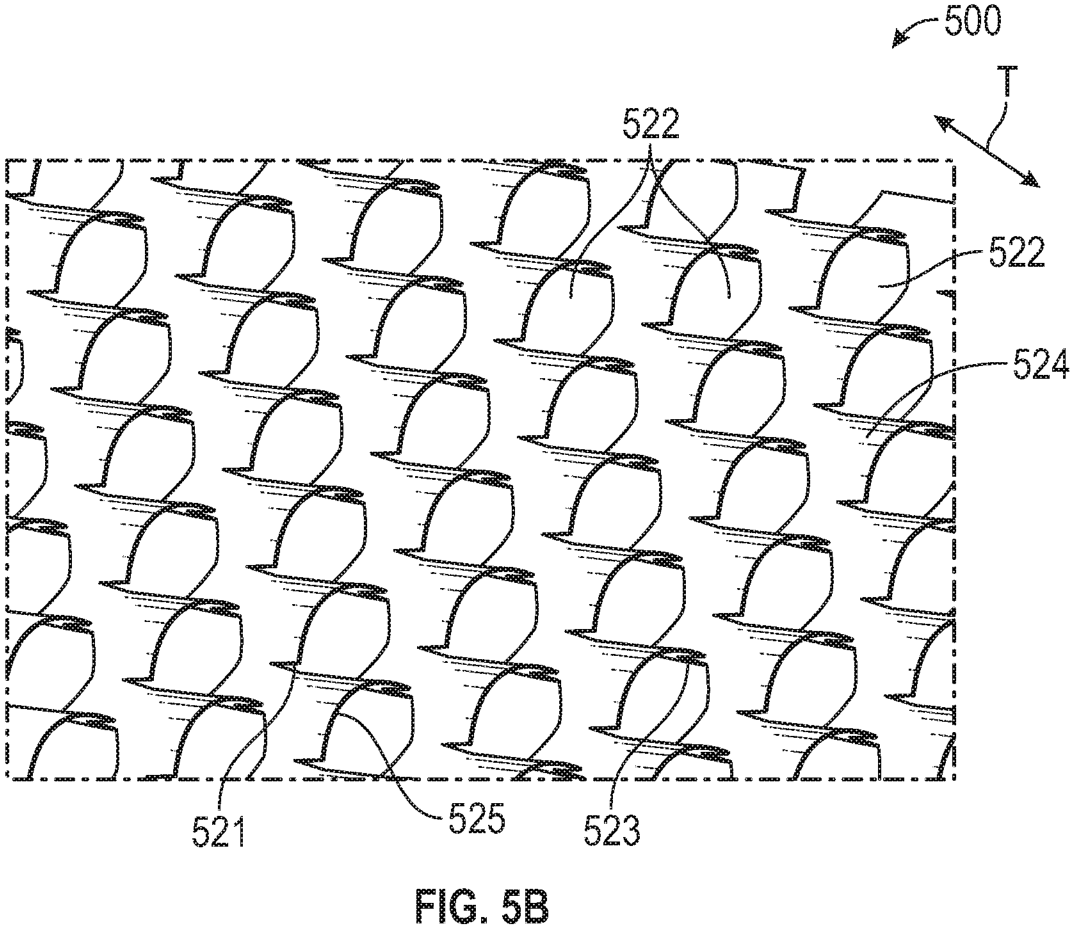
FIG. 5B is a perspective view drawing from a photograph of the pattern shown in FIG. 5A formed in a paper sheet and exposed to tension along the tension axis.
Figure 5C:
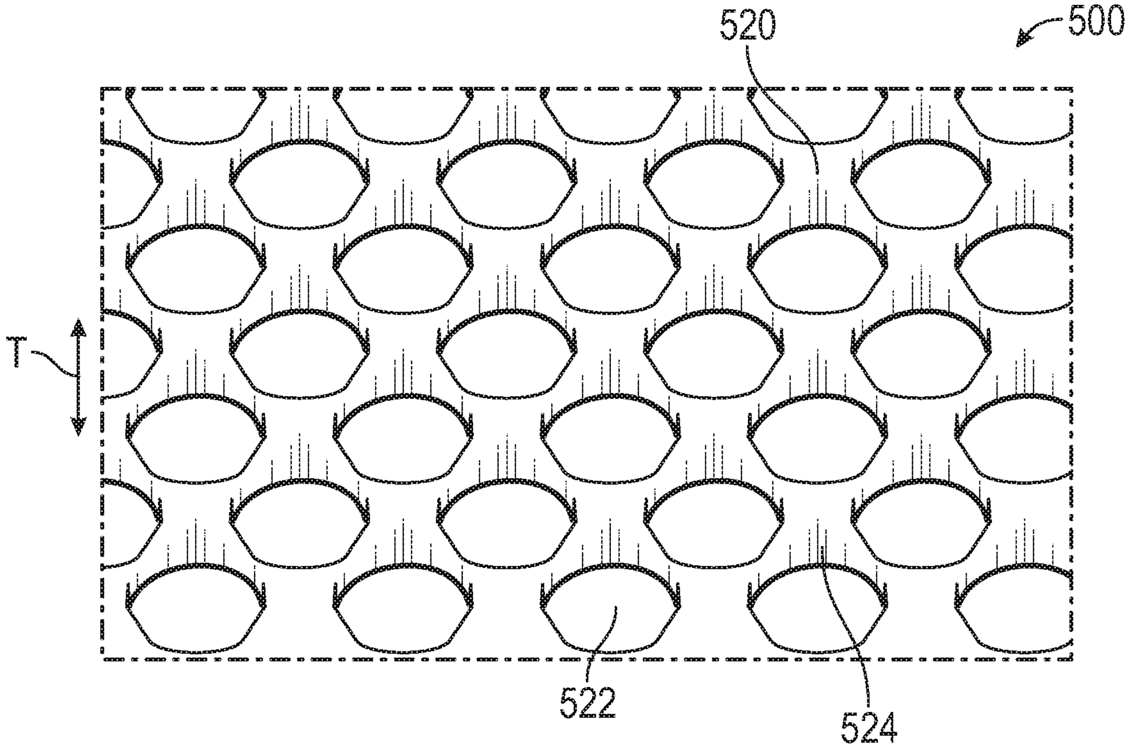
FIG. 5C is a nearly top view of the article of FIG. 5B when exposed to tension along the tension axis.
Figure 5D:
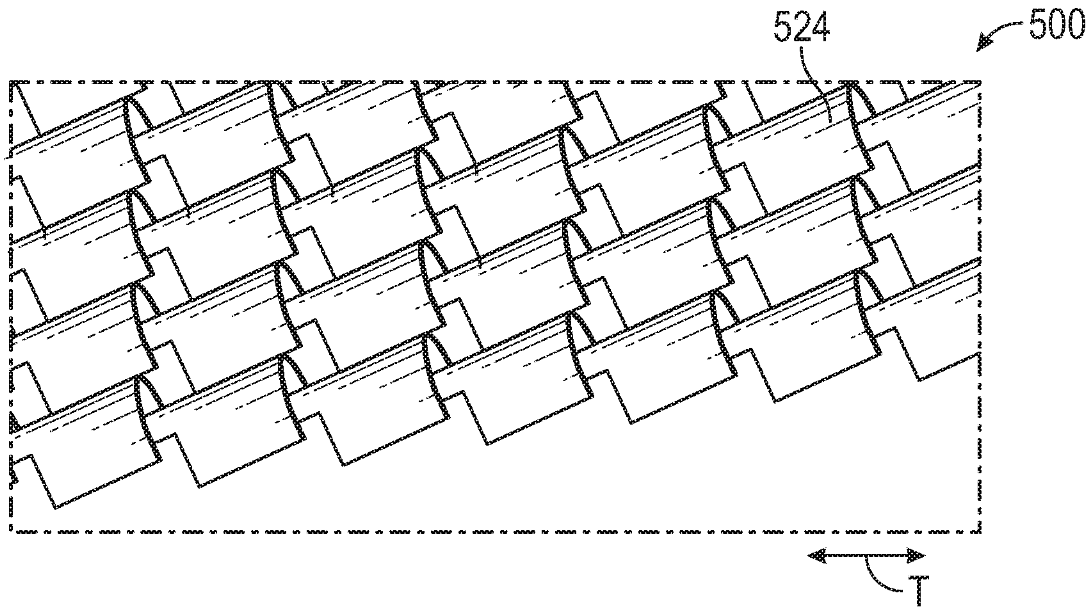
FIG. 5D is an elevated side view of the article shown in FIG. 5B.

FIGS. 5B-5D show the pattern of FIG. 5A formed in a sheet of paper and exposed to tension along the tension axis T. When material 500 is tension activated or deployed along tension axis T, portions of material 500 experience tension and/or compression that causes portions of the material 500 to move out of the original plane of material 500 in its pretensioned format. When exposed to tension along the tension axis, terminal ends 514, 516 experience compression and are drawn toward one another, causing a flap region 550 of the material 500 to move or buckle upward relative to the plane of the material 500 in its pretensioned state (FIG. 5A), creating flap 524. Portions of beams 530 move or buckle downward relative to the plane of the material 500 in its pretensioned state (FIG. 5A), forming an opening portion 522. The material 520 between adjacent slits 510 in a row 512 primarily experiences tension aligned with tension axis T, so this region or area does not move substantially out of the original plane and instead bends slightly as compared to the pretensioned form of FIG. 5A. These movements in material 500 form a series of bent, rectangular-shaped protrusions, as seen in FIG. 5D.

When the tension-activated material 500 is wrapped around an article or placed directly adjacent to itself, the flaps 524 interlock with one another and/or opening portions 522, to create an interlocking structure. Interlocking can be measured as stated in the interlocking test articulated above.

Figure 6A:
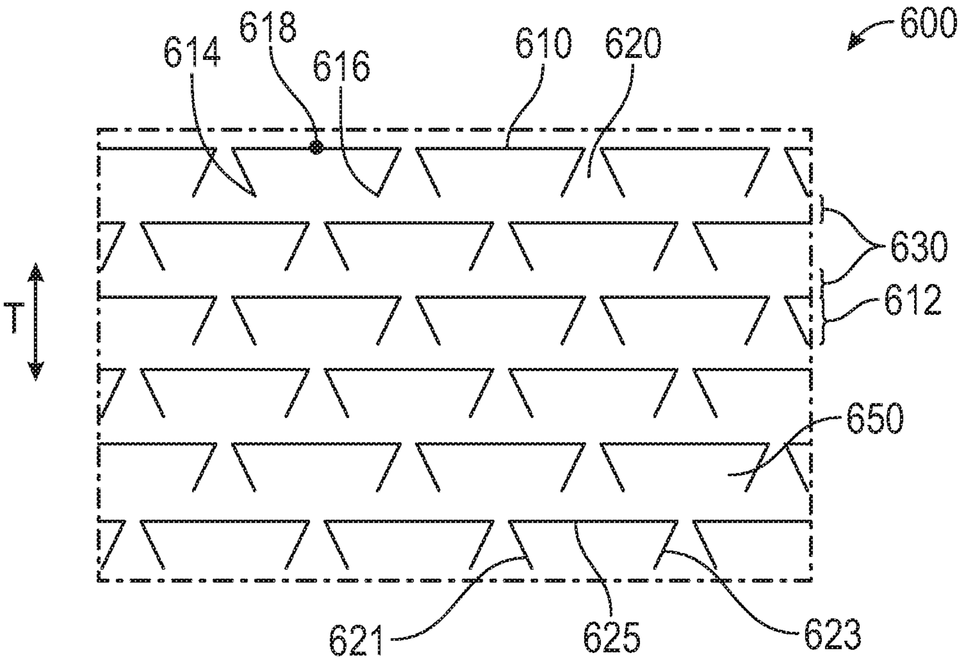
FIG. 6A is a nearly top view schematic drawing of an exemplary single slit pattern.

Another exemplary embodiment of a single slit pattern is shown schematically in FIG. 6A. The single-slit pattern is formed in material 600 and includes a plurality of slits 610 that each include a first terminal end 614, a second terminal end 616, and a midpoint 618. A plurality of individual slits 610 are aligned to form rows 612 that are generally perpendicular to tension axis T. Material 620 is present between adjacent slits 610 in a row 612 that can be referred to as an axial beam. The material between directly adjacent rows 612 of slits 610 forms transverse beams 630. In the exemplary embodiment of FIG. 6A, slits 610 are not straight lines (like slits 110 of the slit pattern of FIGS. 1C and 2A) but instead generally form three sides of a trapezoid and include two generally axial portions 621, 623 that are generally at an angle to the tension axis T and that are connected to a generally horizontal portion 625 that is generally perpendicular to the tension axis T. In this embodiment, the intersection points of axial portions 621, 623 and generally transverse portion 625 are generally perpendicular to one another. The flap region 650 is generally the area enclosed by the path of slit 610 and the imaginary straight line between terminal ends 614 and 616.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary and that the angle of generally axial portions 621, 623 relative to tension axis T can vary. Those of skill in the art will also appreciate that the intersection angles between axial portions 621, 623 and generally horizontal portion 625 can vary and may, for example, be rounded and/or may vary from one another. Alternatively, the slit length, row size or shape, and beam size or shape can vary. Further, the degrees of offset or phase offset can vary from what is shown.

Figure 6B:
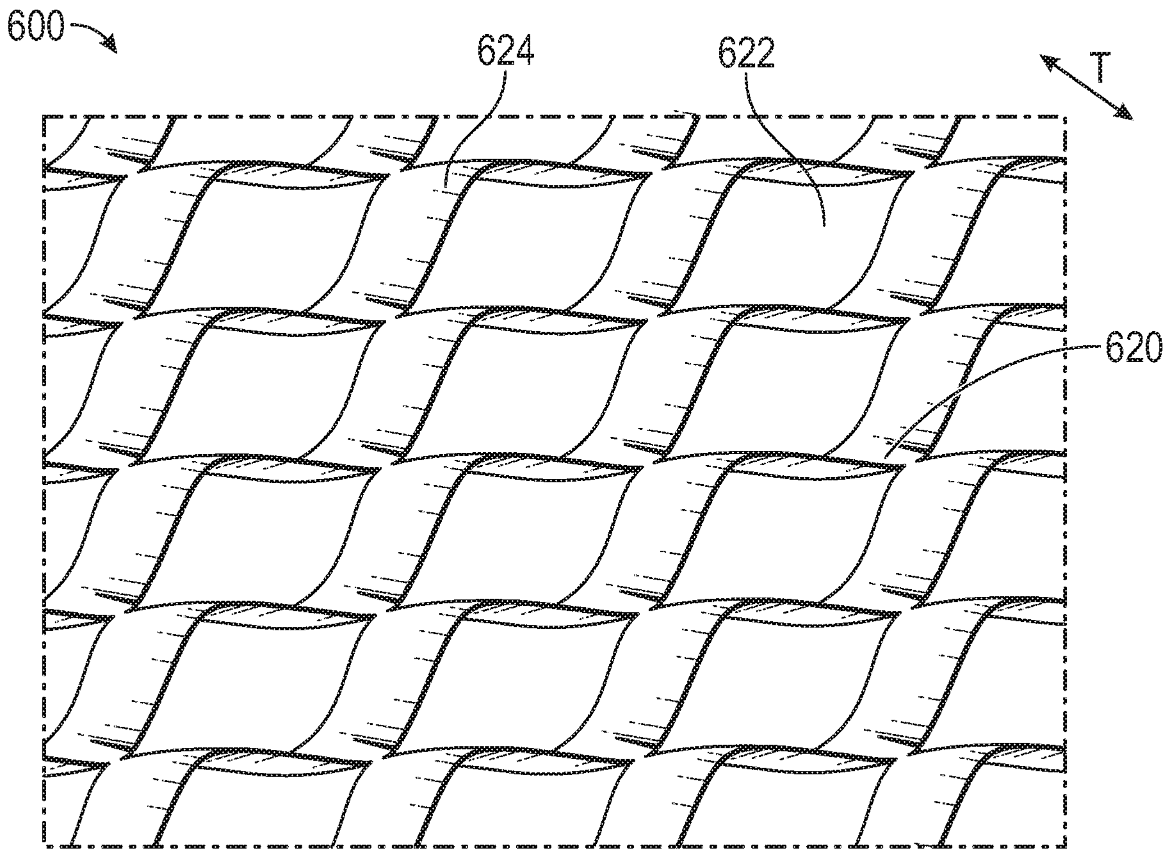
FIG. 6B is a perspective view drawing from a photograph of the pattern shown in FIG. 6A formed in a paper sheet and exposed to tension along the tension axis.
Figure 6C:
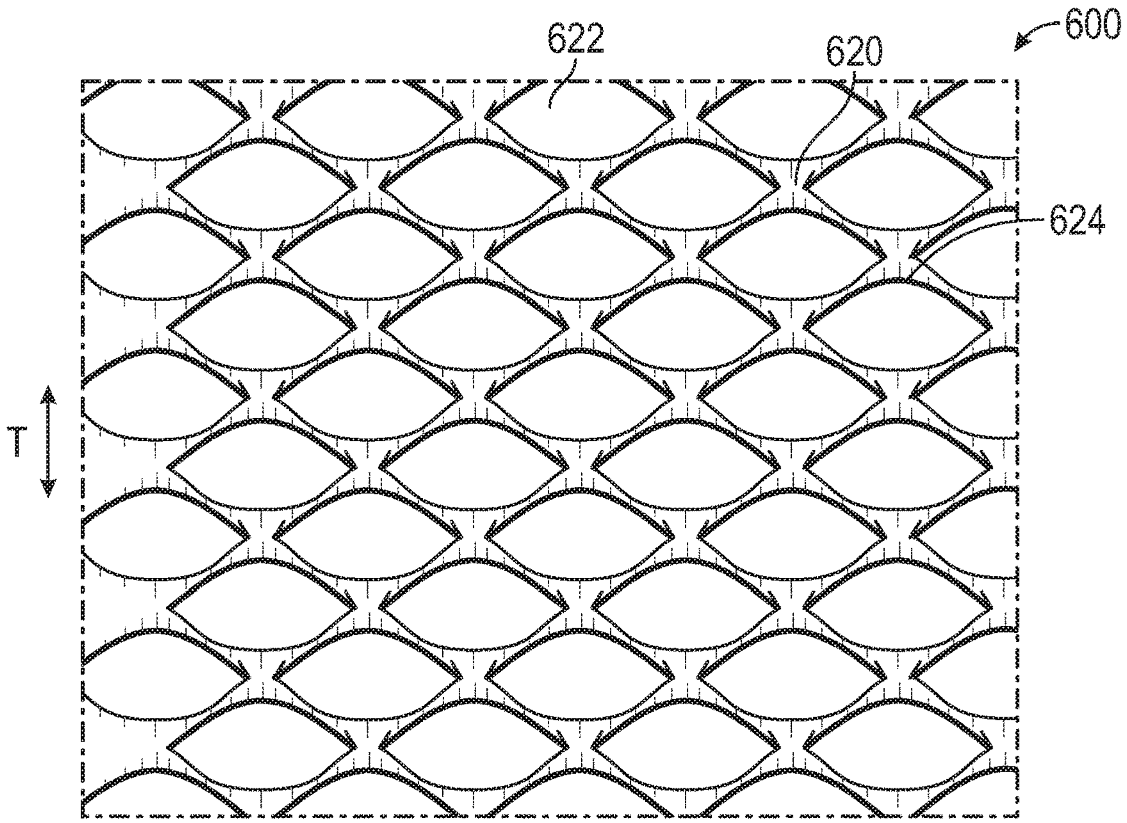
FIG. 6C is a nearly top view drawing from a photograph of the article of FIG. 6B when exposed to tension along the tension axis.
Figure 6D:
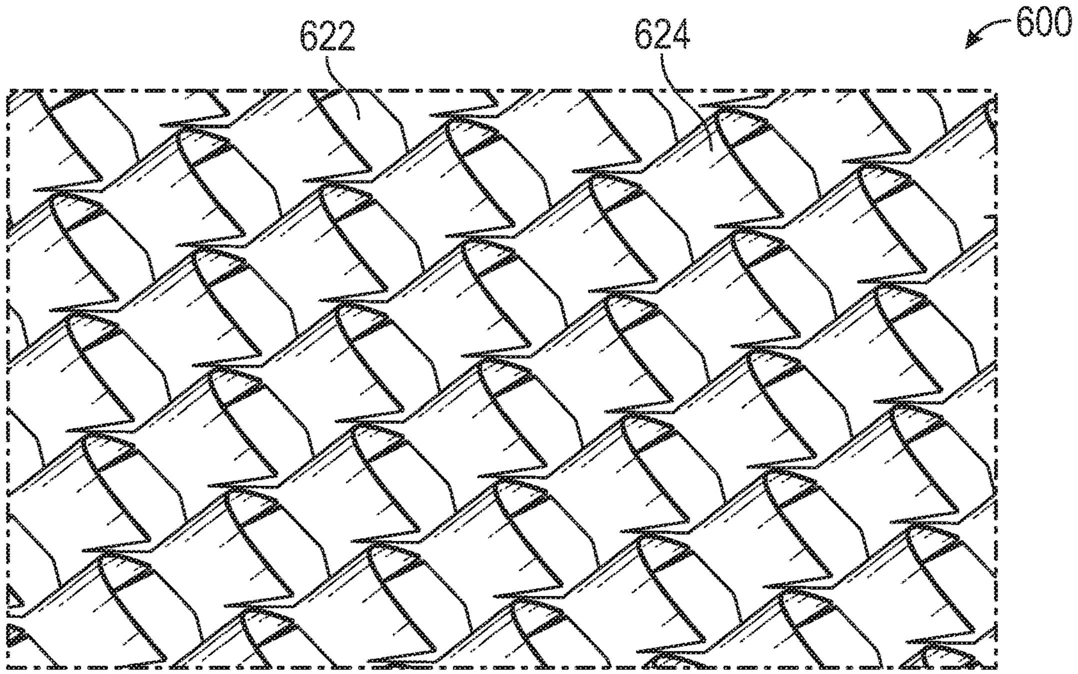
FIG. 6D is an elevated side view of the article shown in FIG. 6B.

FIGS. 6B-6D show the pattern of FIG. 6A formed in a sheet of paper and exposed to tension along the tension axis T. When material 600 is tension activated or deployed along tension axis T, portions of material 600 experience tension and/or compression that causes portions of the material 600 to move out of the original plane of material 600 in its pretensioned format. When exposed to tension along the tension axis, terminal ends 614, 616 experience compression and are drawn toward one another, causing a flap region 650 of the material 600 to move or buckle upward relative to the plane of the material 600 in its pretensioned state (FIG. 6A), creating a flap 624. Portions of beams 630 move or buckle downward relative to the plane of the material 600 in its pretensioned state (FIG. 6A), forming an opening portion 622. The material 620 between adjacent slits 610 in a row 612 primarily experiences tension perpendicular to the tension axis T. This region or area does not move substantially out of the original plane and instead bends slightly as compared to the pretensioned form of FIG. 6A. These movements in material 600 form a series of curving protrusions that undulate out of plane, as seen in FIG. 6D.

When the tension-activated material 600 is wrapped around an article or placed directly adjacent to itself, the flaps 624 interlock with one another and/or opening portions 622, to create an interlocking structure. Interlocking can be measured as stated in the interlocking test articulated above.

Figure 7A:
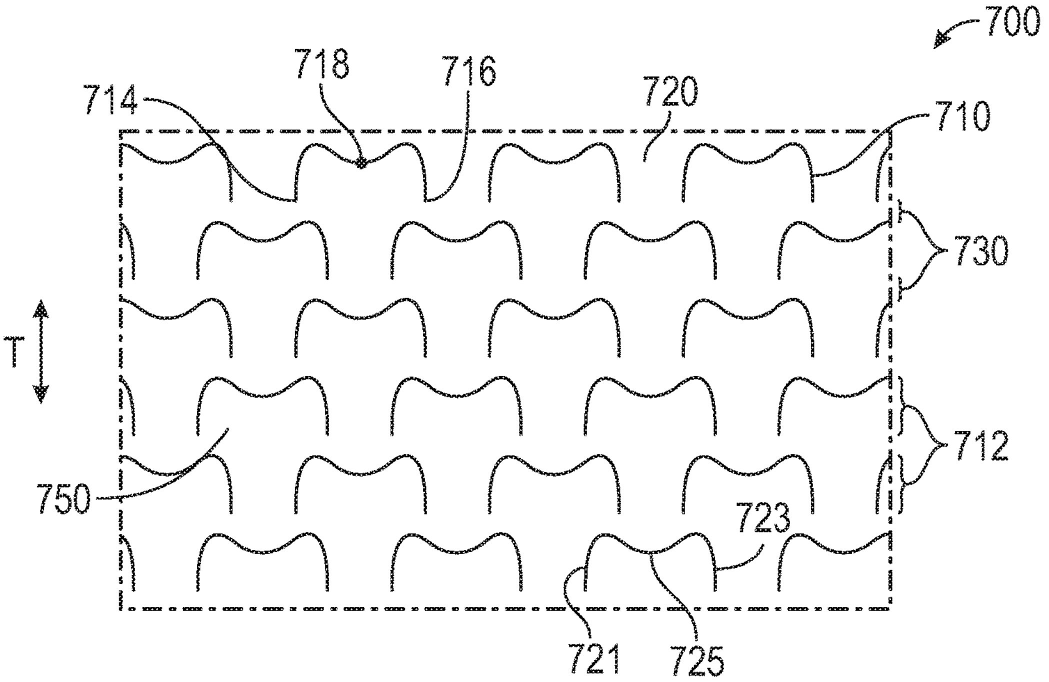
FIG. 7A is a top view schematic drawing of an exemplary single slit pattern.

Another exemplary embodiment of a single slit pattern is shown schematically in FIG. 7A. The single-slit pattern is formed in material 700 and includes a plurality of slits 710 that each include a first terminal end 714, a second terminal end 716, and a midpoint 718. A plurality of individual slits 710 are aligned to form rows 712 that are generally perpendicular to tension axis T. Material 720 is present between adjacent slits 710 in a row 712 that can be referred to as an axial beam. The material between directly adjacent rows 712 of slits 710 forms transverse beams 730. In the exemplary embodiment of FIG. 7A, slits 710 are not straight lines (like slits 110 of the slit pattern of FIGS. 1C and 2A) but instead include two generally axial portions 721, 723 that are generally perpendicular to the tension axis T and that are connected to a generally horizontal portion 725 that is generally parallel to the tension axis T but includes a curve (specifically a concave curve). The intersections between generally axial portions 721, 723 and generally horizontal portion 725 are rounded. The flap region 750 is generally the area enclosed by the path of slit 710 and the imaginary straight line between terminal ends 714 and 716.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary and that the angle of generally axial portions 721, 723 relative to tension axis T can vary. Those of skill in the art will also appreciate that the intersection angles between axial portions 721, 723 and generally horizontal portion 725 can vary and may, for example, not be rounded. Further, the degree and shape of the curve in generally horizontal portion 725 can vary including, for example, that the curve can be convex. Alternatively, the slit length, row size or shape, and beam size or shape can vary. Further, the degrees of offset or phase offset can vary from what is shown.

Figure 7B:
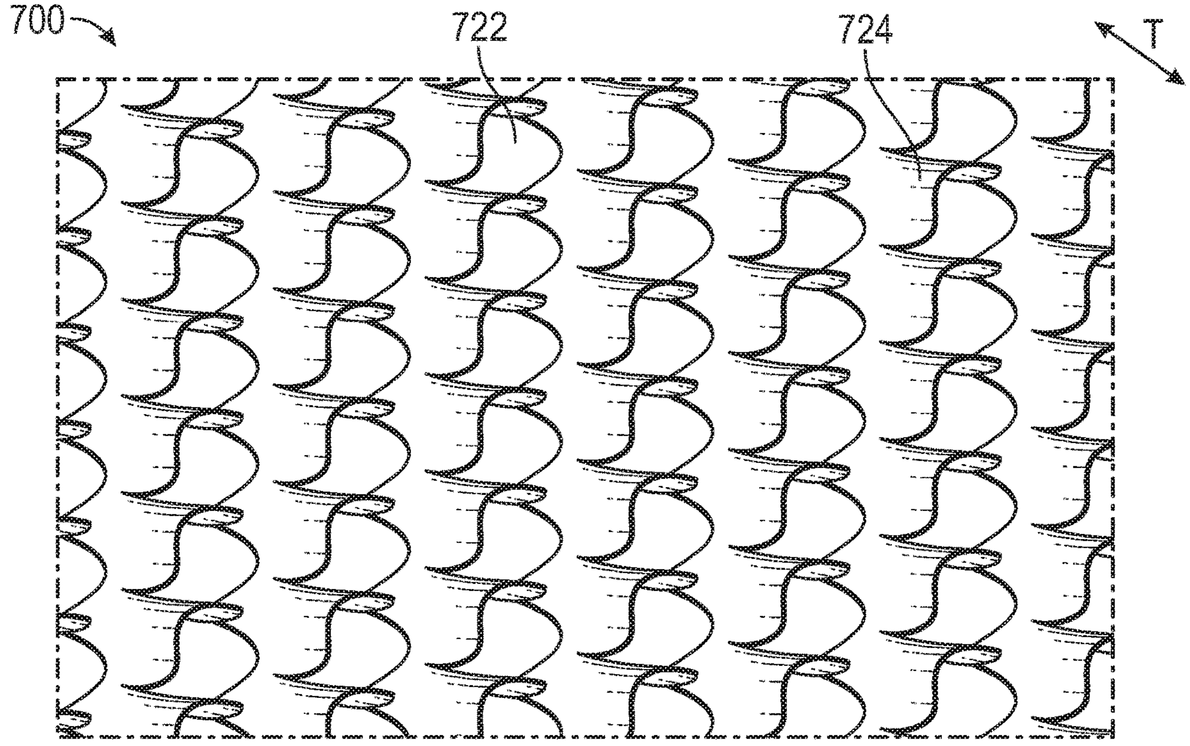
FIG. 7B is a perspective view drawing from a photograph of the pattern shown in FIG. 7A formed in a paper sheet and exposed to tension along the tension axis.
Figure 7C:
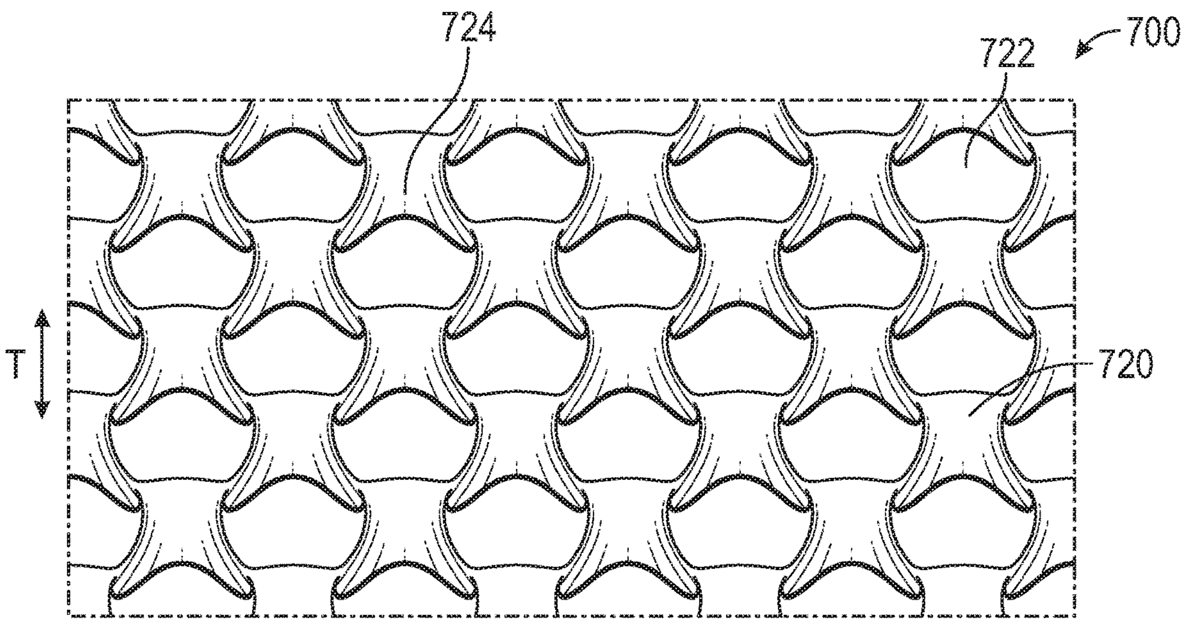
FIG. 7C is a nearly top view drawing from a photograph of the article of FIG. 7B when exposed to tension along the tension axis.
Figure 7D:
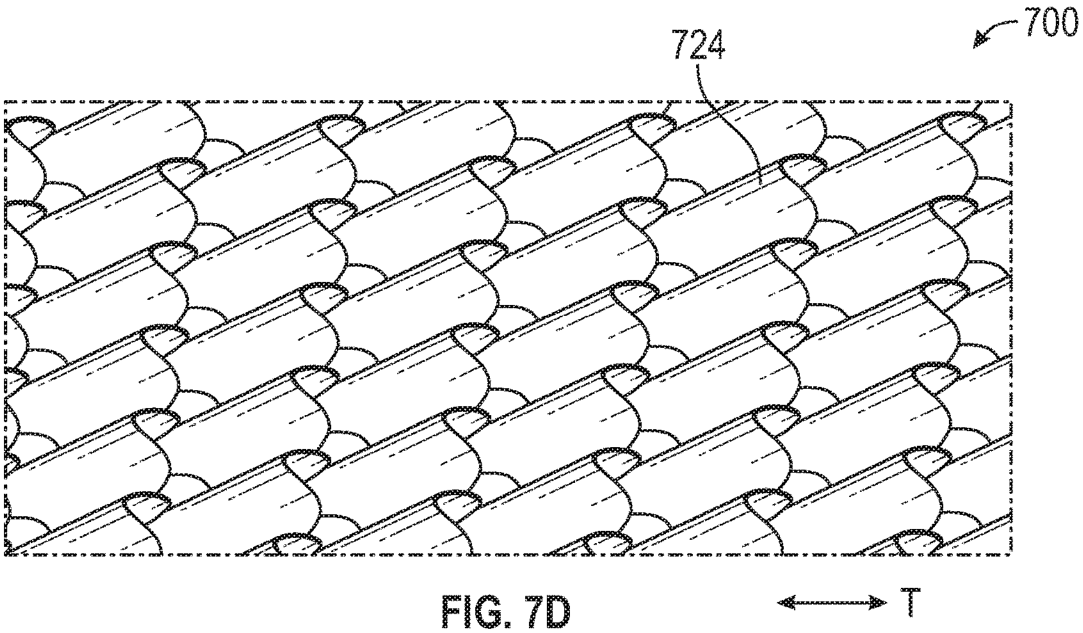
FIG. 7D is an elevated side view of the article shown in FIG. 7B.

FIGS. 7B-7D show the pattern of FIG. 7A formed in a sheet of paper and exposed to tension along the tension axis T. When material 700 is tension activated or deployed along tension axis T, portions of material 700 experiences tension and/or compression that causes material 700 to move out of the original plane of material 700 in its pretensioned format. When exposed to tension along the tension axis, terminal ends 714, 716 experience compression and are drawn toward one another, causing a flap region 750 of the material 700 to move or buckle upward relative to the plane of the material 700 in its pretensioned state (FIG. 7A), creating a flap 724. Portions of beams 730 move or buckle downward relative to the plane of the material 700 in its pretensioned state (FIG. 7A), forming an opening portion 722. The material 720 between adjacent slits 710 in a row 712 primarily experiences tension perpendicular to tension axis T. This region or area does not move substantially out of the original plane and instead bends slightly as compared to the pretensioned form of FIG. 7A. These movements in material 700 form a series of curved, scale-like protrusions, as seen in FIG. 7D.

When the tension-activated material 700 is wrapped around an article or placed directly adjacent to itself, the flaps 724 interlock with one another and/or opening portions 722, to create an interlocking structure. Interlocking can be measured as stated in the interlocking test articulated above.

Figure 8A:
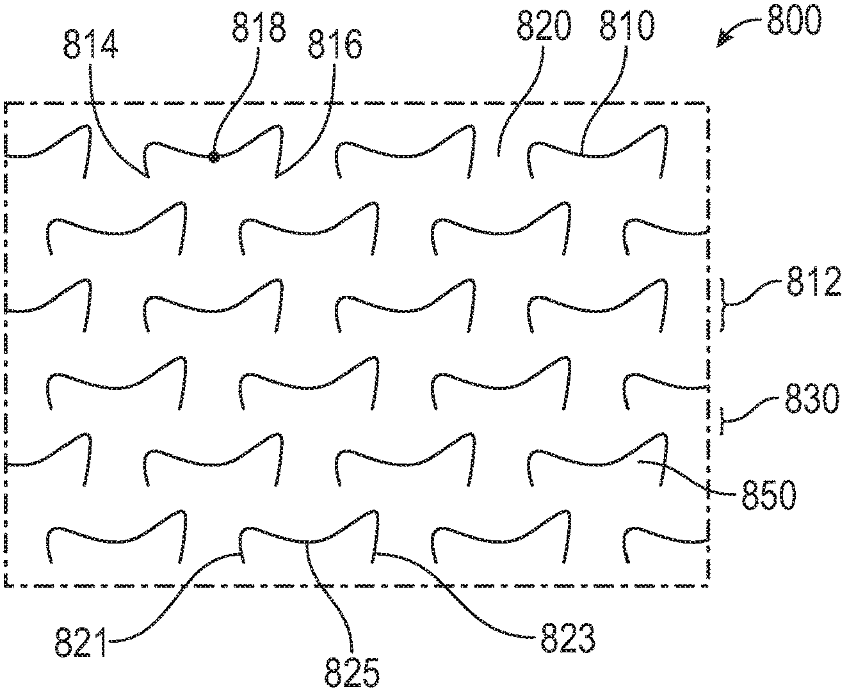
FIG. 8A is a top view schematic drawing of an exemplary single slit pattern.

Another exemplary embodiment of a single slit pattern is shown schematically in FIG. 8A. The single-slit pattern is formed in material 800 and includes a plurality of slits 810 that each include a first terminal end 814, a second terminal end 816, and a midpoint 818. A plurality of individual slits 810 are aligned to form rows 812 that are generally perpendicular to tension axis T. Material 820 is present between adjacent slits 810 in a row 812 that can be referred to as an axial beam. The material between directly adjacent rows 812 of slits 810 forms transverse beams 830. In the exemplary embodiment of FIG. 8A, slits 810 are not straight lines (like slits 110 of the slit pattern of FIGS. 1C and 2A) but instead include two generally axial portions 821, 823 that are generally perpendicular to the tension axis T and are connected to a generally horizontal portion 825 that is generally parallel to the tension axis T but includes a curve, specifically a concave curve. In the embodiment of FIG. 8A, the ends of the slits are curved. Further, the intersections between generally axial portions 821, 823 and generally horizontal portion 825 are rounded. Unlike the pattern of FIG. 7A, in the pattern of FIG. 8A, the two generally axial portions 821, 823 vary in length. Specifically, the first axial portion 821 is shorter than the second axial portion 823. Also, the two generally axial portions 821, 823 are at angle that is less than 90 degrees and greater than 45 degrees from tension axis T. The flap region 850 is generally the area enclosed by the path of slit 810 and the imaginary straight line between terminal ends 814 and 816.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. For example, the shape and slit length can vary and that the angle of generally axial portions 821, 823 relative to tension axis T can vary. Those of skill in the art will also appreciate that the intersection angles between axial portions 821, 823 and generally horizontal portion 825 can vary and may, for example, not be rounded. Further, the degree and shape of the curve in generally horizontal portion 825 can vary including, for example, that the curve can be convex. Alternatively, the slit length, row size or shape, and beam size or shape can vary. Further, the degrees of offset or phase offset can vary from what is shown.

Figure 8B:
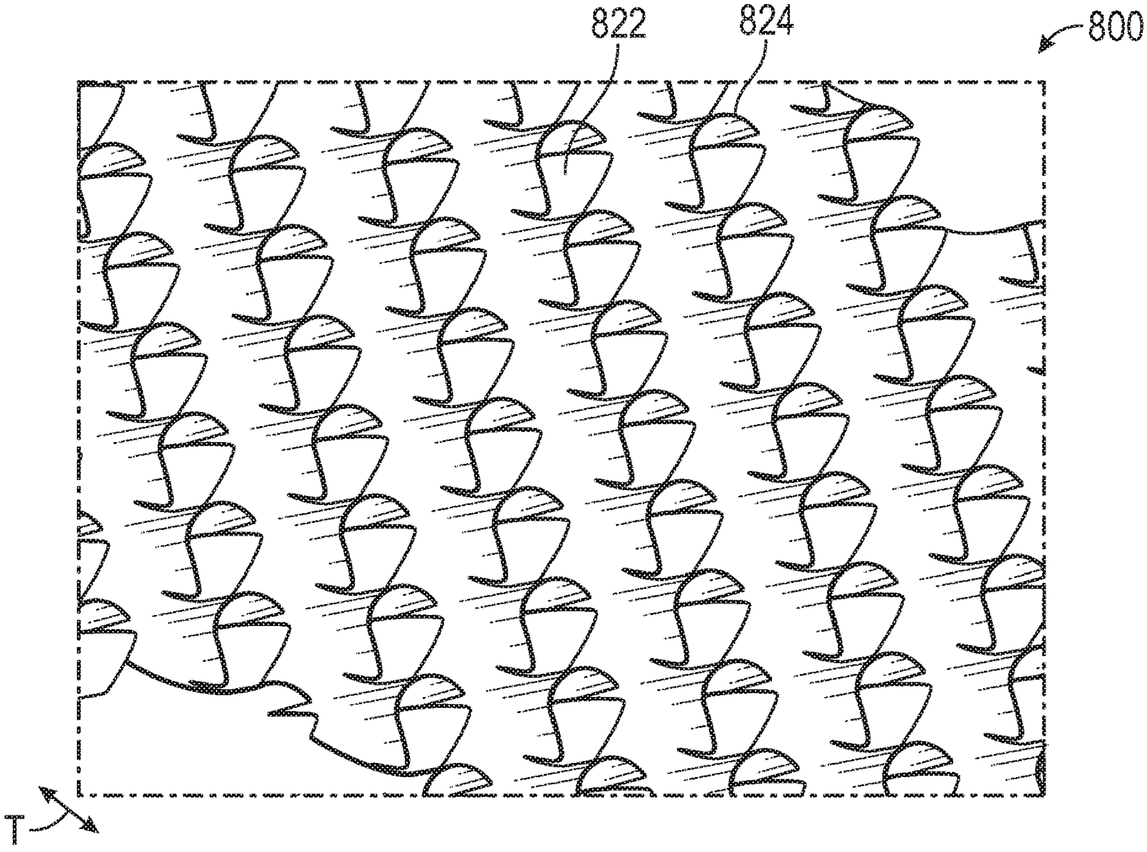
FIG. 8B is a perspective view drawing from a photograph of the pattern shown in FIG. 8A formed in a paper sheet and exposed to tension along the tension axis.
Figure 8C:
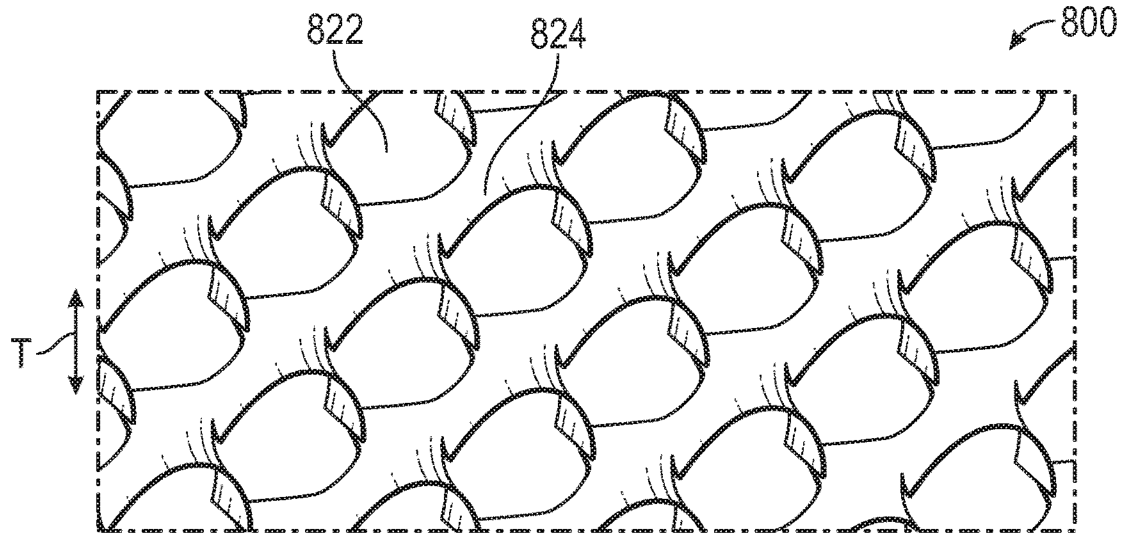
FIG. 8C is a nearly top view drawing from a photograph of the article of FIG. 8B when exposed to tension along the tension axis.
Figure 8D:
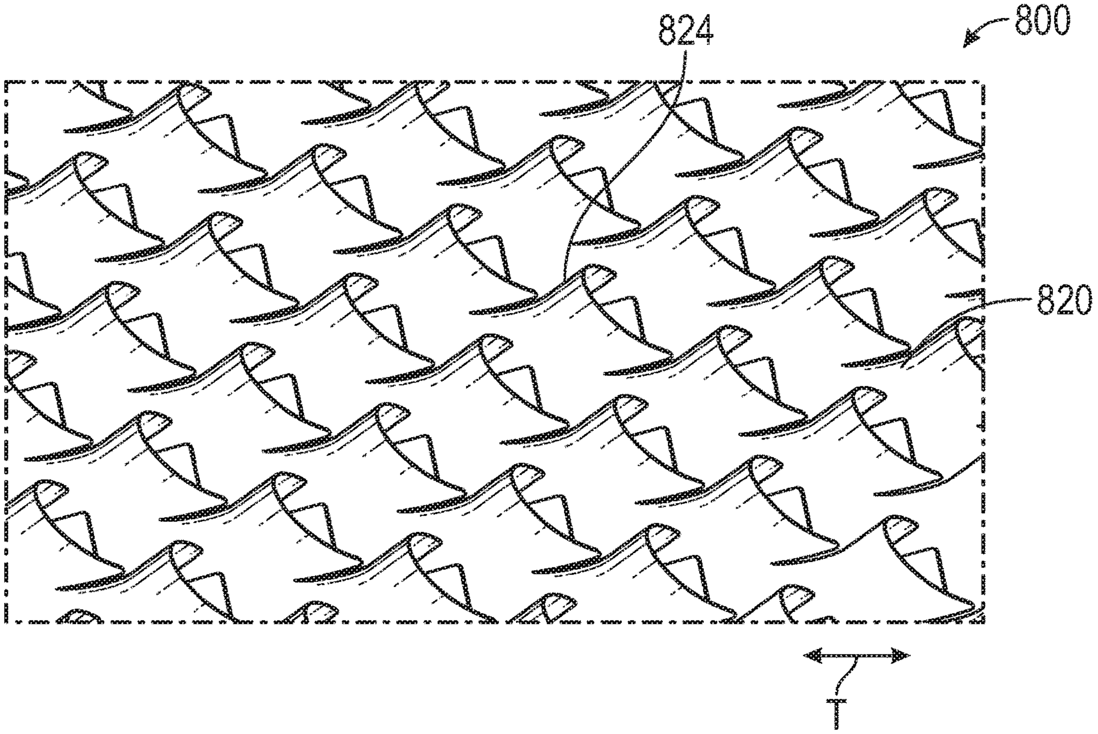
FIG. 8D is an elevated side view of the article shown in FIG. 8B.

FIGS. 8B-8D show the pattern of FIG. 8A formed in a sheet of paper and exposed to tension along the tension axis T. When material 800 is tension activated or deployed along tension axis T, portions of material 800 experiences tension and/or compression that causes the material to move out of the original plane of material 800 in its pretensioned format. When exposed to tension along the tension axis, terminal ends 814, 816 experience compression and are drawn toward one another, causing a flap region 850 of the material 800 to move or buckle upward relative to the plane of the material 800 in its pretensioned state (FIG. 8A), creating flap 824. Portions of beams 830 move or buckle downward relative to the plane of the material 800 in its pretensioned state (FIG. 8A), forming an opening portion 822. The material 820 between adjacent slits 810 in a row 812 primarily experiences tension perpendicular to tension axis T. This region or area does not move substantially out of the original plane and instead bend slightly as compared to the pretensioned form of FIG. 8A. These movements in material 800 form a series of curved protrusions, as seen in FIG. 8D.

When the tension-activated material 800 is wrapped around an article or placed directly adjacent to itself, the flaps 824 interlock with one another and/or opening portions 822, to create an interlocking structure. Interlocking can be measured as stated in the interlocking test articulated above.

Figure 9A:
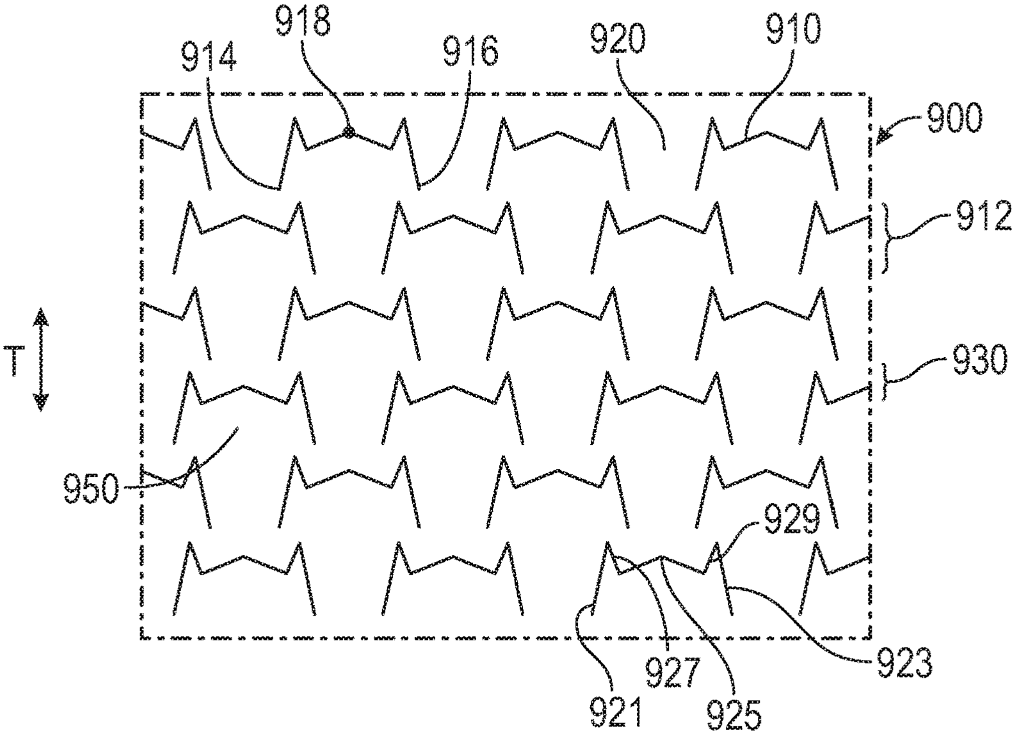
FIG. 9A is a top view schematic drawing of an exemplary single slit pattern.

Another exemplary embodiment of a single slit pattern is shown schematically in FIG. 9A. The single-slit pattern is formed in material 900 and includes a plurality of slits 910 that each include a first terminal end 914, a second terminal end 916, and a midpoint 918. A plurality of individual slits 910 are aligned to form rows 912 that are generally perpendicular to tension axis T. Material 920 is present between adjacent slits 910 in a row 912 and can be referred to as an axial beam. The material between directly adjacent rows 912 of slits 910 forms transverse beams 930. In the exemplary embodiment of FIG. 9A, slits 910 are not straight lines (like slits 110 of the slit pattern of FIGS. 1C and 2A). Instead, slits 910 include two generally axial portions 921, 923 that are generally parallel to tension axis T. The two generally axial portions 921, 923 are connected to two small axial slit portions 927, 929 that are also generally parallel to the tension axis T and which, together with the two generally axial portions 921, 923 form two generally v-shaped portions of slit 910. A generally horizontal portion 925 that is generally perpendicular to the tension axis T connects or contacts the two small axial slit portions 921, 923. Generally horizontal portion 925 includes a curve or v-shape that is generally convex and in which the midpoint 918 of the curve or v-shape is a point rather than a rounded curve. The flap region 950 is generally the area enclosed by the path of slit 910 and the imaginary straight line between terminal ends 914 and 916.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. For example, the two generally axial portions 921, 923 can vary in length or angle relative to tension axis T. Alternatively, the two small axial slit portions 927, 929 can vary in length or angle relative to tension axis T. Alternatively, the slit length, row size or shape, and beam size or shape can vary. The angle of generally axial portions 921, 923 relative to tension axis T can vary. Those of skill in the art will also appreciate that the intersection angle between small axial slit portions 927, 929 and generally horizontal portion 925 can vary and may, for example, be rounded. It can also be appreciated that the intersection angle between axial portions 921, 923 and small axial slit portions 927, 929 can vary and may, for example, be rounded. Further, the degree and shape of the curve in generally horizontal portion 925 can vary including, for example, that the curve can be convex. Further, the degrees of offset or phase offset can vary from what is shown.

Figure 9B:
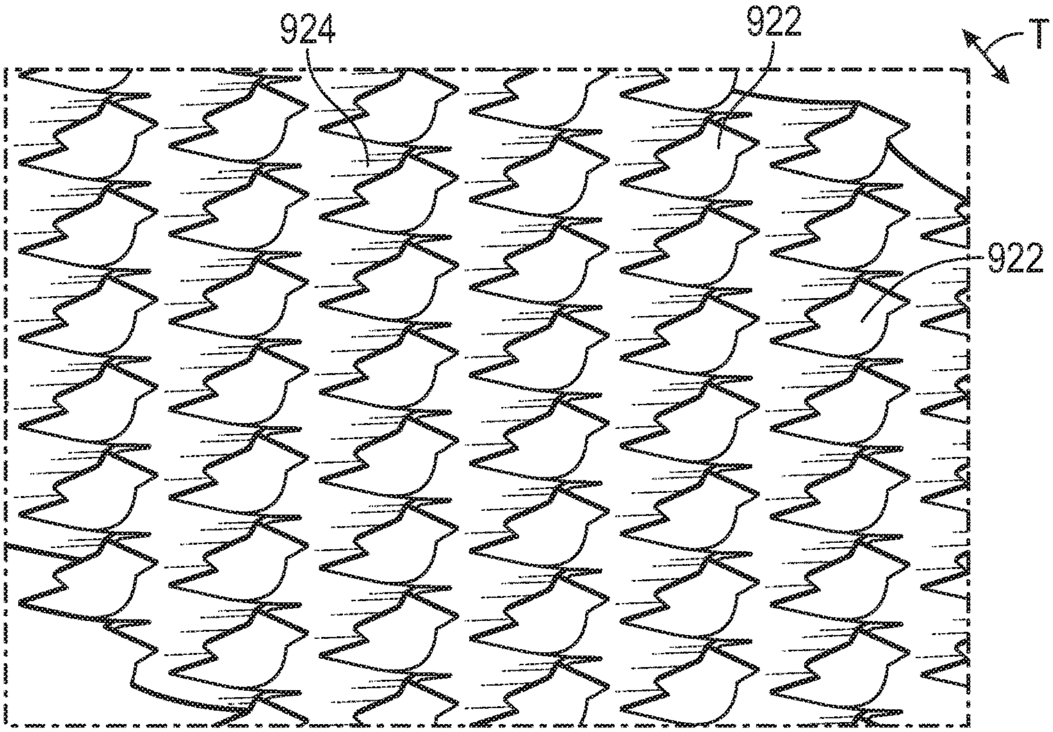
FIG. 9B is a perspective view drawing from a photograph of the pattern shown in FIG. 9A formed in a paper sheet and exposed to tension along the tension axis.
Figure 9C:
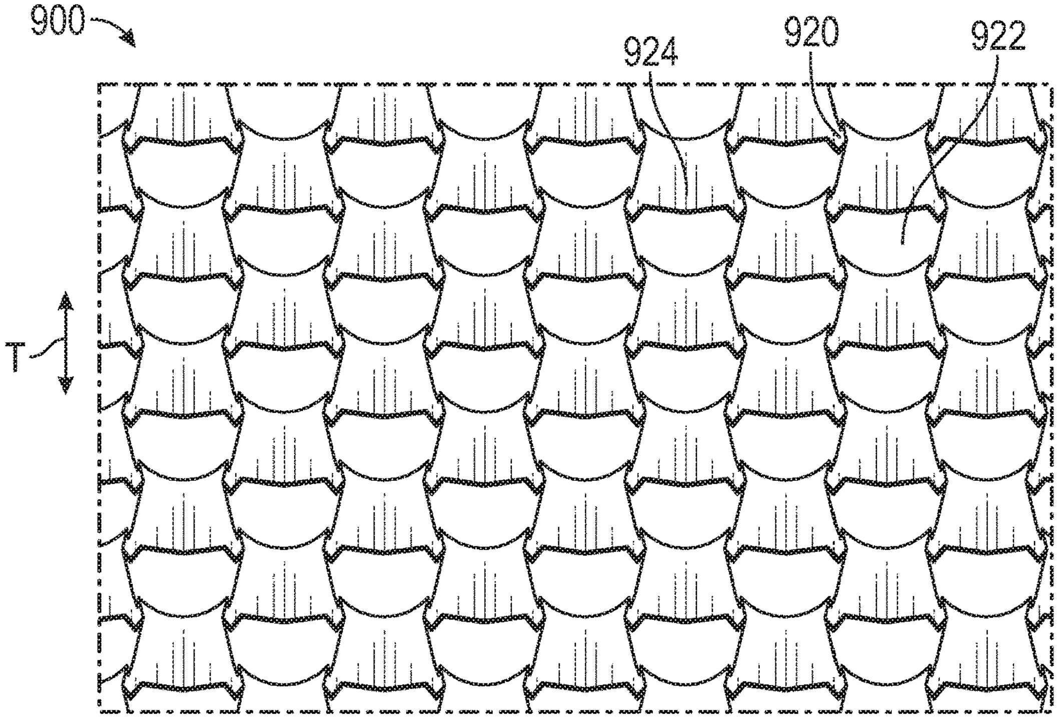
FIG. 9C is a nearly top view drawing from a photograph of the article of FIG. 9B when exposed to tension along the tension axis.
Figure 9D:
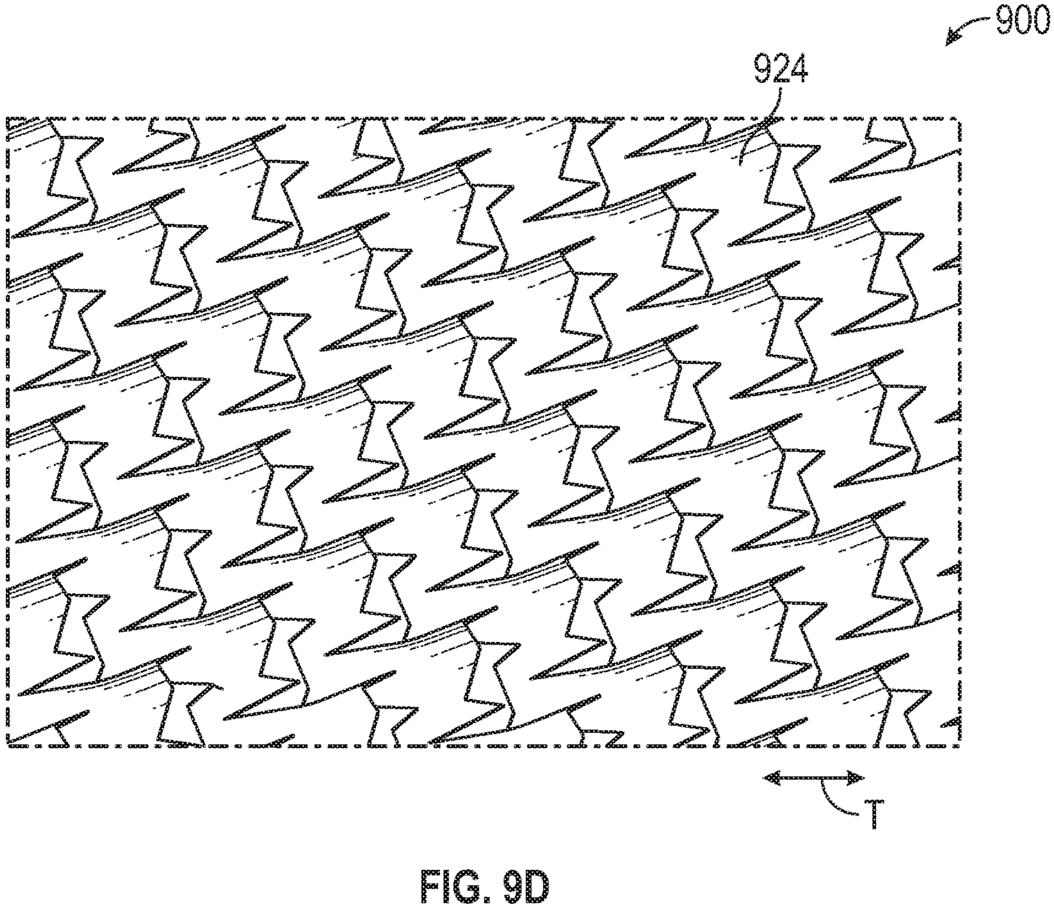
FIG. 9D is an elevated side view of the article shown in FIG. 9B.

FIGS. 9B-9D show the pattern of FIG. 9A formed in a sheet of paper and exposed to tension along the tension axis T. When material 900 is tension activated or deployed along tension axis T, portions of material 900 experiences tension and/or compression that causes the material to move out of the original plane of material 900 in its pretensioned format. When exposed to tension along the tension axis, terminal ends 914, 916 experience compression and are drawn toward one another, causing a flap region 950 of the material 900 to move or buckle upward relative to the plane of the material 900 in its pretensioned state (FIG. 9A), creating flap 924. Portions of beams 930 move or buckle downward relative to the plane of the material 900 in its pretensioned state (FIG. 9A), forming an opening portion 922. The material 920 between adjacent slits 910 in a row 912 primarily experiences tension perpendicular to tension axis T. This region or area does not move substantially out of the original plane and instead bends slightly as compared to the pretensioned form of FIG. 9A. These movements in material 900 form a series of pointy fish-scale-like protrusions, as seen in FIG. 9D.

When the tension-activated material 900 is wrapped around an article or placed directly adjacent to itself, the flaps 924 interlock with one another and/or opening portions 922, to create an interlocking structure. Interlocking can be measured as stated in the interlocking test articulated above.

Figure 10A:
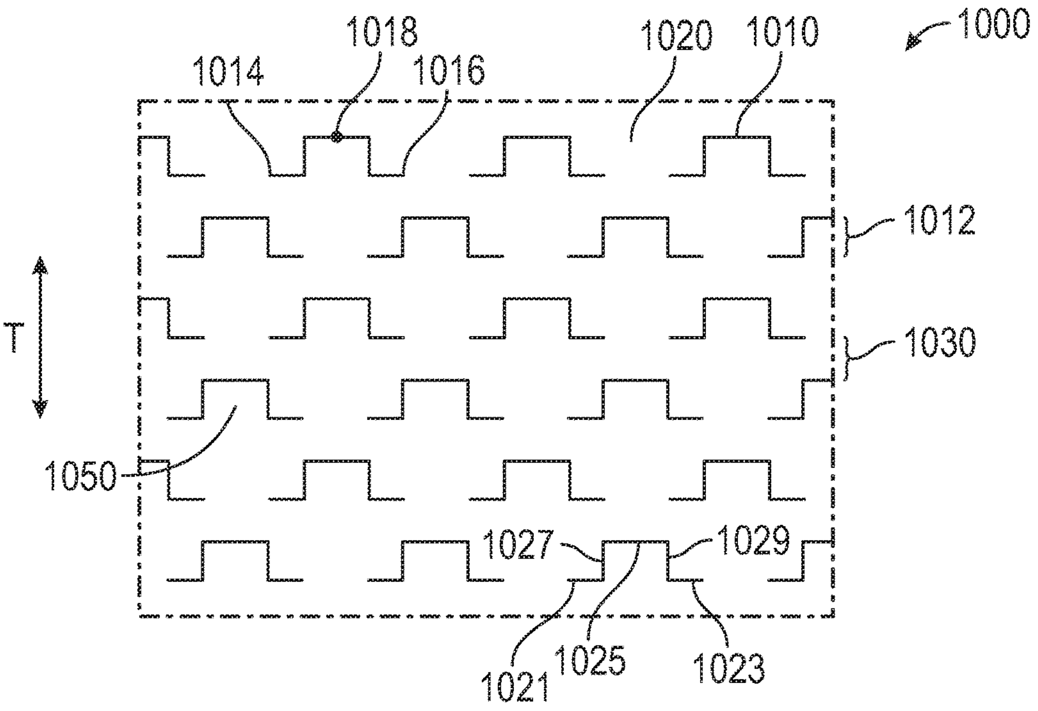
FIG. 10A is a top view schematic drawing of an exemplary single slit pattern.

Another exemplary embodiment of a single slit pattern is shown schematically in FIG. 10A. The single-slit pattern is formed in material 1000 and includes a plurality of slits 1010 that each include a first terminal end 1014, a second terminal end 1016, and a midpoint 1018. A plurality of individual slits 1010 are aligned to form rows 1012 that are generally perpendicular to tension axis T. Material 1020 is present between adjacent slits 1010 in a row 1012 that can be referred to as an axial beam. The material between directly adjacent rows 1012 of slits 1010 forms transverse beams 1030. In the exemplary embodiment of FIG. 10A, slits 1010 are not straight lines (like slits 110 of the slit pattern of FIGS. 1C and 2A). Instead, slits 1010 include two generally transverse portions 1021, 1023 that are generally perpendicular to tension axis T. The two generally transverse portions 1021, 1023 are connected to a u-shaped portion including two axial sections 1027, 1029 and a transverse section 1025. The two axial sections 1027, 1029 are also generally parallel to the tension axis T and the transverse section 1025 is generally perpendicular to tension axis T. The flap region 1050 is generally the area enclosed by the path of slit 1010 and the imaginary straight line between terminal ends 1014 and 1016.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. For example, the two generally axial portions 1027, 1029 can vary in length or angle relative to tension axis T. Alternatively, the two generally transverse portions 1021, 1023 can vary in length or angle relative to tension axis T. Alternatively, the transverse section 1025 can vary in length or angle relative to tension axis T or could be curved or pointed. Alternatively, the slit length, row size or shape, and beam size or shape can vary. Those of skill in the art will also appreciate that the intersections between axial portions 1027, 1029 and one or both of generally horizontal portions 1021, 1023 can be curved (e.g., convex or concave), rounded, or at a 90 degree angle. Further, the degrees of offset or phase offset can vary from what is shown.

Figure 10B:
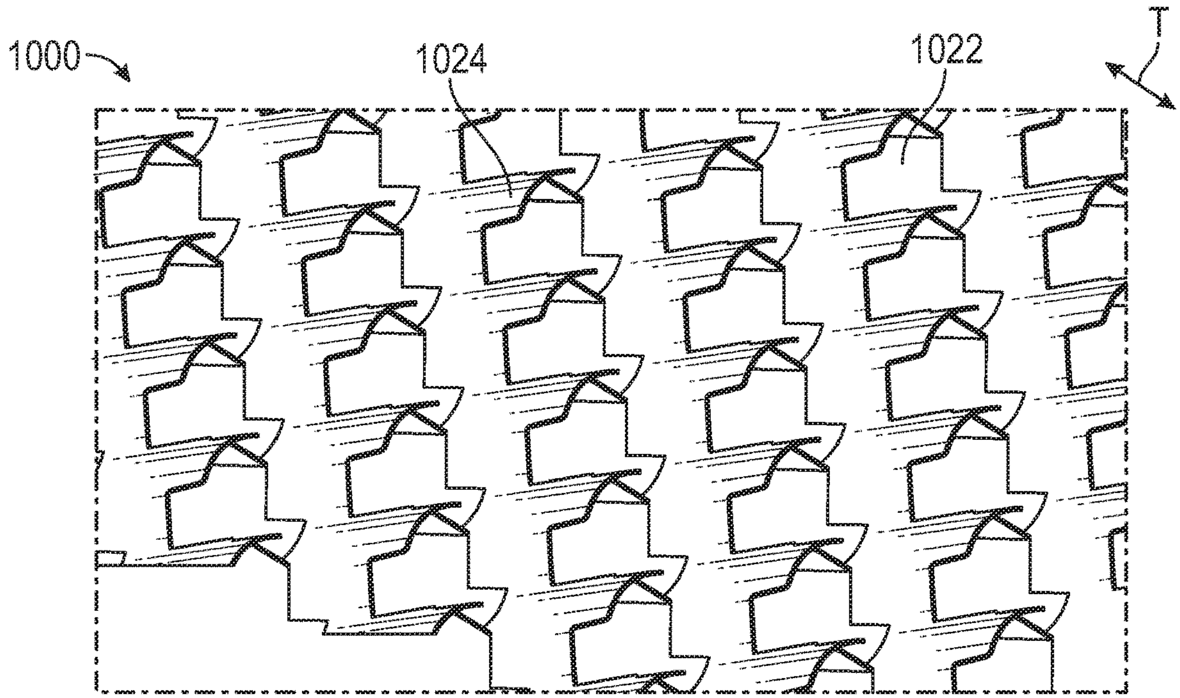
FIG. 10B is a perspective view drawing from a photograph of the pattern shown in FIG. 10A formed in a paper sheet and exposed to tension along the tension axis.
Figure 10C:
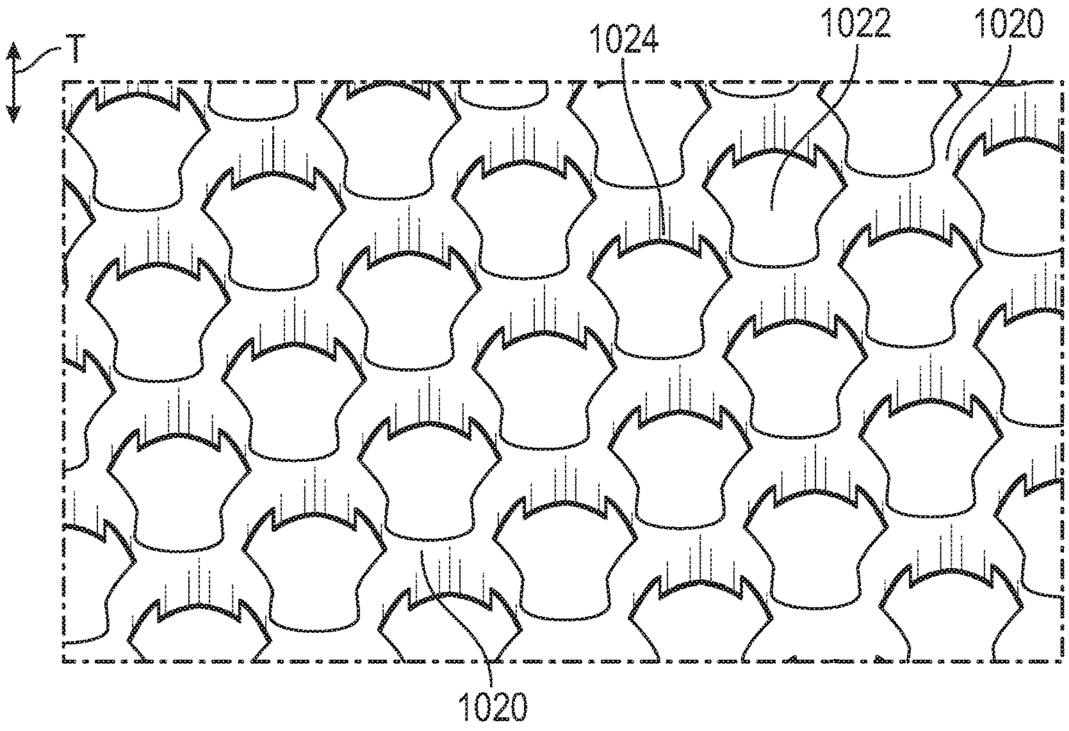
FIG. 10C is a nearly top view drawing from a photograph of the article of FIG. 10B when exposed to tension along the tension axis.
Figure 10D:
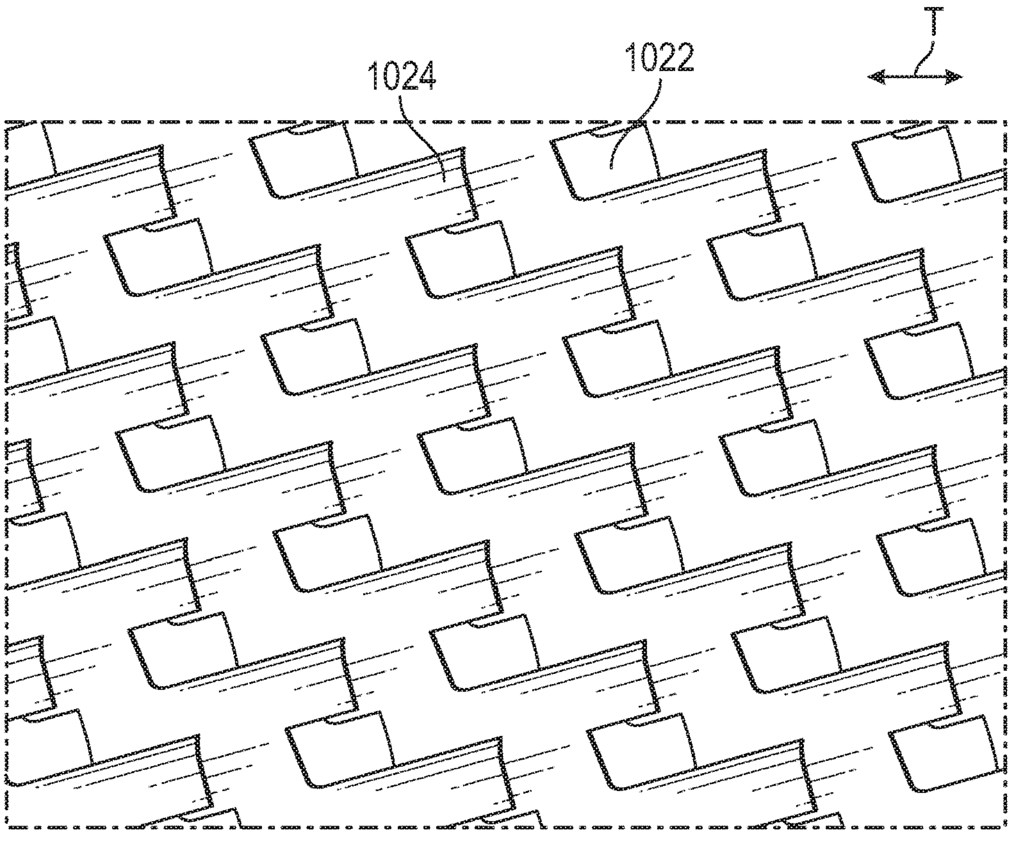
FIG. 10D is an elevated side view of the article shown in FIG. 10B.

FIGS. 10B-10D show the pattern of FIG. 10A formed in a sheet of paper and exposed to tension along the tension axis T. When material 1000 is tension activated or deployed along tension axis T, portions of material 1000 experiences tension and/or compression that causes the material to move out of the original plane of material 1000 in its pretensioned format. When exposed to tension along the tension axis, terminal ends 1014, 1016 experience compression and are drawn toward one another, causing a flap region 1050 of the material 1000 to move or buckle upward relative to the plane of the material 1000 in its pretensioned state (FIG. 10A), creating flap 1024. Portions of beams 1030 move or buckle downward relative to the plane of the material 1000 in its pretensioned state (FIG. 10A), forming an opening portion 1022. The material 1020 between adjacent slits 1010 in a row 1012 primarily experiences tension perpendicular to tension axis T. This region or area does not move substantially out of the original plane and instead remains substantially in plane as compared to the pretensioned form of FIG. 10A. These movements in material 1000 form a series of rectangular, scale-like protrusions, as seen in FIG. 10D.

When the tension-activated material 1000 is wrapped around an article or placed directly adjacent to itself, the flaps 1024 interlock with one another and/or opening portions 1022, to create an interlocking structure. Interlocking can be measured as stated in the interlocking test articulated above.

Figure 11A:
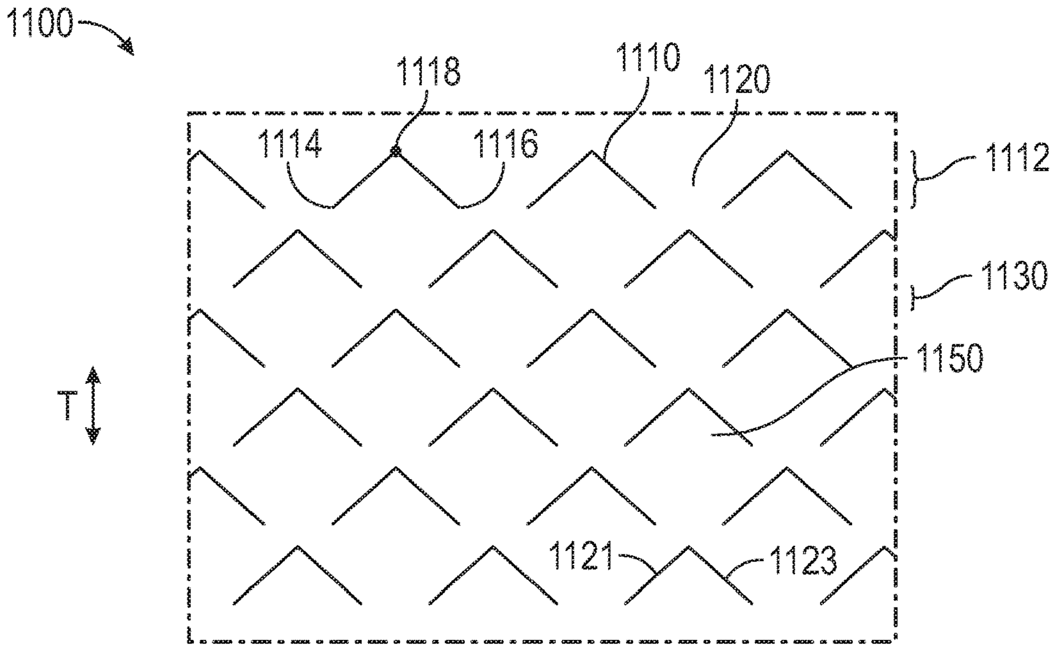
FIG. 11A is a top view schematic drawing of an exemplary single slit pattern.

Another exemplary embodiment of a single slit pattern is shown schematically in FIG. 11A. The single-slit pattern is formed in material 1100 and includes a plurality of slits 1110 that each include a first terminal end 1114, a second terminal end 1116, and a midpoint 1118. A plurality of individual slits 1110 are aligned to form rows 1112 that are generally perpendicular to tension axis T. Material 1120 is present between adjacent slits 1110 in a row 1112 that can be referred to as an axial beam. The material between directly adjacent rows 1112 of slits 1110 forms transverse beams 1130. In the exemplary embodiment of FIG. 11A, slits 1110 are not straight lines (like slits 110 of the slit pattern of FIGS. 1C and 2A). Instead, slits 1110 are generally v-shaped comprising a first portion 1121 that is generally at a 45 degree angle to tension axis T and that connects with second portion 1123 at a generally perpendicular angle. First and second portions 1121, 1123 connect at midpoint 1118.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row. The flap region 1150 is generally the area enclosed by the path of slit 1110 and the imaginary straight line between terminal ends 1114 and 1116.

Those of skill in the art will appreciate that many changes may be made to the pattern while still falling within the scope of the present disclosure. For example, the first and second portions 1121, 1123 can vary in length or angle relative to tension axis T. The first and second portions 1121, 1123 can intersect at an angle other than perpendicular. Alternatively, the slit length, row size or shape, and beam size or shape can vary. Those of skill in the art will also appreciate that the intersection between first and second portions 1121, 1123 can be rounded. Further, the degrees of offset or phase offset can vary from what is shown.

Figure 11B:
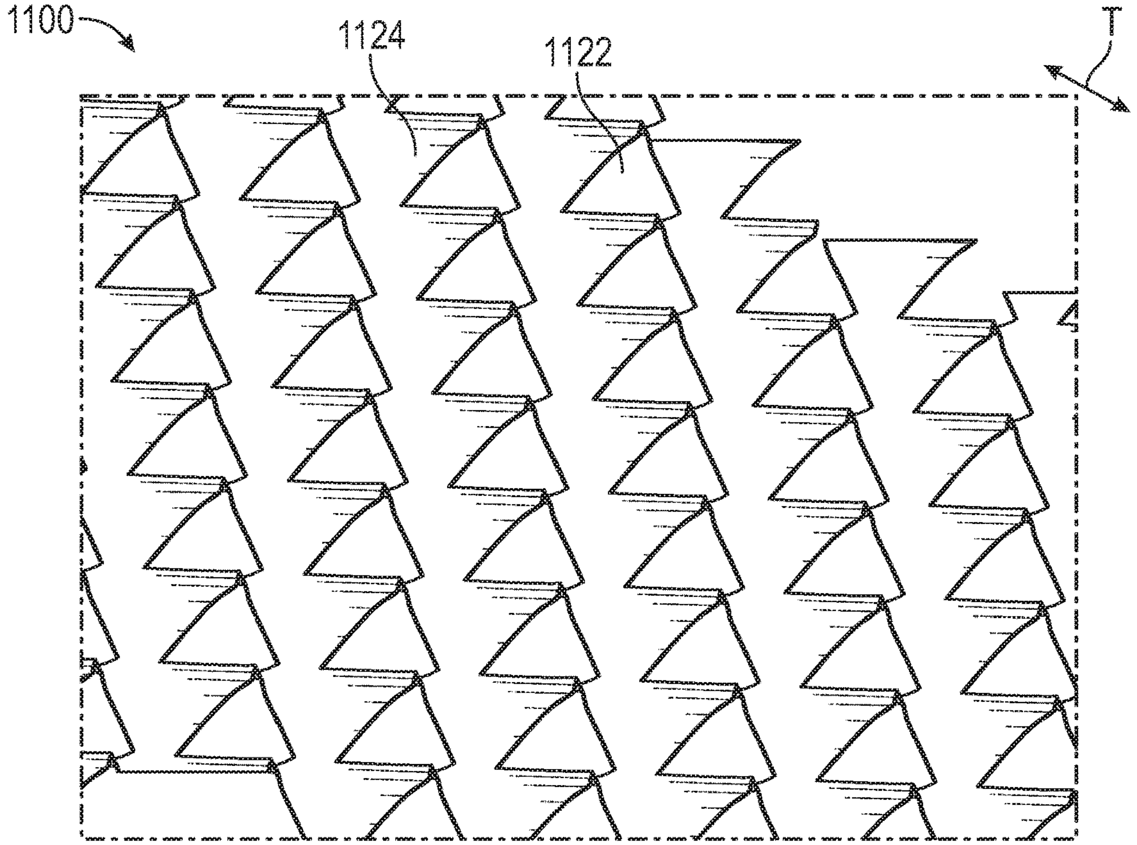
FIG. 11B is a perspective view drawing from a photograph of the pattern shown in FIG. 11A formed in a paper sheet and exposed to tension along the tension axis.
Figure 11C:
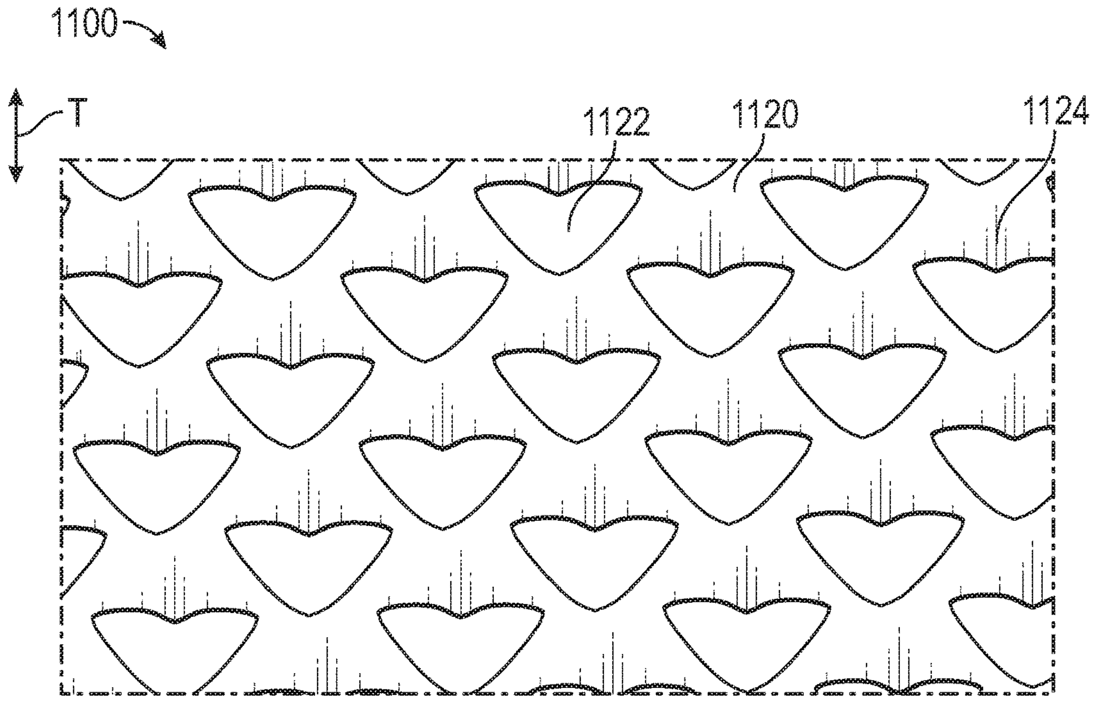
FIG. 11C is a nearly top view drawing from a photograph of the article of FIG. 11B when exposed to tension along the tension axis.
Figure 11D:
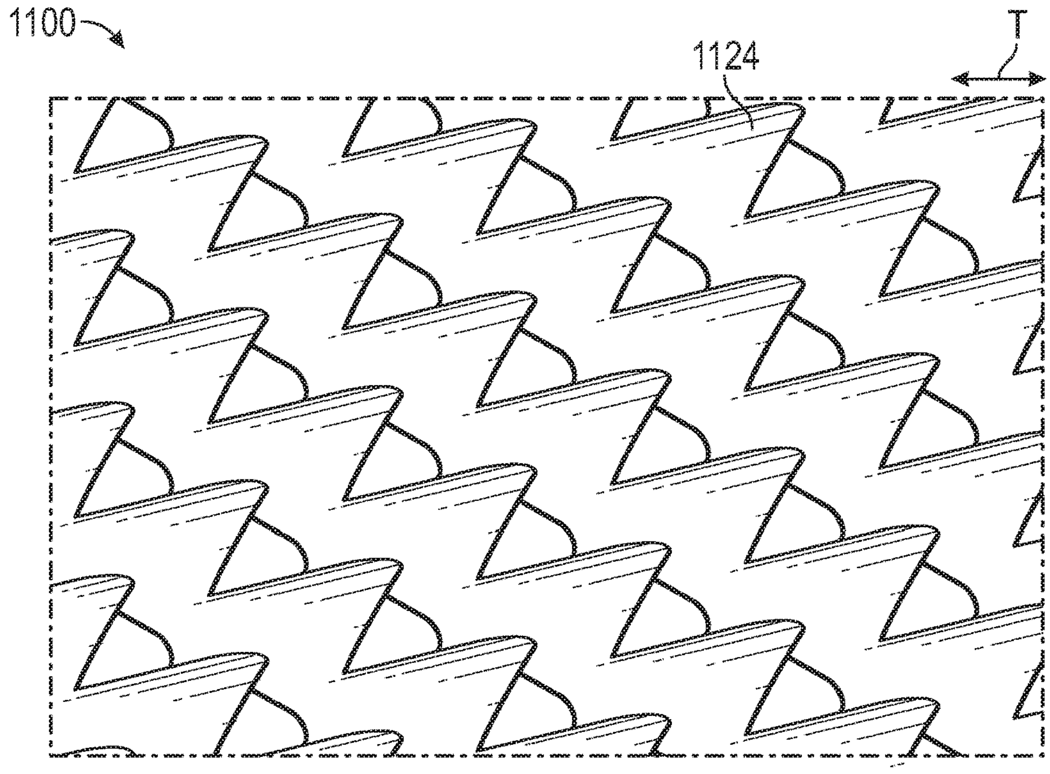
FIG. 11D is an elevated side view of the article shown in FIG. 11B.

FIGS. 11B-11D show the pattern of FIG. 11A formed in a sheet of paper and exposed to tension along the tension axis T. When material 1100 is tension activated or deployed along tension axis T, portions of material 1100 experience tension and/or compression that causes the material to move out of the original plane of material 1100 in its pretensioned format. When exposed to tension along the tension axis, terminal ends 1114, 1116 experience compression and are drawn toward one another, causing a flap region 1150 of the material 1100 to move or buckle upward relative to the plane of the material 1100 in its pretensioned state (FIG. 11A), creating flap 1124. Portions of transverse beams 1130 move or buckle downward relative to the plane of the material 1100 in its pretensioned state (FIG. 11A), forming an opening portion 1122. The material 1120 between adjacent slits 1110 in a row 1112 primarily experiences tension perpendicular to tension axis T. This region or area does not move substantially out of the original plane and instead bends slightly as compared to the pretensioned form of FIG. 11A. These movements in material 1100 form a series of pointed protrusions, as seen in FIG. 11D.

When the tension-activated material 1100 is wrapped around an article or placed directly adjacent to itself, the flaps 1124 interlock with one another and/or opening portions 1122, to create an interlocking structure. Interlocking can be measured as stated in the interlocking test articulated above.

Figure 12A:
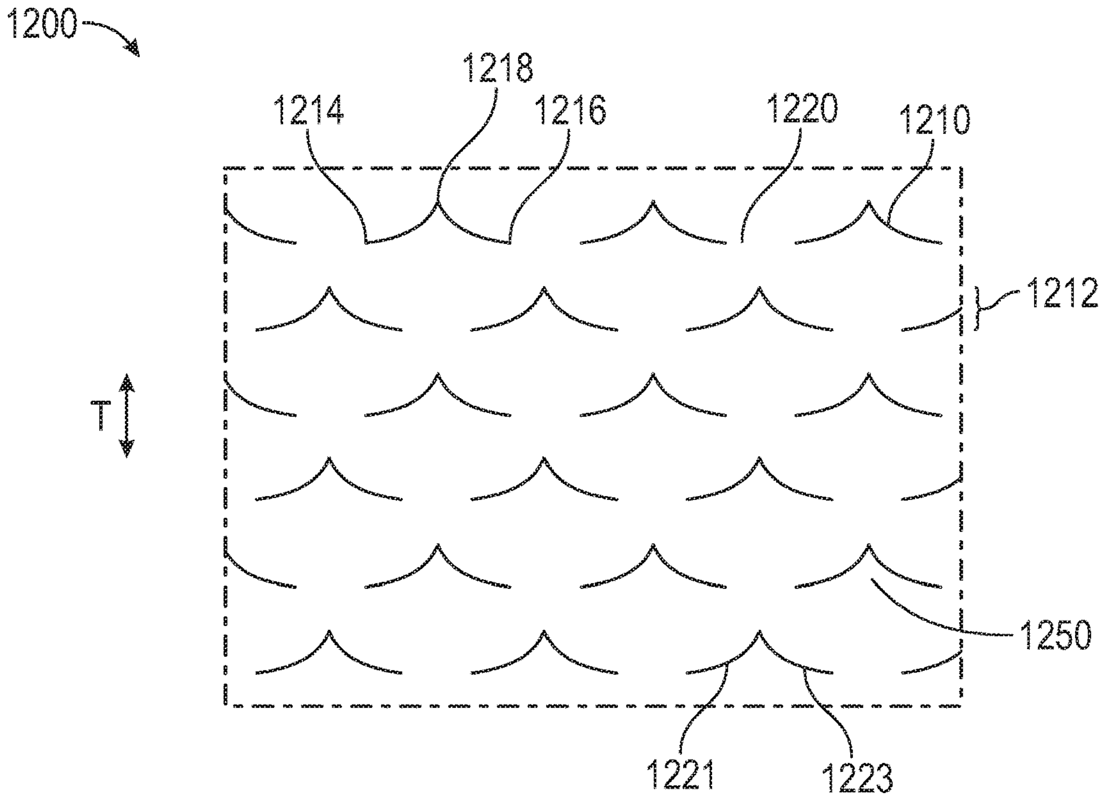
FIG. 12A is a top view schematic drawing of an exemplary single slit pattern.

Another exemplary embodiment of a single slit pattern is shown schematically in FIG. 12A. The single-slit pattern is formed in material 1200 and includes a plurality of slits 1210 that each include a first terminal end 1214, a second terminal end 1216, and a midpoint 1218. A plurality of individual slits 1210 are aligned to form rows 1212 that are generally perpendicular to tension axis T. Material 1220 is present between adjacent slits 1210 in a row 1212 that can be referred to as an axial beam. The material between directly adjacent rows 1212 of slits 1210 forms transverse beams 1230. In the exemplary embodiment of FIG. 12A, slits 1210 are not straight lines (like slits 110 of the slit pattern of FIGS. 1C and 2A). Instead, slits 1210 are generally v-shaped or cusp-shaped. However, in contrast to the v-shaped slits of FIG. 11A, slits 1210 comprise a curved first portion 1221 that is generally at a 45 degree angle to tension axis T and that connects with curved second portion 1223 at a generally oblique angle. First and second portions 1221, 1223 connect at midpoint 1218. The flap region 1250 is generally the area enclosed by the path of slit 1210 and the imaginary straight line between terminal ends 1214 and 1216.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. For example, the first and second portions 1221, 1223 can vary in length, curvature, shape, or angle relative to tension axis T. The first and second portions 1221, 1223 can intersect at angle other than oblique (e.g., acute or perpendicular). Alternatively, the slit length, row size or shape, and beam size or shape can vary. Those of skill in the art will also appreciate that the intersection between first and second portions 1221, 1223 can be rounded. Further, the degrees of offset or phase offset can vary from what is shown.

Figure 12B:
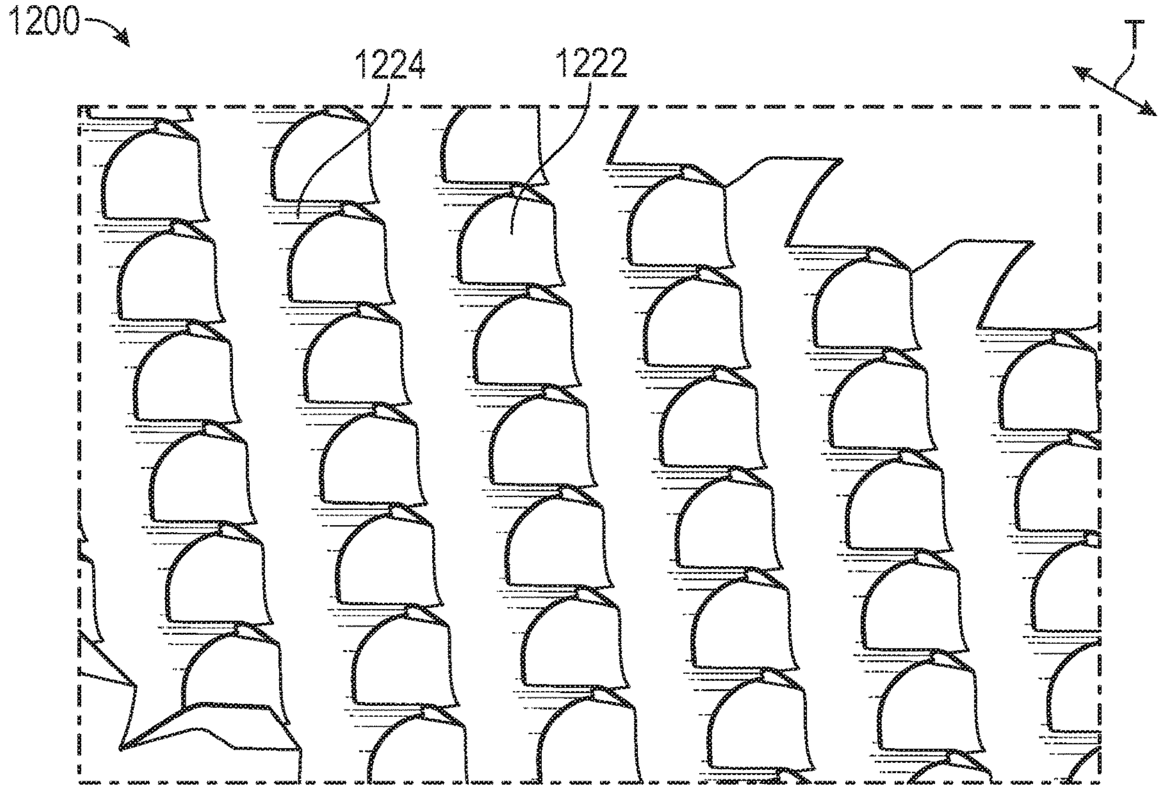
FIG. 12B is a perspective view drawing from a photograph of the pattern shown in FIG. 12A formed in a paper sheet and exposed to tension along the tension axis.
Figure 12C:
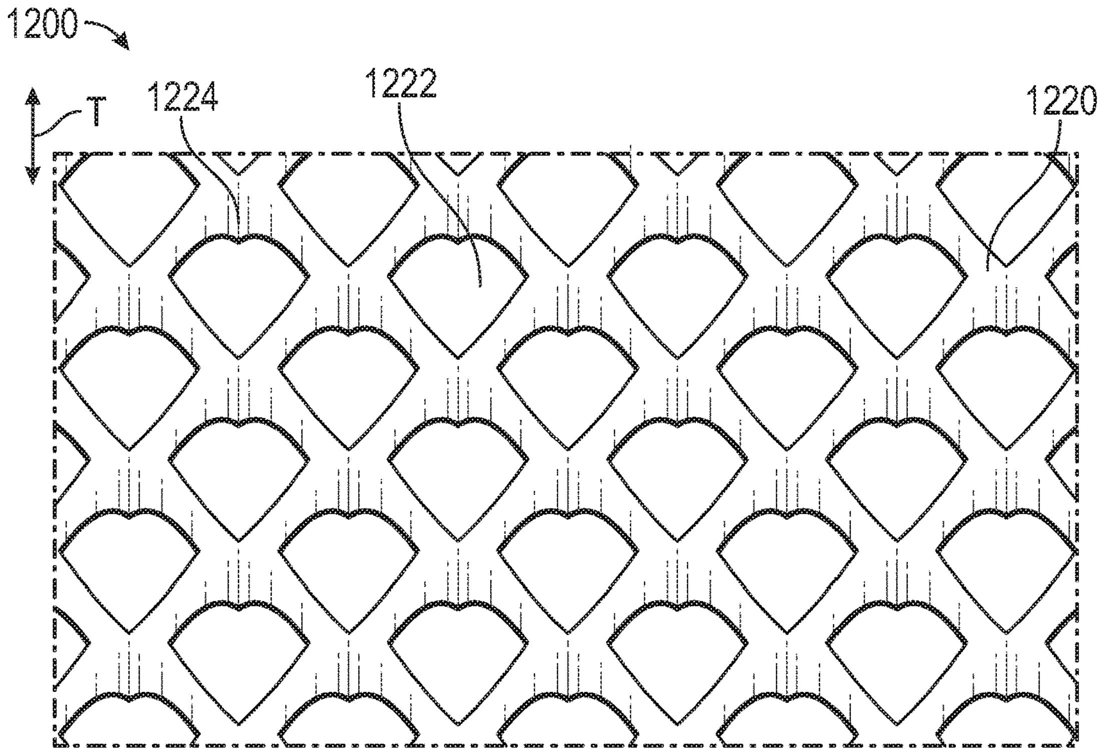
FIG. 12C is a nearly top view drawing from a photograph of the article of FIG. 12B when exposed to tension along the tension axis.
Figure 12D:
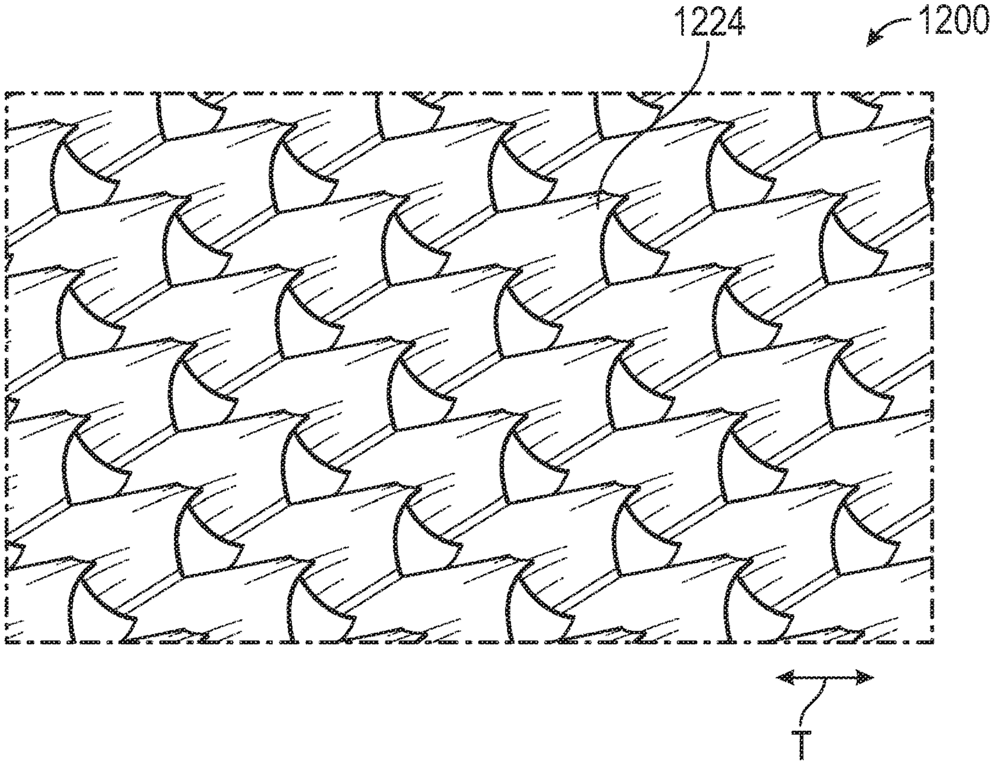
FIG. 12D is an elevated side view of the article shown in FIG. 12B.

FIGS. 12B-12D show the pattern of FIG. 12A formed in a sheet of paper and exposed to tension along the tension axis T. When material 1200 is tension activated or deployed along tension axis T, portions of material 1200 experience tension and/or compression that causes the material to move out of the original plane of material 1200 in its pretensioned format. When exposed to tension along the tension axis, terminal ends 1214, 1216 experience compression and are drawn toward one another, causing flap region 1250 of the material 1200 to move or buckle upward relative to the plane of the material 1200 in its pretensioned state (FIG. 12A), creating flap 1224. Portions of beams 1230 move or buckle downward relative to the plane of the material 1200 in its pretensioned state (FIG. 12A), forming an opening portion 1222. The material 1220 between adjacent slits 1210 in a row 1212 primarily experiences tension perpendicular to tension axis T. This region or area does not move substantially out of the original plane and instead bends slightly as compared to the pretensioned form of FIG. 12A. These movements in material 1200 form a series of cusp-pointed protrusions, as seen in FIG. 12D.

When the tension-activated material 1200 is wrapped around an article or placed directly adjacent to itself, the flaps 1224 interlock with one another and/or opening portions 1222, to create an interlocking structure. Interlocking can be measured as stated in the interlocking test articulated above.

Figure 13A:
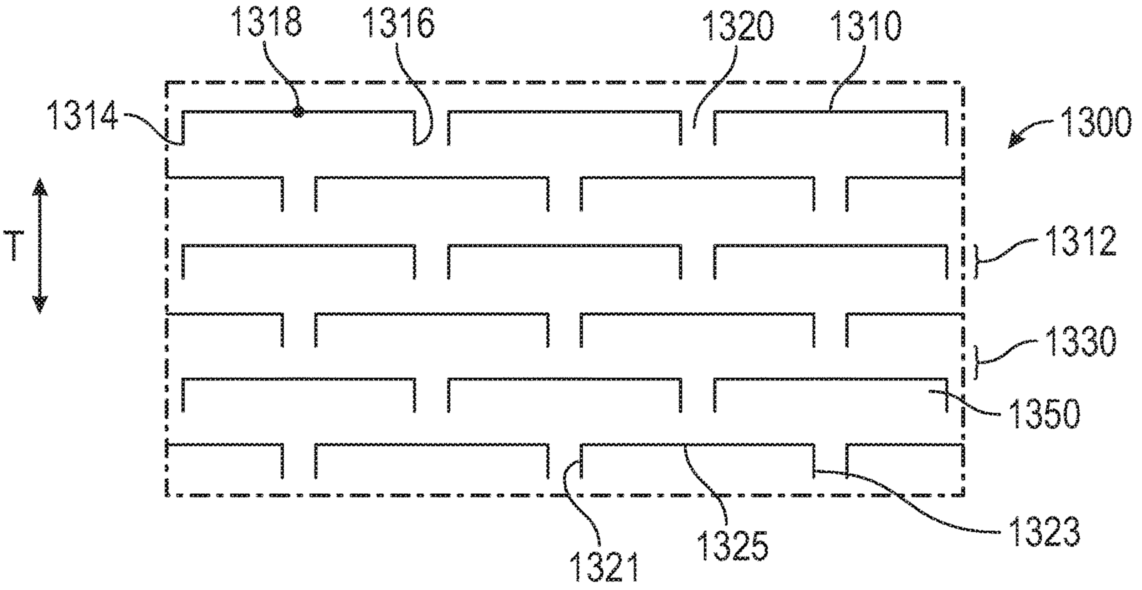
FIG. 13A is a top view schematic drawing of an exemplary single slit pattern.

Another exemplary embodiment of a single slit pattern is shown schematically in FIG. 13A. The single-slit pattern of FIG. 13A is substantially similar to that of FIG. 5A except that the slit aspect ratios vary between the embodiments. Specifically, in the slit pattern of FIG. 13A, the (1) length of the slits differs and (2) spacing between rows (the size of the beams) differs. More specifically, in the pattern of FIG. 13A, slits 1310 are formed in material 1300. Slits 1310 each include a first terminal end 1314, a second terminal end 1316, and a midpoint 1318. A plurality of individual slits 1310 are aligned to form rows 1312 that are generally perpendicular to tension axis T. Material 1320 is present between adjacent slits 1310 in a row 1312 that can be referred to as an axial beam. The material between directly adjacent rows 1312 of slits 1310 forms transverse beams 1330. In the exemplary embodiment of FIG. 13A, slits 1310 are not straight lines (like slits 110 of the slit pattern of FIGS. 1C and 2A) but instead include two generally axial portions 1321, 1323 that are generally parallel to the tension axis T and are connected to a generally horizontal portion 1325 that is generally perpendicular to the tension axis T. Slits 1310 are generally u-shaped with a generally perpendicular intersection angle between the two generally axial portions 1321, 1323 and the generally horizontal portion 1325. The flap region 1350 is generally the area enclosed by the path of slit 1310 and the imaginary straight line between terminal ends 1314 and 1316.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary. For example, in some embodiments, the shape is u-shaped with more rounded edges than is shown in FIG. 13A. Alternatively, the slit length, row size or shape, and beam size or shape can vary. Further, the degrees of offset or phase offset can vary from what is shown.

Figure 13B:
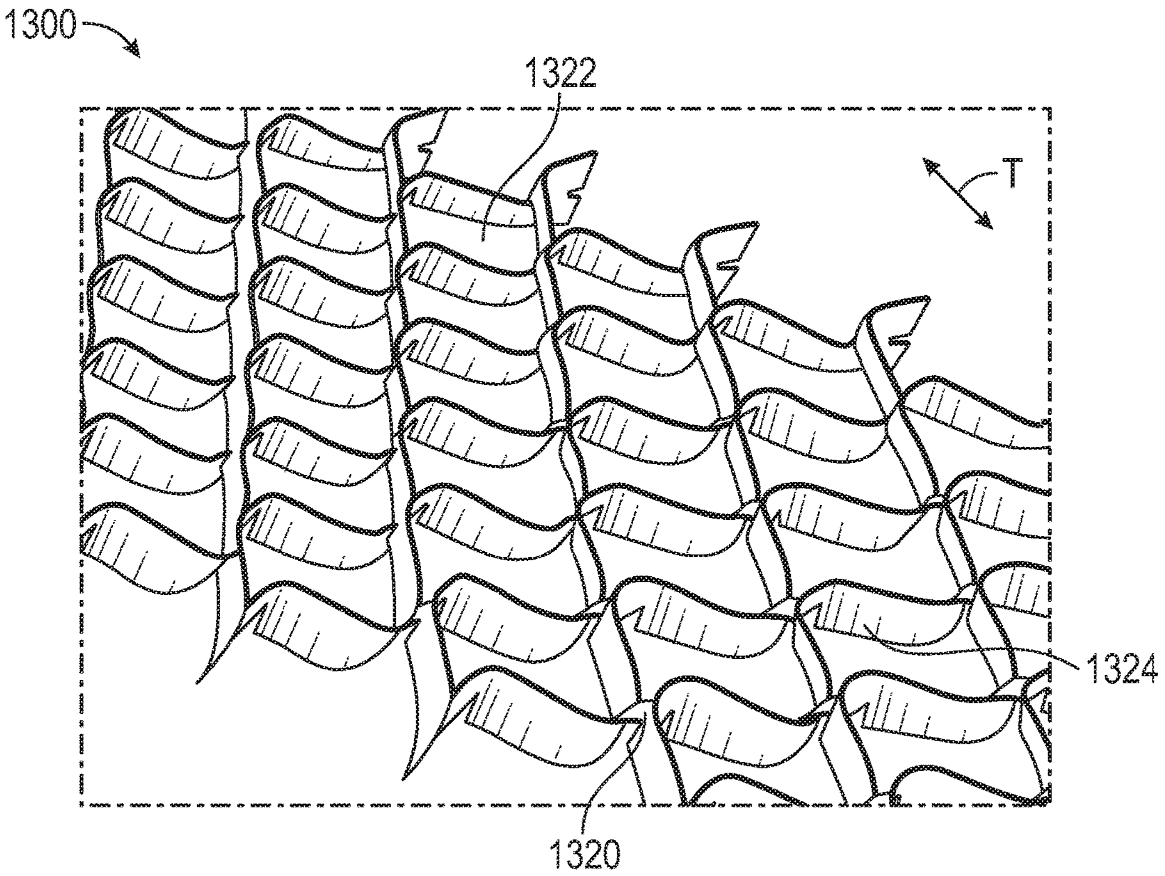
FIG. 13B is a perspective view drawing from a photograph of the pattern shown in FIG. 13A formed in a paper sheet and exposed to tension along the tension axis.
Figure 13C:
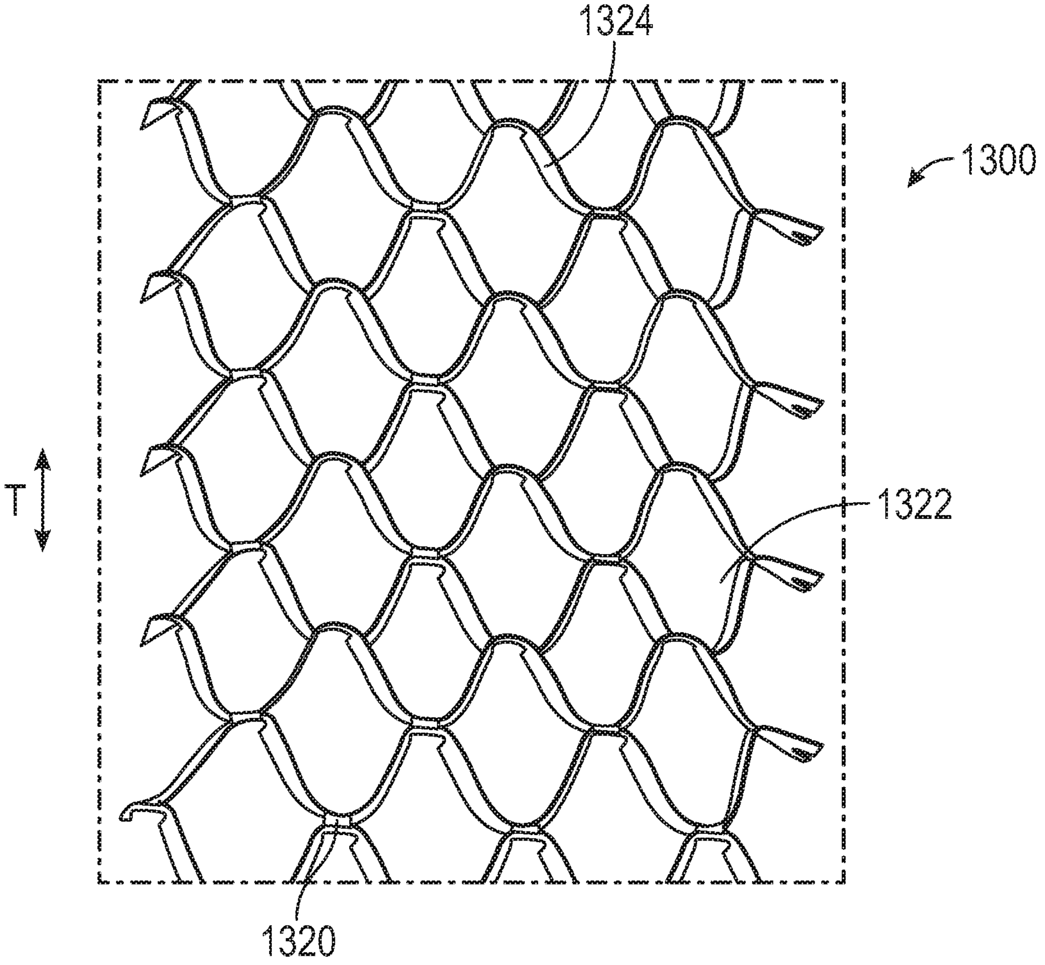
FIG. 13C is a nearly top view drawing from a photograph of the article of FIG. 13B when exposed to tension along the tension axis.
Figure 13D:
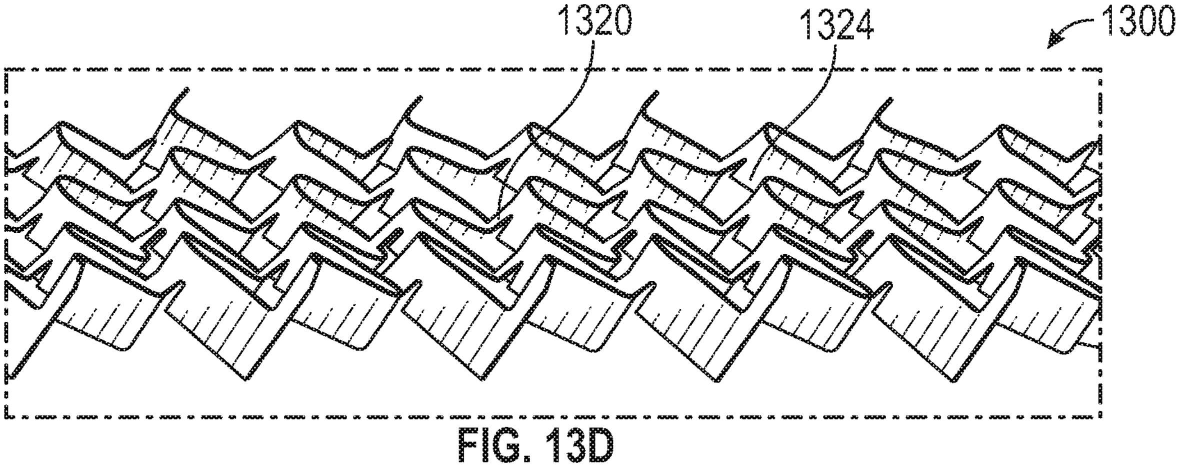
FIG. 13D is an elevated side view of the article shown in FIG. 13B.

FIGS. 13B-13D show the pattern of FIG. 13A formed in a sheet of paper and exposed to tension along the tension axis T. When material 1300 is tension activated or deployed along tension axis T, portions of material 1300 experiences tension and/or compression that causes the material to move out of the original plane of material 1300 in its pretensioned format. When exposed to tension along the tension axis, terminal ends 1314, 1316 experience compression and are drawn toward one another, causing a flap region 1350 of the material 1300 to move or buckle upward relative to the plane of the material 1300 in its pretensioned state (FIG. 13A), creating flap 1324. Portions of beams 1330 move or buckle downward relative to the plane of the material 1300 in its pretensioned state (FIG. 13A), forming an opening portion 1322. The material 1320 between adjacent slits 1310 in a row 1312 primarily experiences tension perpendicular to tension axis T. This region or area does not move substantially out of the original plane and instead bends slightly as compared to the pretensioned form of FIG. 13A. These movements in material 1300 form a series of curved protrusions, as seen in FIG. 13D. Because the "rectangular" shaped slit 1310 is longer than that slit 510 of FIG. 5A, flap 1324 of the protrusion will tend to bend or extend farther out of plane, creating a larger opening portion 1322. The overall resulting structure can form a more out of plane structure than the embodiment of FIG. 5A-5D. The enhanced out of plane structure can, for example, result in greater interlocking.

When the tension-activated material 1300 is wrapped around an article or placed directly adjacent to itself, the flaps 1324 interlock with one another and/or opening portions 1322, to create an interlocking structure. Interlocking can be measured as stated in the interlocking test articulated above.

Figure 14A:
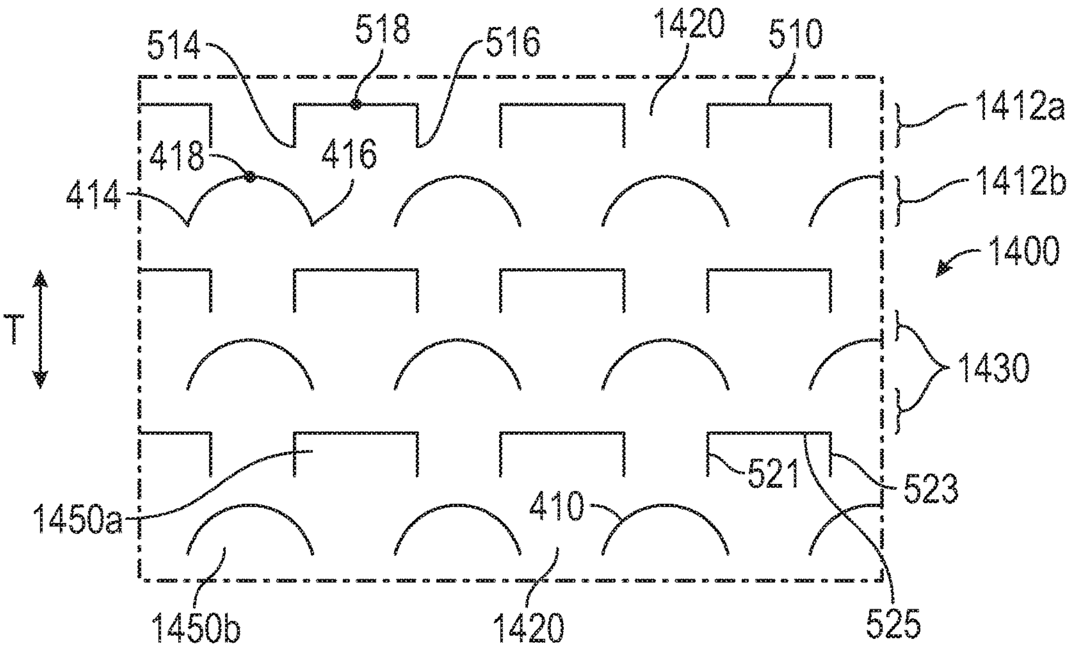
FIG. 14A is a top view schematic drawing of an exemplary single slit pattern.

Another exemplary embodiment of a single slit pattern is shown schematically in FIG. 14A. The pattern of FIG. 14A shows that differing rows can have different shaped slits. In other words, the slits in a single row can all be the same but the slit shape or size in differing rows (e.g, directly adjacent rows) can vary.

With specific reference to the implementation of this general concept into an example, the single-slit pattern of FIG. 14A includes a first set of rows 1412*a* that include a first slit shape and a second set of rows 1412*b* that includes a second slit shape. The slit shape in the first set of rows 1412*a* is substantially similar to that of FIG. 5A, whose description above is repeated herein. The slit shape in the second set of rows 1412*b* is substantially similar to that of FIG. 4A, whose description above is repeated herein. Material 1420 is present between adjacent slits 510 or 410 in a row 1412 that can be referred to as an axial beam. The material between directly adjacent rows 1412 of slits 1410 forms transverse beams 1430. The flap region 1450 is generally the area enclosed by the path of slits 410, 510, respectively, and the imaginary straight line between terminal ends 414, 416 and 514, 516, respectively.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary. Further, any slit shapes can be used. Further, the pattern can alternate in 2 rows, 3 rows, 4 rows, etc. Alternatively, the slit length, row size or shape, and beam size or shape can vary. Further, the degrees of offset or phase offset can vary from what is shown.

Figure 14B:
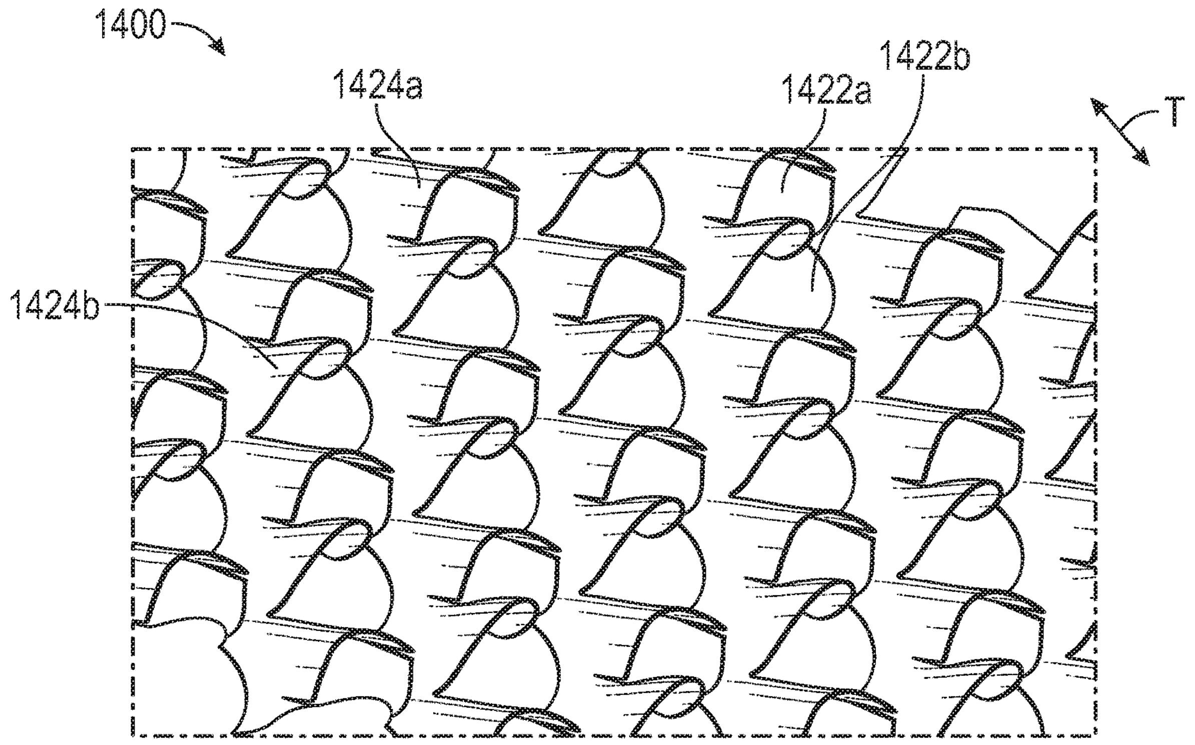
FIG. 14B is a perspective view drawing from a photograph of the pattern shown in FIG. 14A formed in a paper sheet and exposed to tension along the tension axis.
Figure 14C:
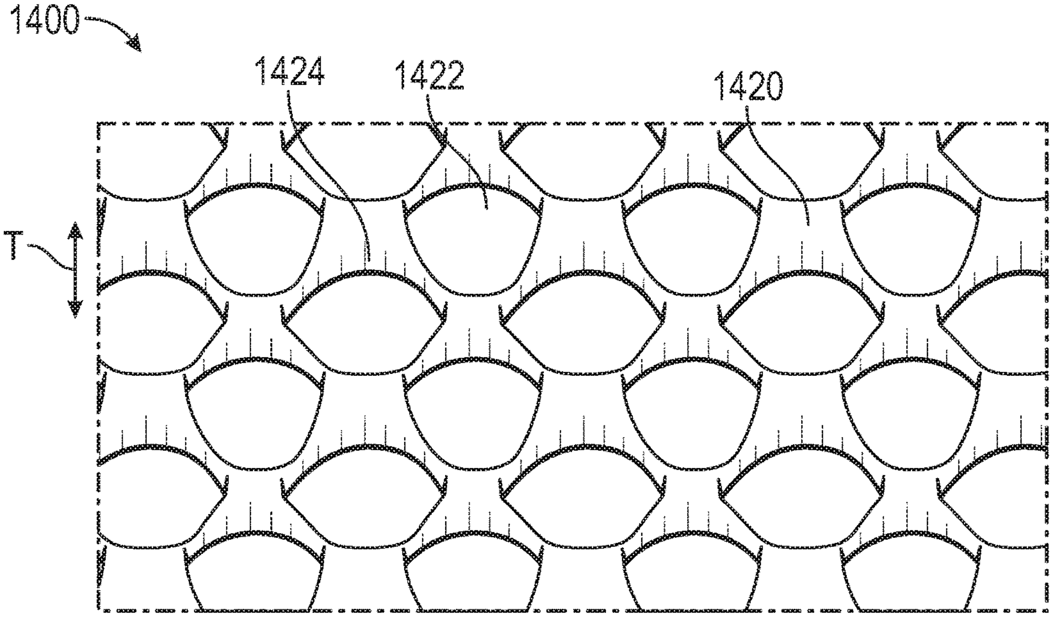
FIG. 14C is a nearly top view drawing from a photograph of the article of FIG. 14B when exposed to tension along the tension axis.
Figure 14D:
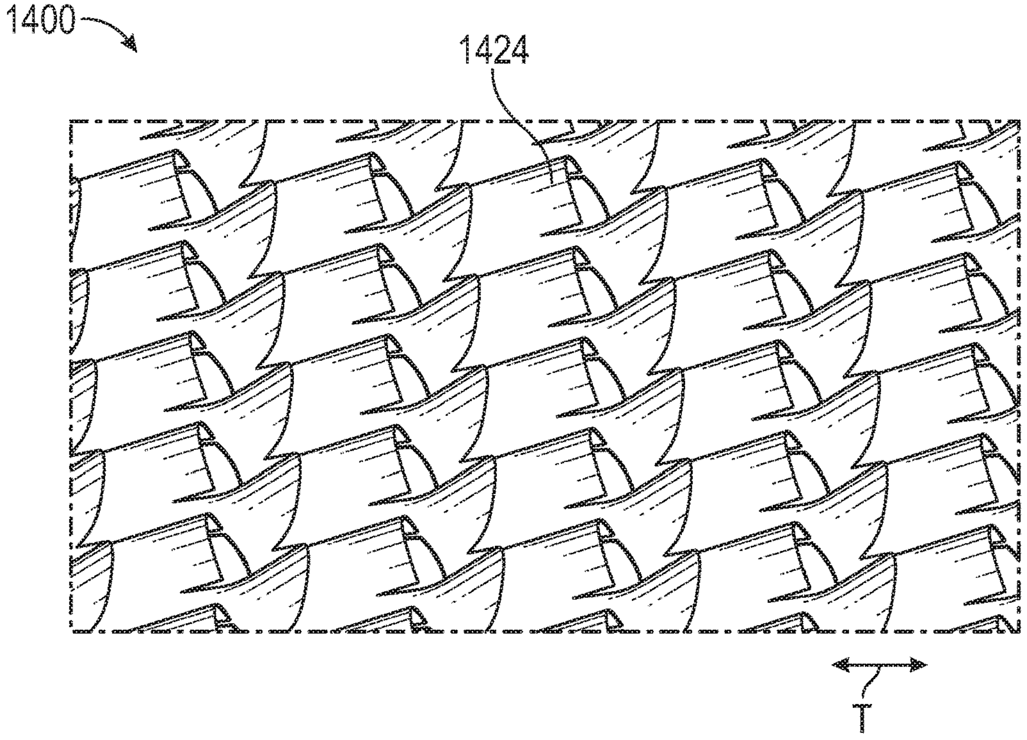
FIG. 14D is an elevated side view of the article shown in FIG. 14B.

FIGS. 14B-14D show the pattern of FIG. 14A formed in a sheet of paper and exposed to tension along the tension axis T. When material 1400 is tension activated or deployed along tension axis T, portions of material 1400 experiences tension and/or compression that causes the material to move out of the original plane of material 1400 in its pretensioned format. When exposed to tension along the tension axis, terminal ends 514, 516 and 414, 416 experience compression and are drawn toward one another, causing a flap regions 1450*a* (corresponding to first slit shape) and 1450*b* (corresponding to second slit shape) of the material 1400 to move or buckle upward relative to the plane of the material 1400 in its pretensioned state (FIG. 14A), creating flaps 1424*a* and 1424*b*. Portions of beams 1430 move or buckle downward relative to the plane of the material 1400 in its pretensioned state (FIG. 14A), forming an opening portions 1422*a* (corresponding to the first slit shape) and 1422*b* (corresponding to the second slit shape). The material 1420 between adjacent slits 510, 410 in a row 1412*a*, 1412*b* primarily experiences tension perpendicular to tension axis T. This region or area does not move substantially out of the original plane and instead bends slightly as compared to the pretensioned form of FIG. 14A. These movements in material 1400 form an alternating series of curved and rectangular protrusions, as seen in FIG. 14D.

When the tension-activated material 1400 is wrapped around an article or placed directly adjacent to itself, the flaps 1424*a*, 1424*b* interlock with one another and/or opening portions 1422*a*, 1422*b*, to create an interlocking structure. Interlocking can be measured as stated in the interlocking test articulated above.

While the embodiment of FIGS. 14A-14D shows that the slits 510, 410 are the same in a single row and directly adjacent rows vary, in some embodiments (not shown) the slits within a row may vary. In other words, the slits within a single row may have differing shapes, sizes, or lengths. In such embodiments, adjacent rows may be the same or may differ.

Figure 15A:
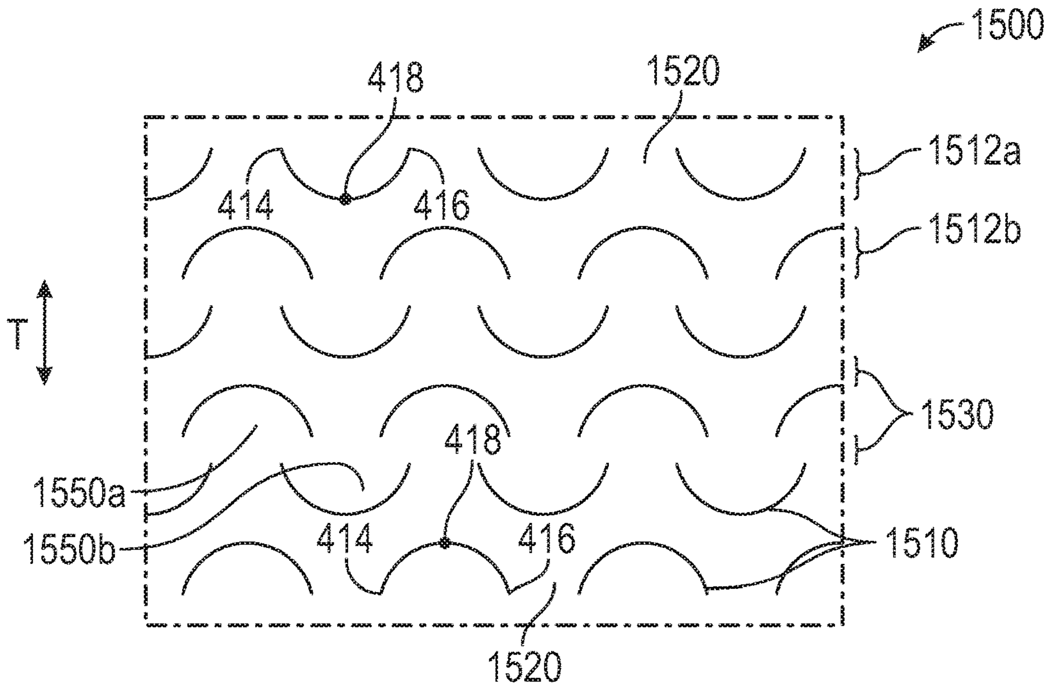
FIG. 15A is a top view schematic drawing of an exemplary single slit pattern.

Another exemplary embodiment of a single slit pattern is shown schematically in FIG. 15A. The pattern of FIG. 15A shows that differing rows can have differently positioned slits. In other words, the slits in a single row all have the same position, but the slit position varies in differing rows (e.g. directly adjacent rows).

With specific reference to the implementation of this general concept into an example, the single-slit pattern of FIG. 15A includes a first set of rows 1512*a* that include slits 1510 of a first shape and position and a second set of rows 1512*b* that includes the same slit shape but the slits 1510 are positioned differently (in this case, inverted). The slit shape in both the first set of rows 1512*a* and the second set of rows 1512*b* is substantially similar to that of FIG. 4A, whose description above is repeated herein. Material 1520 is present between adjacent slits 1510 in a row 1512 and can be referred to as an axial beam. The material between directly adjacent rows 1512 of slits 1510 forms transverse beams 1530. The flap region 1550 is generally the area enclosed by the path of slit 1510 and the imaginary straight line between terminal ends 414 and 416.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear. However, a region of each of the slits between the terminal ends are not colinear with the imaginary straight line connecting the slit terminal ends in each row.

Those of skill in the art will appreciate that many changes may be made to the pattern while still falling within the scope of the present disclosure. Those of skill in the art will appreciate that the shape and slit length can vary. Further, any slit shapes can be used. Further, the pattern can alternate in 2 rows, 3 rows, 4 rows, etc. Alternatively, the slit length, row size or shape, and beam size or shape can vary. Further, the degrees of offset or phase offset can vary from what is shown.

Figure 15B:
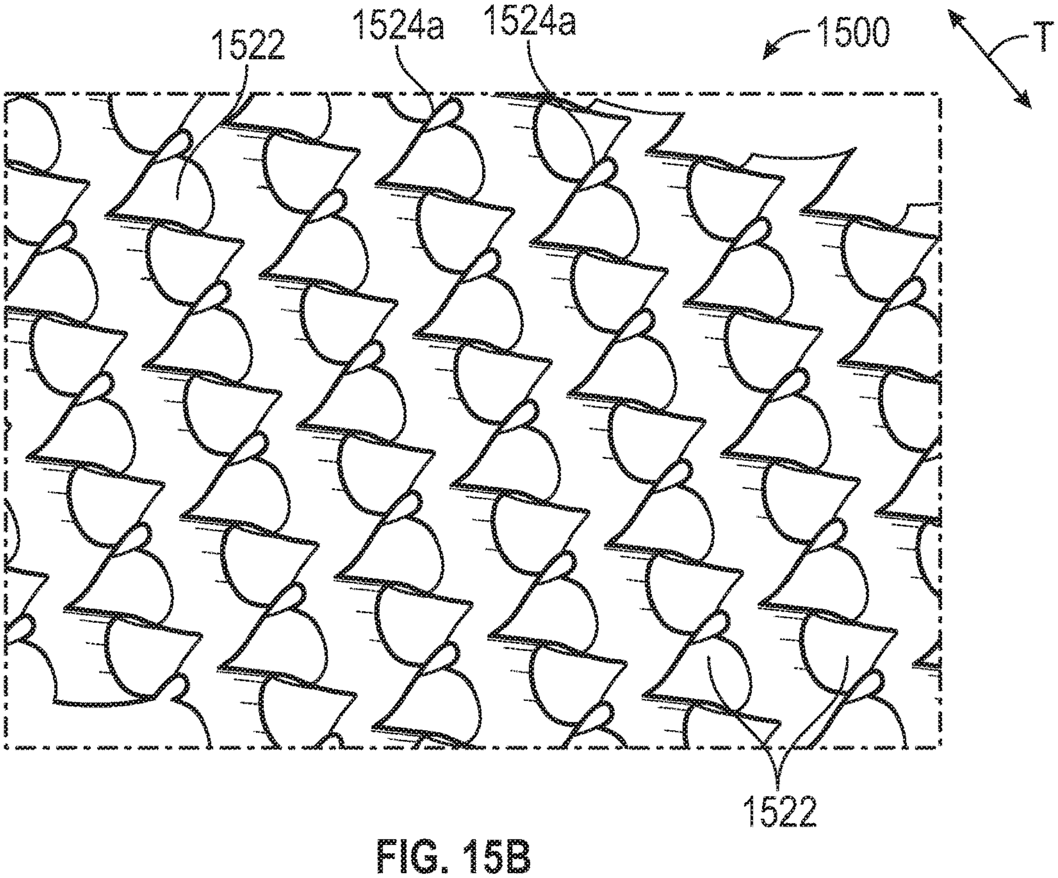
FIG. 15B is a perspective view drawing from a photograph of the pattern shown in FIG. 15A formed in a paper sheet and exposed to tension along the tension axis.
Figure 15C:
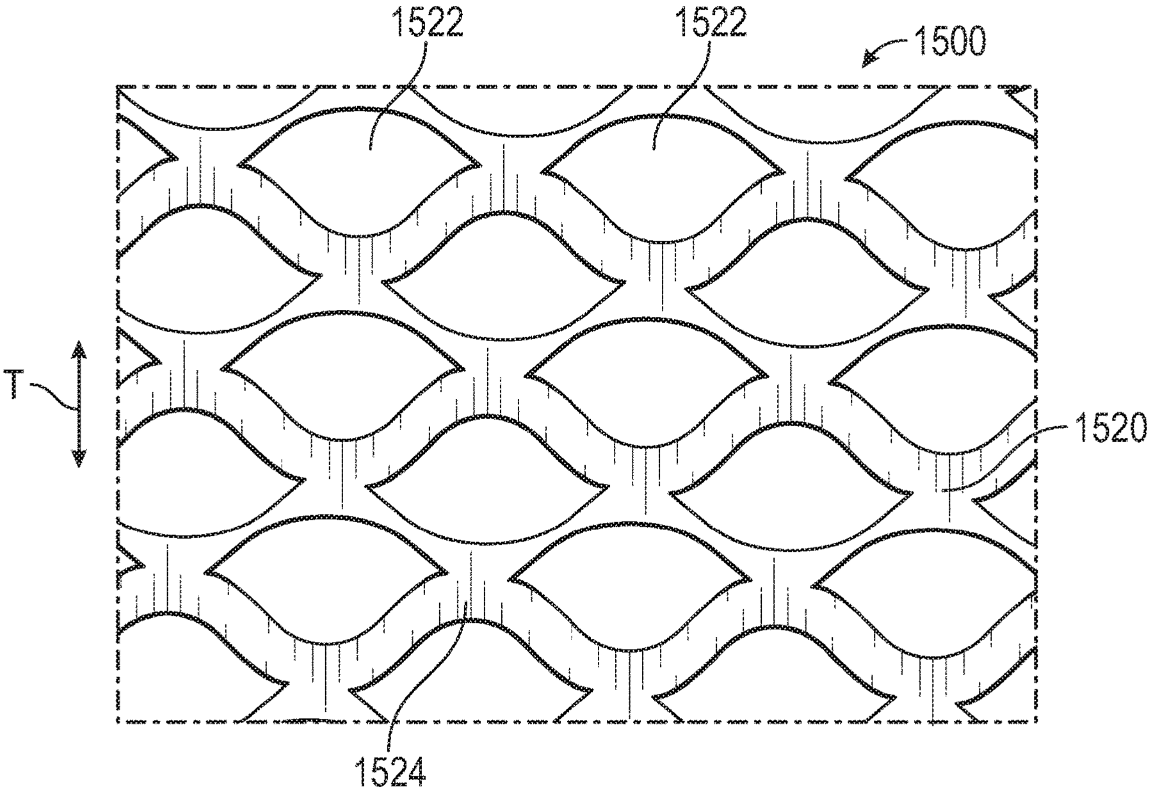
FIG. 15C is a nearly top view drawing from a photograph of the article of FIG. 15B when exposed to tension along the tension axis.
Figure 15D:
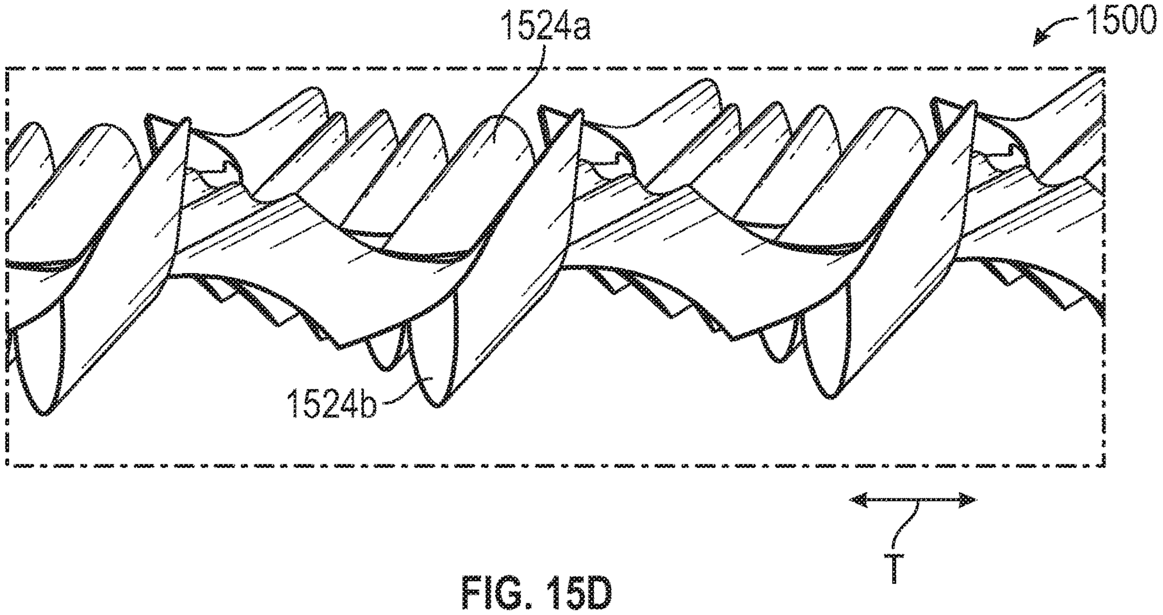
FIG. 15D is an elevated side view of the article shown in FIG. 15B.

FIGS. 15B-15D show the pattern of FIG. 15A formed in a sheet of paper and exposed to tension along the tension axis T. When material 1500 is tension activated or deployed along tension axis T, portions of material 1500 experiences tension and/or compression that causes the material to move out of the original plane of material 1500 in its pretensioned format. When exposed to tension along the tension axis, terminal ends 414, 416 experience compression and are drawn toward one another, causing a flap portion 1550*a* of the material 1500 to move or buckle upward relative to the plane of the material 1500 in its pretensioned state (FIG. 15A), at the same time, the compression causes the flap region 1550*b* of the material 1500 to move or buckle downward relative to the plane of the material 1500 in its pretensioned state. These movements create flaps 1524*a* and 1524*b*. Portions of beams 1530 move or buckle upward or downward relative to the plane of the material 1500 in its pretensioned state (FIG. 15A), forming an opening portion 1522. The material 1520 between adjacent slits 1510 in a row 1512 primarily experiences tension perpendicular to tension axis T. This region or area does not move substantially out of the original plane and instead bends slightly as compared to the pretensioned form of FIG. 15A. These movements in material 1500 form material or article with alternating rows of curved protrusions pointing in opposite directions, as seen in FIG. 15D.

When the tension-activated material 1500 is wrapped around an article or placed directly adjacent to itself, the flaps 1524 interlock with one another and/or opening portions 1522, to create an interlocking structure. Interlocking can be measured as stated in the interlocking test articulated above.

While the embodiment of FIGS. 15A-15D shows that the slits 1510 are the same in a row and rows vary, in some embodiments (not shown) the slits within a row may vary. In other words, the slits within a row may have differing position (e.g. inversion), shapes, sizes, or lengths. In such embodiments, the rows may be the same or may differ.

Figure 16A:
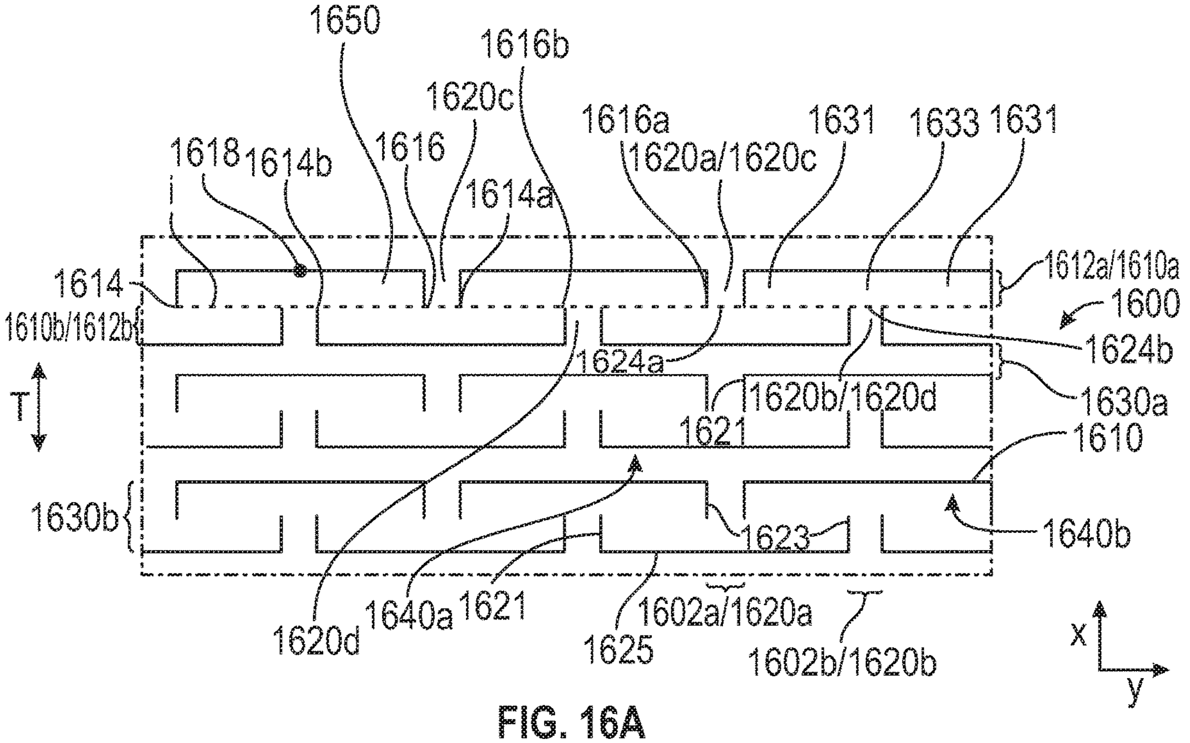
FIG. 16A is a top view schematic drawing of an exemplary single slit pattern.

Another exemplary embodiment of a single slit pattern in a material 1600 is shown schematically in FIG. 16A. Similar to FIGS. 15A-15D, FIGS. 16A-16D show patterns and articles in which differing rows of slits have differently positioned slits. In other words, the slits in a single row are all in the same position, but the slit position varies in differing rows (e.g, directly adjacent rows). The material 1600 is a sheet defining a plane having an axial direction x (which is the vertical direction relative to the figure) that is parallel to a tension axis T and a transverse direction y (which is the horizontal direction relative to the figure) that is orthogonal to the axial direction x. The material 1600 defines the x-y plane in a pretensioned state; that is to say, prior to application of tension along the tension axis T.

The single-slit pattern of FIG. 16A includes a first set of rows 1612*a* that include a first plurality of slits 1610*a* extending across the sheet in the transverse direction y, where the first plurality of slits 1610*a* have a first shape and position. The first plurality of slits 1610*a* is a repeating pattern of slits. The first set of rows 1612*a* alternate with a second set of rows 1612*b* along the axial length of the sheet. Each of the second set of rows 1612*b* is defined by a second plurality of slits 1610*b* extending across the sheet in the transverse direction y. The second plurality of slits 1610*b* is a repeating pattern of slits. The second set of rows 1612*b* includes slits having the same slit shape but the slits 1610 are positioned differently (in this case, inverted and axially offset). Slits 1610 each include a first terminal end 1614, a second terminal end 1616, and a midpoint 1618.

The first terminal end 1614*a* of each slit in the first plurality of slits 1610*a* is defined by a first terminal end segment 1621 (that is a first axial portion 1621, in the current example). The first terminal end segment 1621 of each slit in the first plurality of slits 1610*a* intersects an imaginary line i connecting the terminal ends 1614*b*, 1616*b* of a first slit in the second plurality of slits 1610*b*. The first terminal end 1614*a* of each slit in the first plurality of slits 1610*a* is between the terminal ends 1614*b*, 1616*b* of a first slit in the second plurality of slits 1610*b* in each of the axial and transverse directions. In this particular example, the first terminal end 1614*a* of each slit in the first plurality of slits 1610*a* is aligned with the imaginary line i. Stated differently, the first terminal end 1614*a* of each slit in the first plurality of slits 1610*a* is aligned with the terminal ends 1614*b*, 1616*b* of the first slit in the second plurality of slits 1610*b* along an axis (overlapping with imaginary line i) extending in the transverse direction y.

The second terminal end 1616*a* of each slit in the first plurality of slits 1610*a* is defined by a second terminal end segment 1623 (that is a second axial portion 1623, in the current example). The second terminal end segment 1623 of each of the slits in the first plurality of slits 1610*a* is aligned with an imaginary line i connecting the terminal ends 1614*b*, 1616*b* of a second slit in the second plurality of slits 1610*b*. In this example, the second terminal end 1616*a* of each of the slits in the first plurality of slits 1610*a* is between the terminal ends 1614*b*, 1616*b* of a slit in the second plurality of slits 1610*b* in each of the axial and transverse directions. In particular, the second terminal end 1616*a* of each slit in the first plurality of slits 1610*a* is aligned with the terminal ends 1614*b*, 1616*b* of a slit in the second plurality of slits 1610*b* in each of the axial and transverse directions. In various embodiments, the first slit and the second slit in the second plurality of slits 1610*b* are adjacent slits.

A plurality of individual slits 1610 are aligned to form rows 1612 that are generally perpendicular to the tension axis T. Material 1620 is present between adjacent slits 1610 in a row 1612 forming beams 1620 that extend generally axially. The material between directly adjacent rows 1612 of slits 1610 forms transverse beams 1630. Slits 1610 are not straight lines (like slits 110 of the slit pattern of FIGS. 1A and 2A) but instead include two generally axial portions 1621, 1623 that are generally parallel to the tension axis T and are connected to a generally transverse portion 1625 that is generally perpendicular to the tension axis T. The first terminal end 1614 is along a first axial portion 1621 and the second terminal end 1616 is along a second axial portion 1623. Slits 1610 are generally u-shaped with a generally perpendicular intersection angle between the two generally axial portions 1621, 1623 and the generally transverse portion 1625. A folding wall 1650 is generally the area enclosed by the path of slit 1610 and the imaginary line i between the terminal ends 1614 and 1616. While in the current example, each of the axial portions 1621, 1623 and the transverse portion 1625 are straight line segments, in various embodiments one or more of such portions can be curved lines, zig-zagged, and the like.

When the slits 1610 are inverted relative to one another in directly adjacent rows, this creates the opportunity for them to align with one another such that one or more of the terminal ends 1614, 1616 of a slit 1610 align along a transverse axis i (which is colinear with the imaginary line i) with the terminal ends 1614, 1616 of a slit 1610 in a directly adjacent row. These unique patterns create unique beam widths, sizes, and shapes. Because the terminal ends 1614, 1616 of slits 1610 in directly adjacent rows 1612*a* and 1612*b* align to approximate an imaginary, essentially straight, single line perpendicular to the tension axis T, the size and shape of beams varies from the embodiments previously described herein. The continuous transverse region between the generally transverse portions (which are substantially perpendicular to the tension axis) forms a first beam 1630*a*. This beam only occurs once between every two sets of transversely aligned, directly adjacent rows 1612*a* and 1612*b*. Transversely aligned, directly adjacent rows 1612*a* and 1612*b* are arranged such that there is no continuous transverse region between the terminal ends 1614, 1616 of slits 1610 in the directly adjacent, transversely aligned row. The area of material 1600 into which the slits 1610 with transversely aligned terminal ends 1614, 1616 extend define a folding wall region 1630*b* that has a plurality of folding walls 1650 extending across the sheet to form a row in the transverse direction y. The folding wall region 1630*b* can be further described as having two generally rectangular regions 1631 that are bound by (1) a directly adjacent generally transverse portion 1625 of a slit 1610 which are perpendicular to the tension axis T and (2) adjacent axial portions 1621 and 1623 on directly adjacent, opposing slits 1610. Material 1620 forming axially extending beams 1620 is present between adjacent slits 1610 in a single row 1612. Directly adjacent the beam 1620 is a region 1633 which is the remaining material in the folding wall region 1630*b*. The region 1633 is bounded in the axial direction by the beam 1620 and the generally transverse portion 1625 and bounded in the transverse direction by the two generally rectangular regions 1631.

The plurality of slits 1610 through the sheet 1600 define a plurality of axially extending beams 1620 arranged in columns across the axial length of the sheet. Due to having an extension parallel to the tension axis T of the material, the axially extending beams 1620 are generally configured to transmit tension upon application of tension to the sheet of material 1600 along the tension axis T. While each of the plurality of beams 1620 are depicted in the current examples as generally rectangular in shape, in various embodiments some or all of the plurality of beams can have an alternate shape. In some embodiments, each of a plurality of beams have an irregular shape.

The plurality of slits 1610 form a first plurality of axial beams 1620*a* forming a first column 1602*a*. Between each beam 1620*a* in the axial direction x is a transverse portion 1625 of a slit of the plurality of slits 1610. Such a configuration advantageously allows axial expansion of the material 1600 when tension is applied along the tension axis T. Tension is transmitted through the axial beams 1620 and around each slit 1610 between adjacent axial beams 1620, causing axial expansion of each of the slits 1610.

In various embodiments, the plurality of slits has a first group of slits 1640*a*, each having a transverse portion 1625*a* that is axially between each beam in the first plurality of beams 1620*a*. The plurality of slits 1610 define a second plurality of beams 1620*b* extending in the axial direction x. The second plurality of beams 1620*b* form a second column 1602*b* extending across the sheet 1600 in the axial direction x. The second plurality of beams 1620*b* are spaced from the first plurality of beams 1620*a* in the transverse direction y. Between each beam 1620*b* in the axial direction x is a transverse portion 1625 of a slit in a second group of slits 1640*b* of the plurality of slits 1610. The plurality of slits 1610 can similarly define a third plurality of beams, a fourth plurality of beams, and so on.

In the current example, the first plurality of beams 1620*a* and the second plurality of beams 1620*b* are staggered in the axial and transverse directions. However, each beam of the first plurality of beams 1620*a* has a terminus 1624*a* that is aligned along a transverse axis i with a terminus 1624*b* of a beam of the second plurality of beams 1620*b*. The "terminus" of a beam is the end of the beam defined by terminal ends of the adjacent slits that define the beam. In some alternate embodiments, each beam of the first plurality of beams 1620*a* extends through an axis defined by a terminus 1624*b* of a beam of the second plurality of beams 1620*b*. In the current example, each slit in the first group of slits 1640*a* has an axial portion 1621 (the second axial portion 1623) that defines a beam in the second plurality of beams 1620*b*. Each slit in the second group of slits 1640*b* of the plurality of slits 1610 has an axial portion 1623 (the first axial portion 1621) that defines a beam in the first plurality of beams 1620*a*.

The first plurality of slits 1610*a* defines a plurality of beams across the first row 1612*a*, which can be referred to as a third plurality of beams 1620*c*. Each of the third plurality of beams 1620*c* extend in the axial direction x. Each beam in the third plurality of beams 1620*c* is defined by material between adjacent slits 1610*a* in the first row. Each beam is also defined by a portion of an adjacent transverse beam. In the current example, the first plurality of slits 1610*a* forms a beam 1620*a*/1620*c* that is both in the first plurality of beams 1620*a* and the third plurality of beams

1620*c*. In particular, the beam 1620*a*/1620*c* is defined by the material between adjacent slits in the first row.

The second plurality of slits define a fourth plurality of beams 1620*d* across the second row 1612*b*, where each of the beams extend in the axial direction x. Each beam in the fourth plurality of beams 1620*d* is defined by material between adjacent slits 1610*b* in the second row 1612*b*. Also, in the current example, the second plurality of slits 1610*b* forms a beam 1620*b*/1620*d* that is both in the second plurality of beams 1620*b* and the fourth plurality of beams 1620*d*. In particular, the beam 1620*b*/1620*d* is defined by the material between adjacent slits 1610*b* in the second row 1612*b*.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the shape and slit length can vary. For example, in some embodiments, the shape is u-shaped with more rounded edges than is shown in FIG. 16A. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown. Even further, many of the examples herein depict and describe slits that have axial portions intersecting a transverse portion at about a 90° angle to form a corner. In various embodiments, however the axial portions of slits may intersect a transverse portion to form a rounded corner. In some other embodiments, there is no discernible transition between the axial portions and the transverse portion, such as where the slit defines a semi-circle.

Figure 16B:
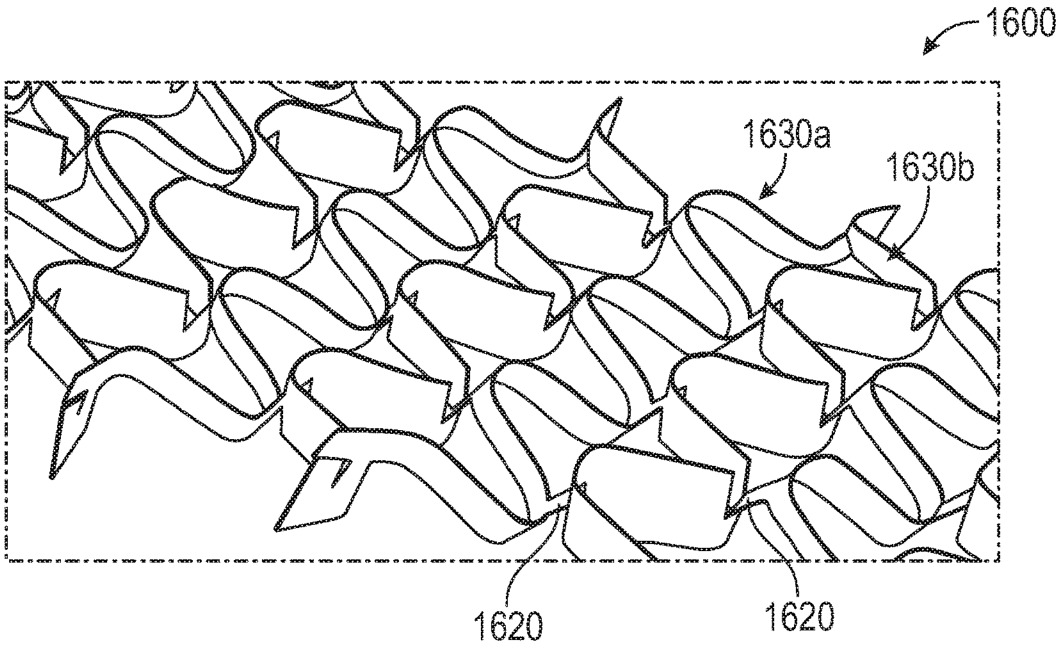
FIG. 16B is a perspective view of the pattern shown in FIG. 16A formed in a paper sheet and exposed to tension along the tension axis.
Figure 16C:
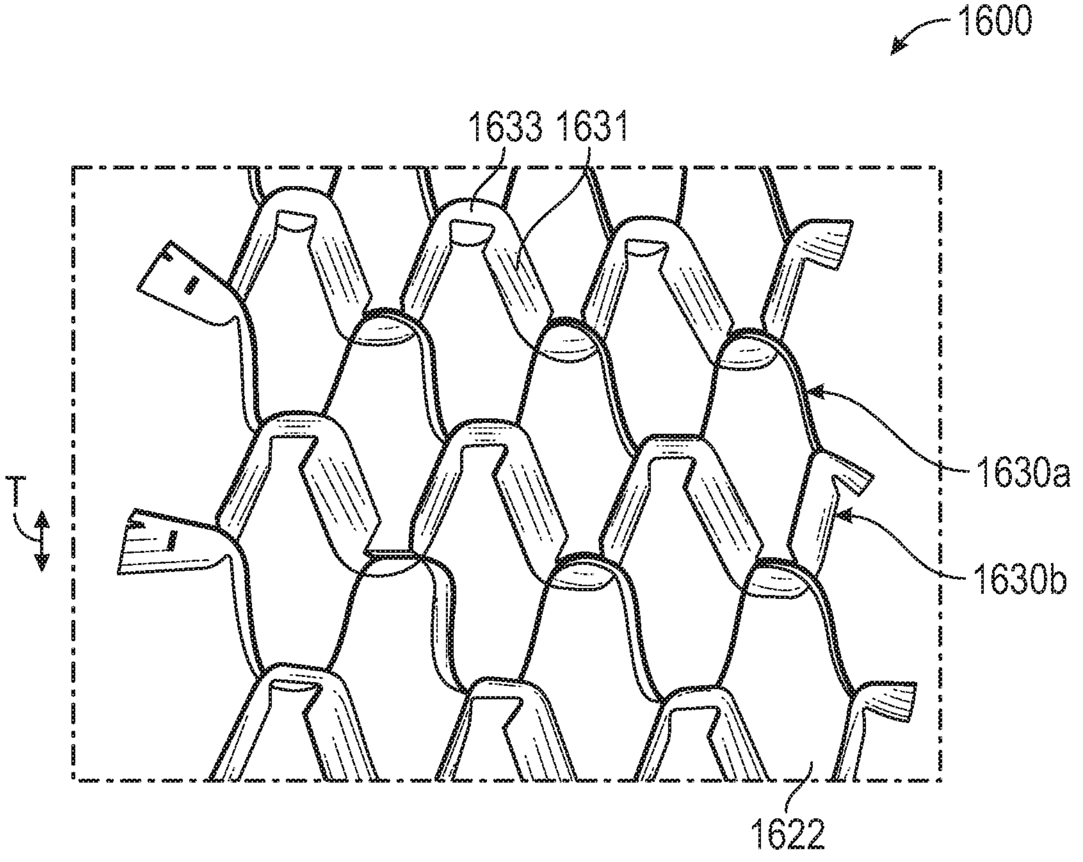
FIG. 16C is a nearly top view of the article of FIG. 16B when exposed to tension along the tension axis.
Figure 16D:
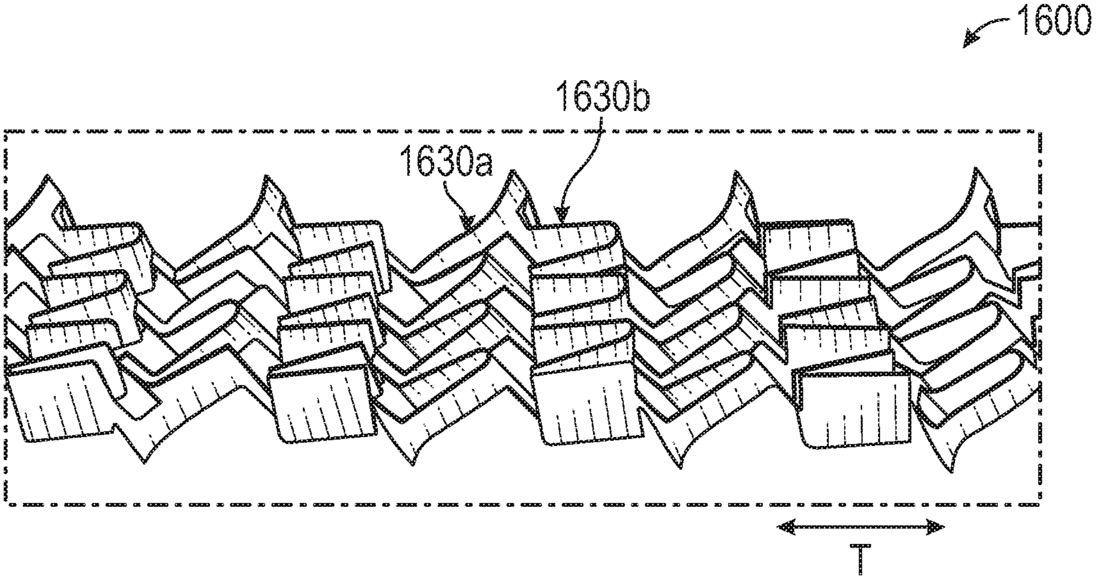
FIG. 16D is an elevated side view of the article shown in FIG. 16B.

FIGS. 16B-16D show the pattern of FIG. 16A formed in a sheet of paper and exposed to tension along the tension axis T. When material 1600 is tension activated or deployed along tension axis T, portions of material 1600 experiences tension and/or compression that causes the material to move out of the original plane of material 1600 in its pretensioned format. When exposed to tension along the tension axis, two things to happen to the two different types of transverse beams 1630*a* and 1630*b*. The first beam 1630*a* bends into a shape that undulates to bring the axial beam 1620 between adjacent slits closer in the transverse direction y to the adjacent beam 1620 in the same row, while keeping the terminal ends 1614 and 1616 approximately in a single plane that is parallel to the original plane of material 1600 in its pretensioned state. The folding wall region 1630*b* rotates and folds into an accordion-like shape such that all of the two generally rectangular regions 1631 and region 1633 are nominally flat, have folds between all adjacent generally rectangular regions 1631 and regions 1633, and all flat surfaces are nominally orthogonal to the original plane of material 1600 in its pretensioned state. Axial beams 1620 between adjacent slits 1610 in a row 1612 primarily experiences tension aligned with tension axis T, so this region or area tends to bend with first beam 1630*a*. These movements in material 1600 form two distinct folded wall regions, one of which is orthogonal to the tension axis and the original plane of material 1600 in its pretensioned state, as seen in FIG. 16D.

Embodiments like the specific implementation of FIGS. 16A-16D have unique benefits. For example, FIGS. 16A-16D exemplify one set of embodiments in which portions of the material rotate to the normal axis (substantially 90° or orthogonal to the original plane of material 1600 in its pretensioned state) when deployed or tension-activated. Additionally, some of these embodiments can withstand exposure to greater loads applied in the normal axis relative to other single slit patterned structures without being crushed. This means that they can provide increased or enhanced protection for things like packages being shipped and other applications. Another advantage to single slit patterns like the specific implementation shown in FIGS. 16A-16D is that, in some embodiments, once the construction is in its deployed (via application of tension) position, the construction substantially remains in its extended/tensioned position even once the tension is no longer applied. This feature can provide a more stable construction. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet and the relative bending axis is perpendicular to the tension axis and parallel to the axis of the rows. The area moment of inertia is increased relative to a straight vertical wall without folds.

When the tension-activated material 1600 is wrapped around an article or placed directly adjacent to itself, the accordion folded folding wall regions 1630*b* or the undulating first beams 1630*a* can interlock with one another and/or opening portions 1622, to create an interlocking structure. Interlocking can be measured as stated in the interlocking test articulated above.

Figure 17A:
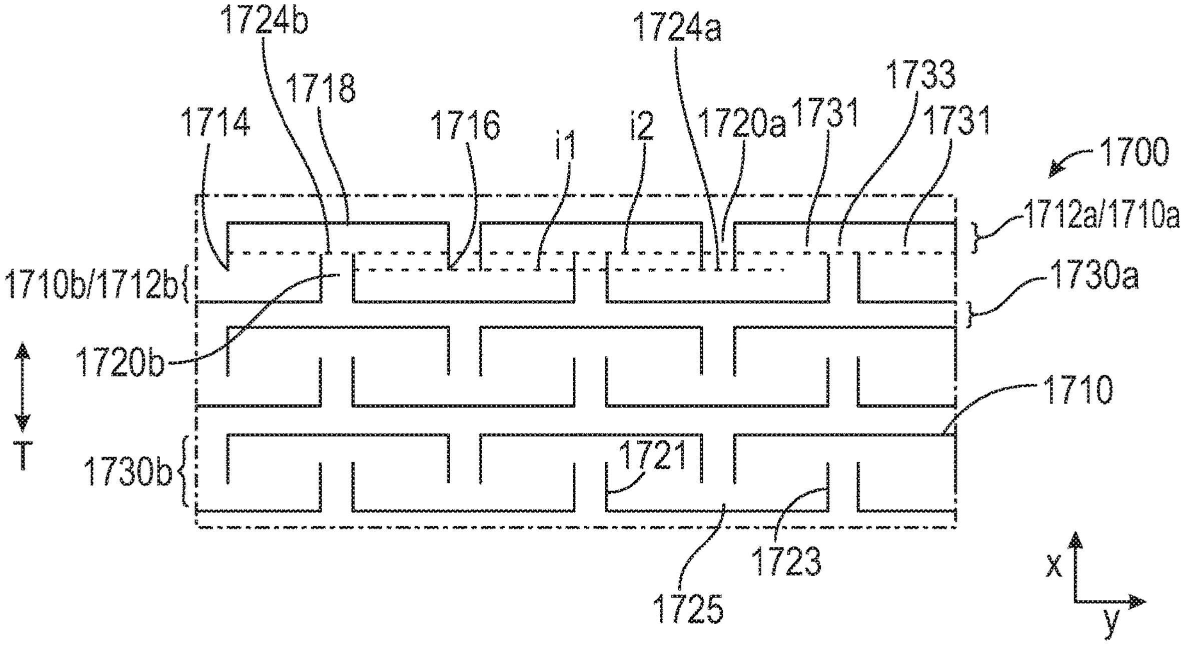
FIG. 17A is a top view schematic drawing of an exemplary single slit pattern.

Another exemplary embodiment of a single slit pattern is shown schematically in FIG. 17A. The pattern of FIG. 17A is substantially similar to the pattern of FIGS. 16A-16D and, as such, the description of FIGS. 16A-16D generally apply to the current description, except that in FIG. 16A directly adjacent rows align with one another such that one or more of the terminal ends of a slit align with the terminal ends of a slit in a directly adjacent row along a single transverse axis i. In contrast, in FIG. 17A, slits in adjacent rows nest together or overlap, meaning that a first terminal end segment of a slit in one row extends through an imaginary line connecting the terminal ends of a first slit in a second, adjacent row. Similarly, a second terminal end segment of the slit extends through an imaginary line connecting the terminal ends of a second slit in the second, adjacent row. This configuration affects the beam width, size, and shape of the material upon application of a threshold amount of tension along the tension axis T.

More specifically, the single-slit pattern of FIG. 17A includes a first set of rows 1712*a* that include a first plurality of slits 1710*a* having a first shape and position and a second set of rows 1712*b* with a second plurality of slits 1710*b* that include the same slit shape but the slits are positioned differently (in this case, inverted). The first plurality of slits 1710*a* define a first plurality of axial beams 1720 that is the material between the slits 1710*a*. The second plurality of slits 1710*b* define a second plurality of axial beams 1720 between the slits 1710*b*. The slit shape, general configurations, and possible alternatives in both the first set of rows

1712*a* and the second set of rows 1712*b* is similar to that of FIG. 13A, whose description above is repeated herein.

In the current example, however, the second plurality of slits 1710*b* nest or overlap with another slit 1710 in a directly adjacent row, specifically with the first plurality of slits 1710*a* in the current example. Each of the slits in the second plurality of slits 1710*b* extend through a first imaginary line i1 that connects the terminal ends of a slit in the first plurality of slits 1710*a*. Similarly, each of the slits in the first plurality of slits 1710*a* extend through a second imaginary line i2 that connects the terminal ends of a slit in the second plurality of slits 1710*b*. Furthermore, each beam 1720 in the first plurality of beams 1720*a* has a terminus 1724*a* that extends through a transverse axis (overlapping with the second imaginary line i2) defined by a terminus 1724*b* of a beam of the second plurality of beams 1720*b*. Similarly, each beam 1720 in the second plurality of beams 1720*b* has a terminus 1724*b* that extends through a transverse axis (overlapping with the first imaginary line i1) defined by a terminus 1724*a* of a beam of the first plurality of beams 1720*a*. This nesting or overlap creates the opportunity to create unique beam width, size, and shape.

Because the terminal ends 1714, 1716 of slits 1710 in directly adjacent rows 1712*a* and 1712*b* overlap, such that a single line (nominally transverse) will pass through a portion of all of the axial portions 1721 and 1723 of all slits 1710 in the overlapped rows 1712*a* and 1712*b*, the size and shape of beams varies from the embodiments previously described herein. The continuous transverse region between the generally transverse portions (which are substantially perpendicular to the tension axis T) forms a first beam 1730*a*. This beam only occurs once between every two sets of overlapped rows 1712*a* and 1712*b*. Overlapped rows 1712*a* and 1712*b* are arranged such that there is no continuous transverse region between the terminal ends 1714, 1716 of slits 1710 in the directly adjacent, overlapped, row. The overlapped row of slits 1712*a* and 1712*b* comprises a folding wall region 1730*b*. The second beam can be further described as having two generally rectangular regions 1731 that are bounded in the axial direction by adjacent generally transverse portions 1725 on opposing sides of the folding wall region 1730*b* and bounded on the transverse axis by adjacent axial portions 1721 and 1723 on opposing sides of the folding wall region 1730*b*. The axial beam 1720 is present between adjacent slits 1710 in a single row 1712. Directly adjacent the material 1720 is a region 1733 which is the remaining material in the folding wall region 1730*b* bounded in the axial axis by the beam 1720 and the generally transverse portion 1725 and bounded in the transverse direction by the two adjacent generally rectangular regions 1731, more specifically by the axial extensions of the adjacent axial portions 1721 and 1723.

Similar to the discussion of FIGS. 16A-16D, above, in the current example the axial beams 1720 are arranged in columns extending the axial length of the sheet of material 1700. Transverse portions 1725 of slits 1710 are generally arranged between each of the axial beams 1720 in each respective column such that the axial beams 1720 within a column are separated from each other by a transverse portion 1725 of a slit.

Those of skill in the art will appreciate that many changes may be made to the pattern while still falling within the scope of the present disclosure. Those of skill in the art will appreciate that the shape and slit length can vary. For example, in some embodiments, the shape is u-shaped with more rounded edges than is shown in FIG. 17A. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown.

Figure 17B:
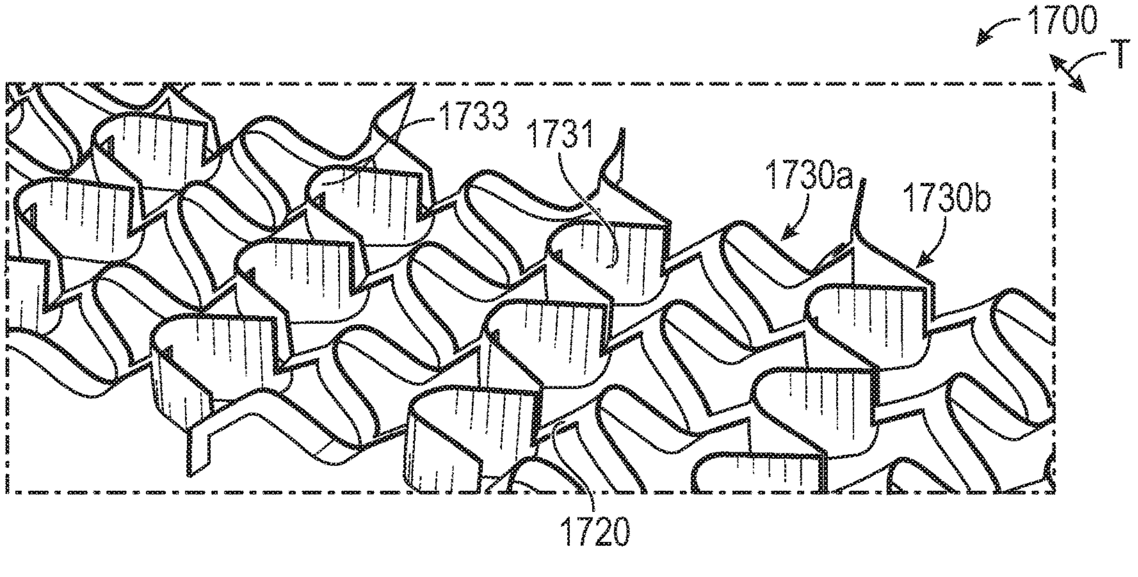
FIG. 17B is a perspective view drawing from a photograph of the pattern shown in FIG. 17A formed in a paper sheet and exposed to tension along the tension axis.
Figure 17C:
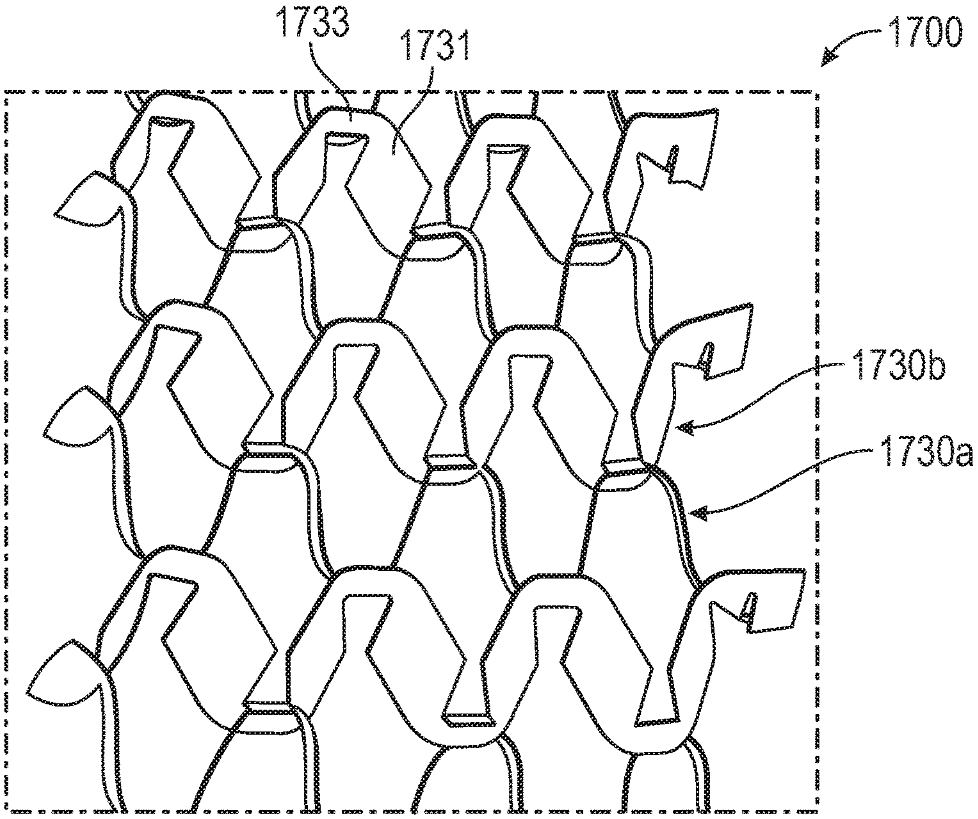
FIG. 17C is a nearly top view drawing from a photograph of the article of FIG. 17B when exposed to tension along the tension axis.
Figure 17D:
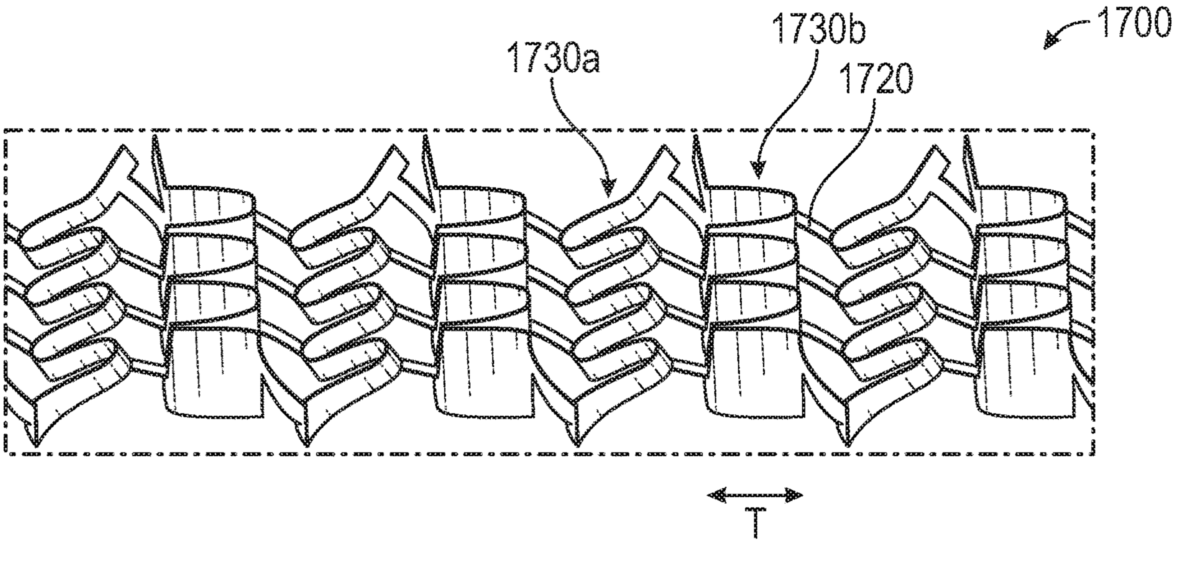
FIG. 17D is an elevated side view of the article shown in FIG. 17B.

FIGS. 17B-17D show the pattern of FIG. 17A formed in a sheet of paper and exposed to tension along the tension axis T. When material 1700 is tension activated or deployed along tension axis T, portions of material 1700 experiences tension and/or compression that causes the material to move out of the original plane of material 1700 in its pretensioned format. When exposed to tension along the tension axis, two things to happen to the two different types of beams 1730*a* and 1730*b*. The first beam 1730*a* bends into a shape that undulates to bring the axial beam 1720 between adjacent slits 1710 closer to the adjacent beam 1720 in the same row, while keeping the terminal ends 1714 and 1716 approximately in a single plane that is parallel to the original plane of material 1700 in its pretensioned state. The folding wall region 1730*b* rotates and folds into an accordion-like shape such that all of the generally rectangular regions 1731 and regions 1733 are nominally flat, have folds between two generally rectangular regions 1731 and regions 1733, and have a single common axis (that in the flat state was the axial axis) that rotates at least 90 degrees as defined in the original plane of the material 1700 in its pretensioned state. The rotation of the common axis can also be understood and even calculated when it is considered as an additional consequence of all the terminal ends 1714 and 1716 being pulled into the same plane. These movements in material 1700 form a series of two distinct folded beams one of which rotated at least orthogonal to the tension axis and the original plane of material 1700 in its pretensioned state, as seen in FIG. 17D.

Embodiments like the specific implementation of FIGS. 17A-17D have unique benefits. For example, FIGS. 17A-17D exemplify one set of embodiments in which portions of the material rotate to or beyond the normal axis, or substantially 90° or orthogonal to the original plane of material 1700 in its pretensioned state when deployed or tension-activated. Additionally, some of these embodiments can withstand exposure to greater loads applied in the normal axis relative to other single slit patterned structures without being crushed. This means that they can provide increased or enhanced protection for things like packages being shipped and other applications. Another advantage to single slit patterns like the specific implementation shown in FIGS. 17A-17D is that, in various embodiments, once the construction is in its deployed (via application of tension) position, the construction substantially remains in its deployed/extended/tensioned position even once the tension is no longer applied. This feature can provide a more stable construction.

Without being bound by theory, it is believed that since the implementation of FIGS. 17A-17D rotates beyond 90 degrees, it creates additional stress in some of the folds that tends to plastically deform (or crease) the material making it even more likely to stay in its deployed position even once the tension is no longer applied than the implementation of FIGS. 16A-16D. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet and the relative bending axis is perpendicular to the tension axis and parallel to the axis of the rows. The area moment of inertia is increased relative to a straight vertical wall without folds. Some of these benefits result from the presence of an area moment of inertia (also called moment of area or second moment of inertia) in the deployed article (deployed via the application of tension or force) where the area moment of inertia is in the plane of the original sheet. The presence of this area moment of inertia in the deployed article can be detected by taking a top view of the deployed article and observing a pattern of material that is all perpendicular to the plane of the undeployed original sheet or article.

When the tension-activated material 1700 is wrapped around an article or placed directly adjacent to itself, the accordion folded folding wall regions 1730*b*, or the undulating first beams 1730*a* can interlock with one another and/or opening portions 1722, to create an interlocking structure. Interlocking can be measured by the "interlocking test method" described above.

Figure 18A:
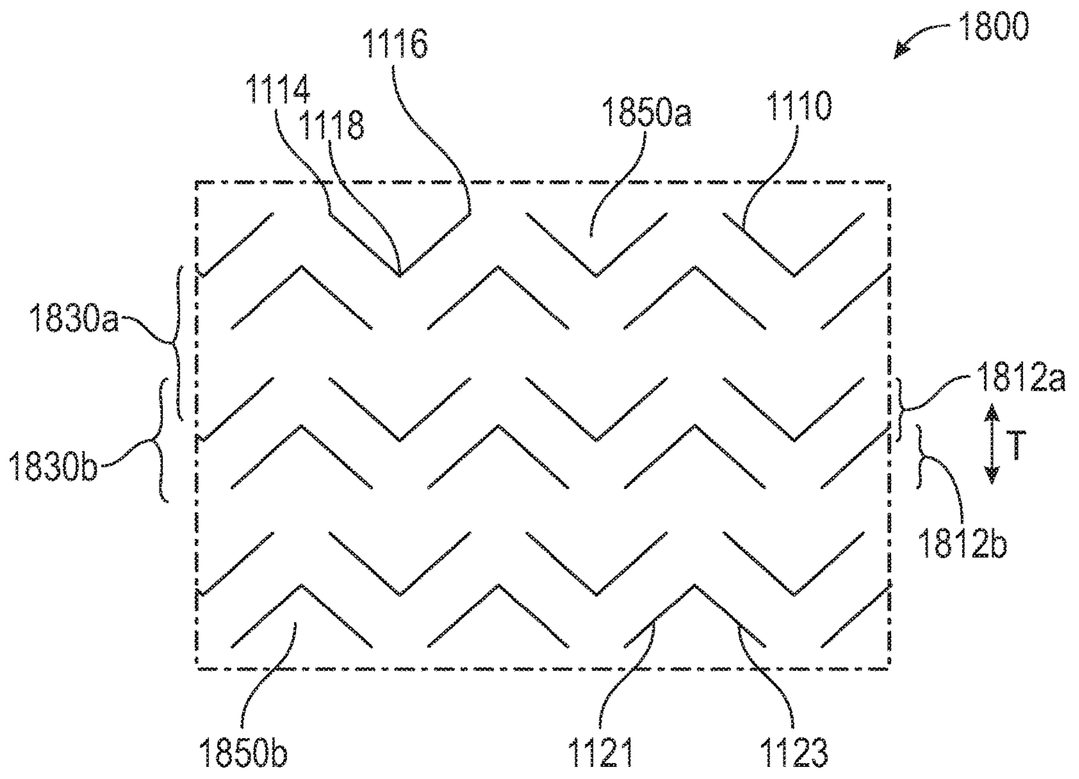
FIG. 18A is a top view schematic drawing of an exemplary single slit pattern.

Another exemplary embodiment of a single slit pattern is shown schematically in FIG. 18A. The pattern of FIG. 18A shows that the alternating, inverted patterns of FIGS. 15-17 can be done with other shaped slits. In this specific embodiment, the slits are v-shaped, similar to those of FIG. 11A except that the slits are inverted in alternating, directly adjacent rows. More specifically, the single-slit pattern of FIG. 18A includes a first set of rows 1812*a* that include slits of a first shape and position and a second set of rows 1812*b* that includes the same slit shape but the slits are positioned differently (in this case, inverted). The slit shape in both the first set of rows 1812*a* and the second set of rows 1812*b* is substantially similar to that of FIG. 11A, whose description above is repeated herein. The continuous transverse region between rows of slits 1812*a* and 1812*b* with the addition of the flap regions 1850*a* and 1850*b* form a first beam 1830*a*. The remaining area or the region between the two lines formed by connecting the terminal ends 1114 and 1116 of adjacent overlapping rows of slits 1812*a* and 1812*b* minus the flap regions 1850*a* and 1850*b* form a second beam 1830*b*. The flap region 1850 is generally the area enclosed by the path of slit 1810 and the imaginary straight line between terminal ends 1114 and 1116.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the shape and slit length can vary. For example, in some embodiments, the shape is curved or rounded, as shown in, for example, FIG. 12A. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown.

Figure 18B:
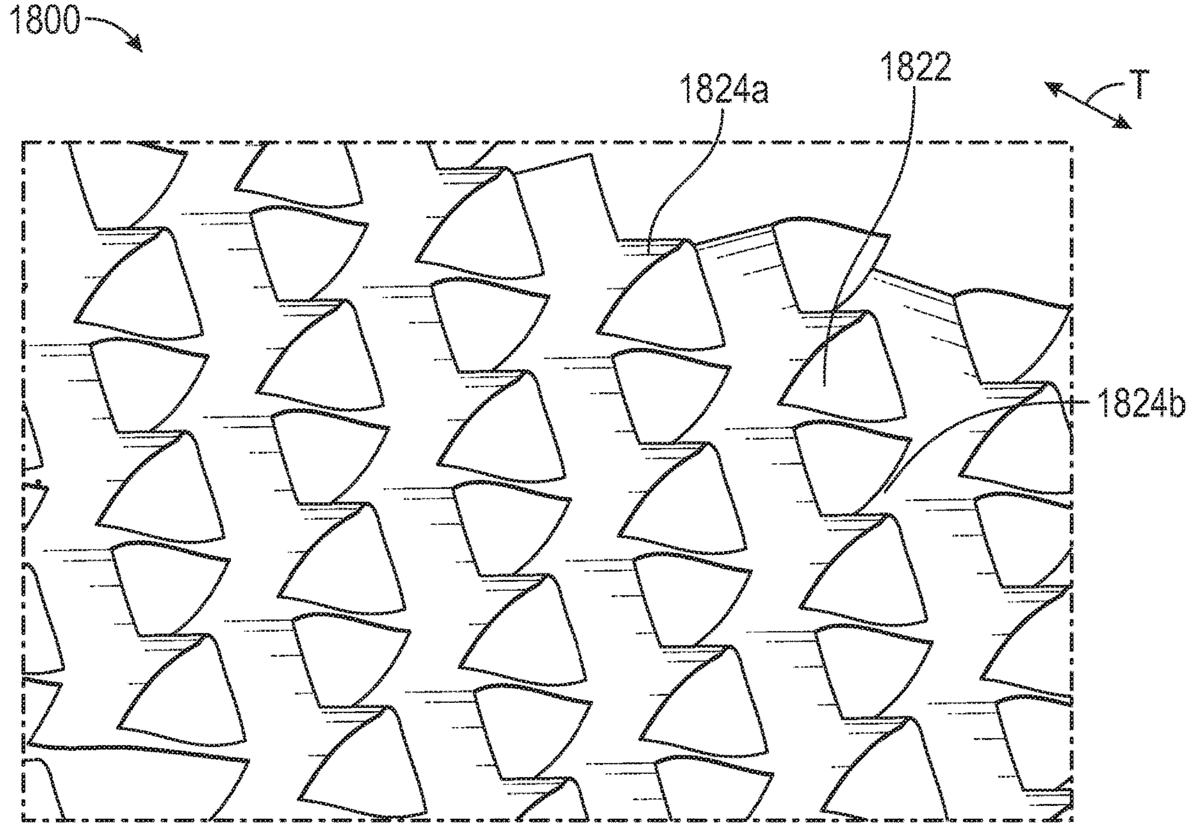
FIG. 18B is a perspective view drawing from a photograph of the pattern shown in FIG. 18A formed in a paper sheet and exposed to tension along the tension axis.
Figure 18C:
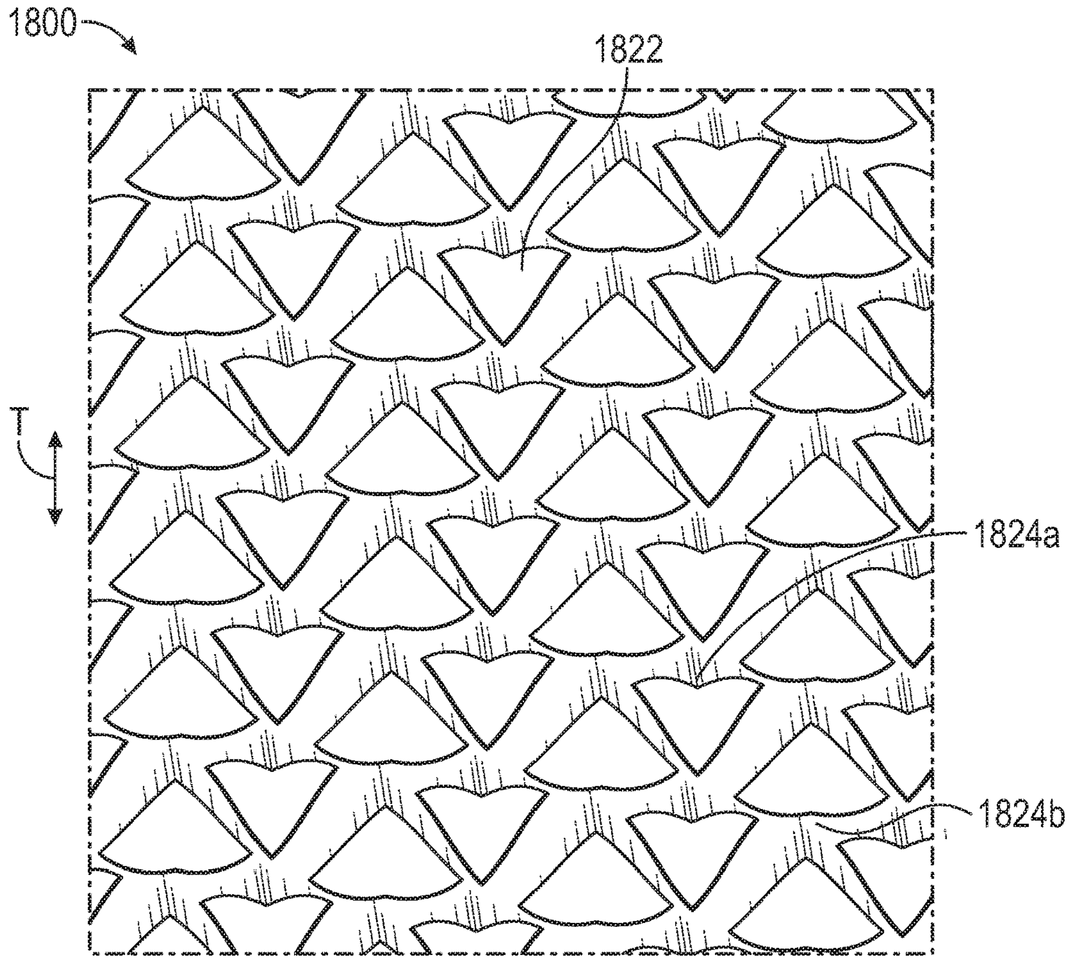
FIG. 18C is a nearly top view drawing from a photograph of the article of FIG. 18B when exposed to tension along the tension axis.
Figure 18D:
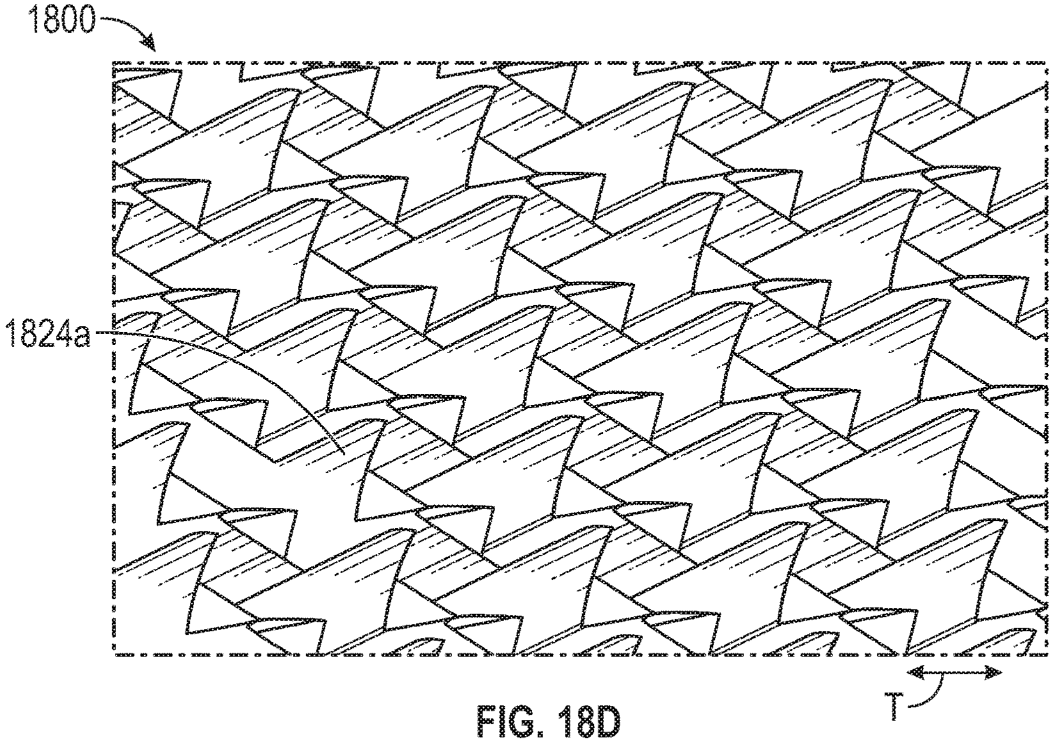
FIG. 18D is an elevated side view of the article shown in FIG. 18B.

FIGS. 18B-18D show the pattern of FIG. 18A formed in a sheet of paper and exposed to tension along the tension axis T. When material 1800 is tension activated or deployed along tension axis T, portions of material 1800 experiences tension and/or compression that causes the material to move out of the original plane of material 1800 in its pretensioned format. When exposed to tension along the tension axis, terminal ends 1114, 1116 experience compression and are drawn toward one another, causing flap regions 1850*a*, 1850*b* of the material 1800 to move or buckle upward or downward relative to the plane of the material 1800 in its pretensioned state (FIG. 18A), creating flaps 1826*a* and 1826*b*. The first beam 1830*a*, that includes the flaps 1824, will normally rotate substantially in a single direction pushing half the flaps 1824*a* upward and half the flaps 1824*b* downward. Portions of second beams 1830*b* move or buckle upward or downward relative to the plane of the material 1800 in its pretensioned state (FIG. 18A), normally the direction of motion is in opposition to the adjacent flat portion 1826 forming an opening portion 1822. These movements in material 1800 form alternating rows of curved pointed protrusions pointing in opposite directions, as seen in FIG. 18D.

When the tension-activated material 1800 is wrapped around an article or placed directly adjacent to itself, the flaps 1824 interlock with one another and/or opening portions 1822, to create an interlocking structure. Interlocking can be measured as stated in the interlocking test articulated above.

Figure 19A:
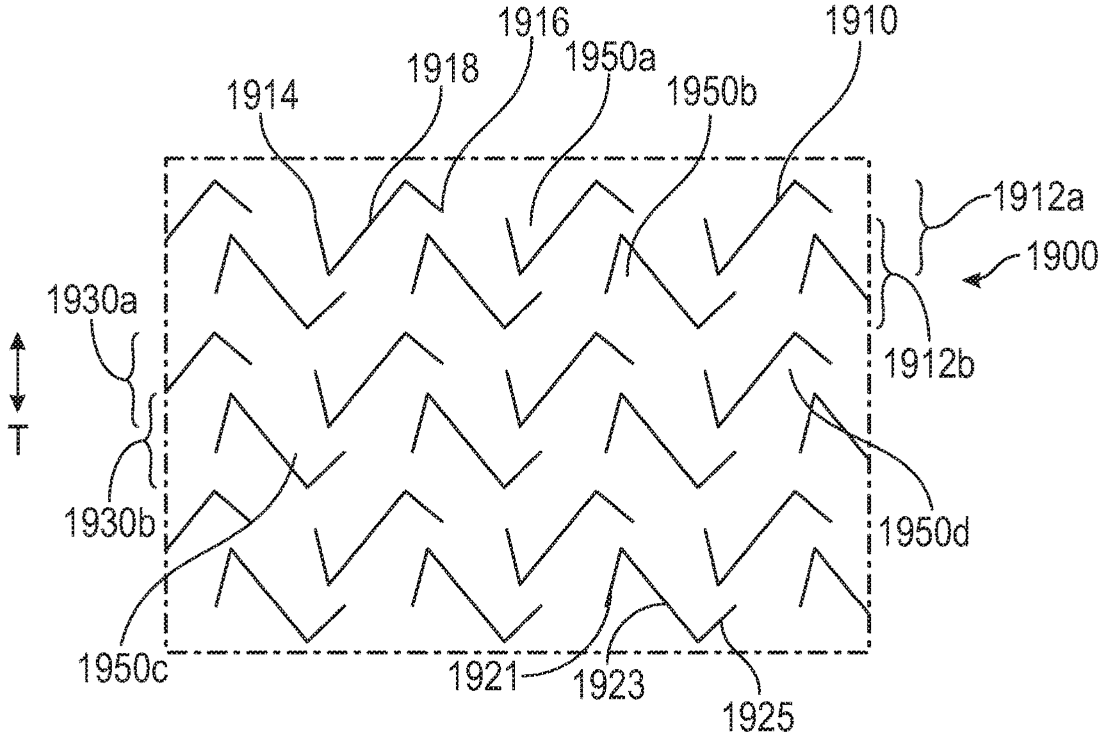
FIG. 19A is a top view schematic drawing of an exemplary single slit pattern.

Another exemplary embodiment of a single slit pattern is shown schematically in FIG. 19A. The pattern of FIG. 19A shows another embodiment in which directly adjacent rows have alternating patterns, but in this embodiment, the slit shape is inverted relative to the slit shape in a directly adjacent row and staggered in the transverse direction relative to the directly adjacent rows. This is another example of how slit position can vary between rows (or within rows).

More specifically, the single-slit pattern of FIG. 19A includes a first set of rows 1912*a* that include slits of a first shape and position and a second set of rows 1912*b* that includes the same slit shape but the slits are positioned differently (in this case, inverted). Each slit includes a first terminal end, 1914, a second terminal end, 1916, and a midpoint 1918. The slit shape in both the first set of rows 1912*a* and the second set of rows 1912*b* includes a first substantially axial slit portion 1921 that is generally parallel to the tension axis, a second slit portion 1923 that is generally at a 45 degree angle relative to the tension axis, has a length longer than the first 1921 or third slit portions 1925, and intersects first slit portion 1921 at an acute angle, and a third slit portion 1925 that is generally at a 45 degree angle relative to the tension axis and that intersects second slit portion 1923 at a generally 90 degree angle. The region between the two lines formed by connecting the terminal ends 1914 and 1916 of adjacent overlapping rows of slits 1912*a* and 1912*b* with the addition of the flap regions 1950*a* and 1950*b* minus the flap regions 1950*c* and 1950*d* form a first beam 1930*a*. The region between the two lines formed by connecting the terminal ends 1914 and 1916 of adjacent overlapping rows of slits 1912*a* and 1912*b* with the addition of the connected flap regions 1950*c* and 1950*d* minus the flap regions 1950*a* and 1950*b* forms a second beam 1930*b*. The flap regions 1950 are generally the areas enclosed by the path of slit 1910 and the imaginary straight line between terminal ends 1914 and 1916. Flap regions 1950*a* and 1950*b* are partially enclosed by the acute angle formed by the intersection of first slit portion 1921 and second slit portion 1928, and flap regions 1950*c* and 1950*d* are partially enclosed by the generally 90 degree angle formed by the intersection of third slit portion 1925 and second slit portion 1928.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the slit shape, angle, and slit length can vary. For example, in some embodiments, the shape is curved or rounded. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown.

Figure 19B:
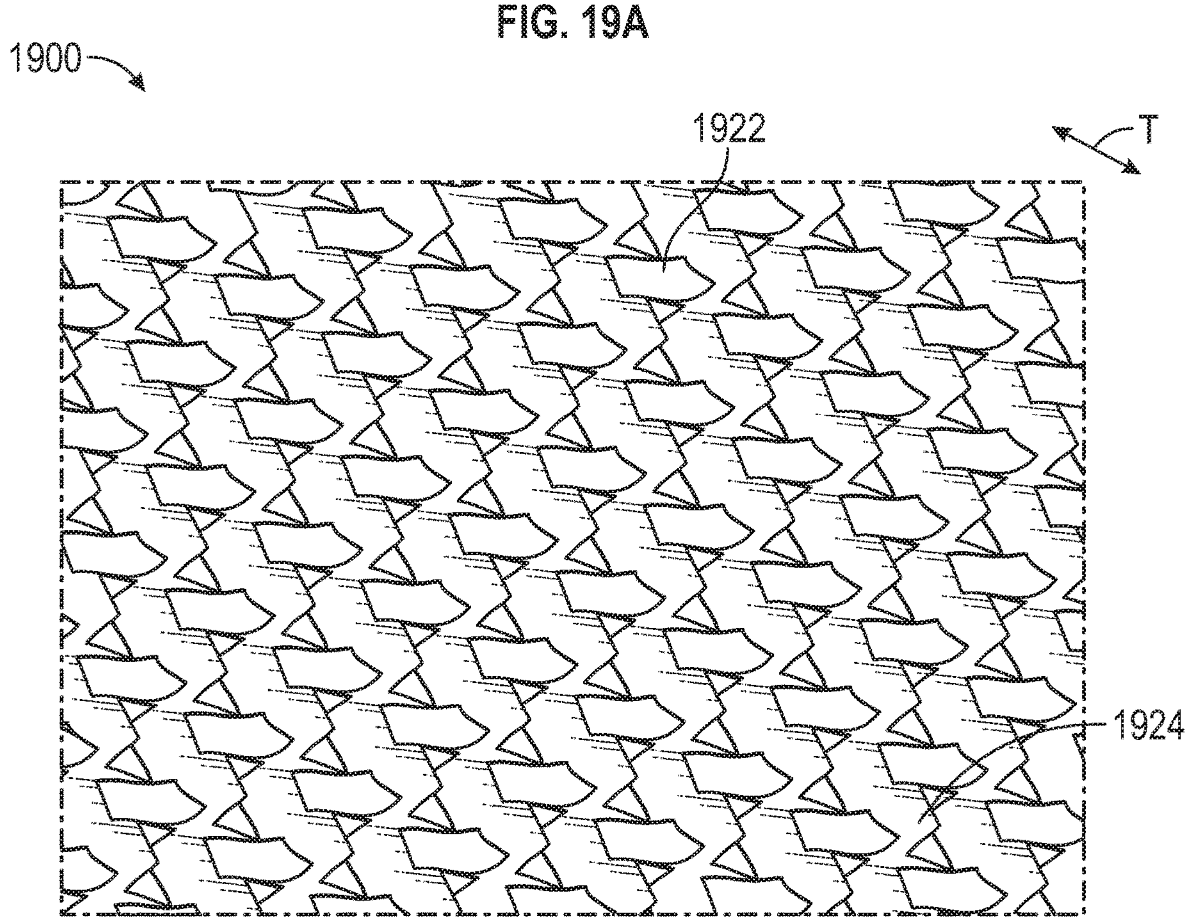
FIG. 19B is a perspective view drawing from a photograph of the pattern shown in FIG. 19A formed in a paper sheet and exposed to tension along the tension axis.
Figure 19C:
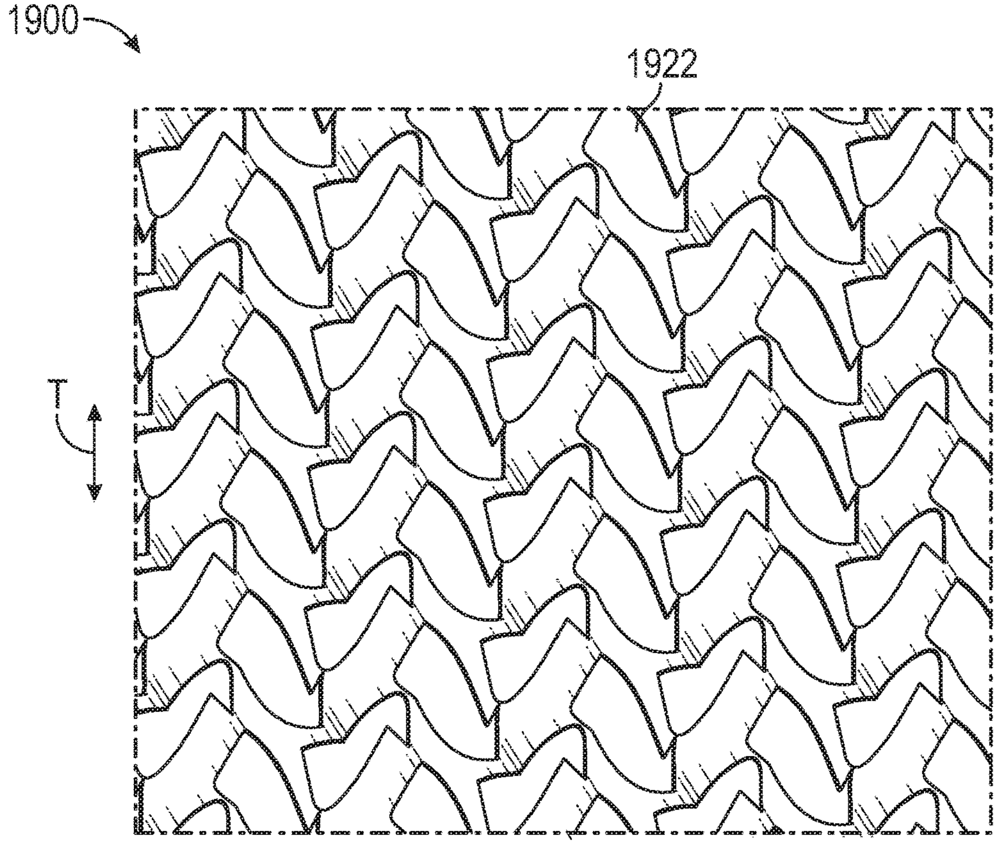
FIG. 19C is a nearly top view drawing from a photograph of the article of FIG. 19B when exposed to tension along the tension axis.
Figure 19D:
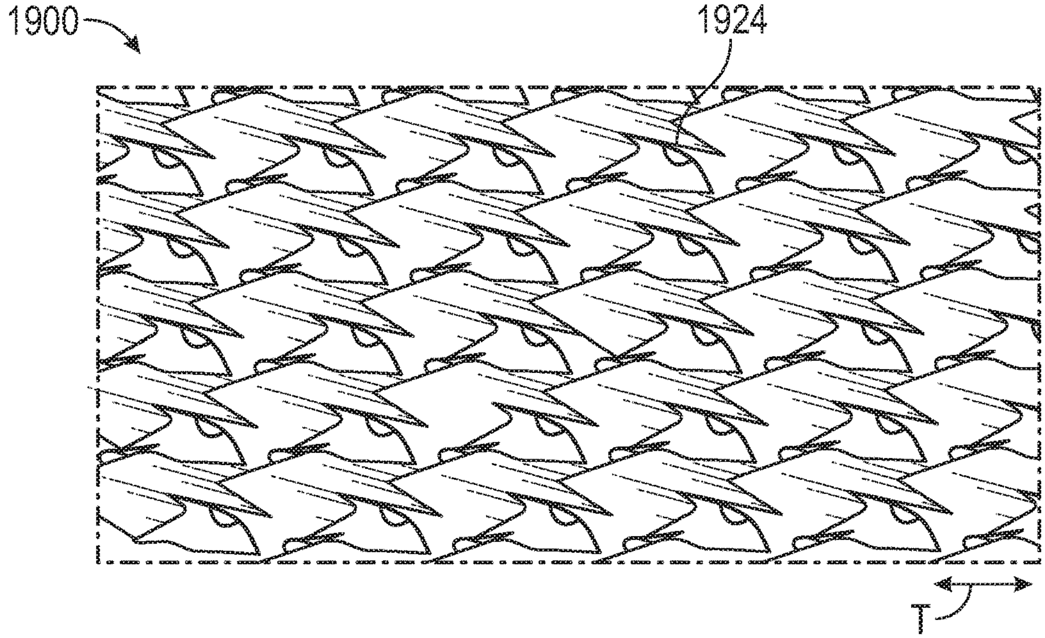
FIG. 19D is an elevated side view of the article shown in FIG. 19B.

FIGS. 19B-19D show the pattern of FIG. 19A formed in a sheet of paper and exposed to tension along the tension axis T. When material 1900 is tension activated or deployed along tension axis T, portions of material 1900 experience tension and/or compression that causes the material to move out of the original plane of material 1900 in its pretensioned format. When exposed to tension along the tension axis, terminal ends 1914, 1916 experience compression and are drawn toward one another, causing flap regions 1950 of material 1900 to move or buckle upward or downward relative to the plane of the material 1900 in its pretensioned state (FIG. 19A), creating flaps 1924. The first beam 1930*a*, that includes the flap regions 1950*a* and 1950*b*, will normally rotate substantially in a single direction pushing half the flaps 1924*a* upward and half the flaps 1924*b* downward. The second beam 1930*b*, that includes the flap regions 1950*c* and 1950*d*, will normally rotate substantially in a single direction pushing half the flaps 1924*c* upward and half the flaps 1924*d* downward. The motion of the flaps 1924 relative to the plane of the material 1900 in its pretensioned state (FIG. 19A) form opening portions 1922. These movements in material 1900 form a series of pointed, curved protrusions in both directions (up and down relative to the plane of the pretensioned state of material 1900), as seen in FIG. 19D.

When the tension-activated material 1900 is wrapped around an article or placed directly adjacent to itself, the flaps 1924 interlock with one another and/or opening portions 1922, to create an interlocking structure. Interlocking can be measured as stated in the interlocking test articulated above.

Figure 20A:
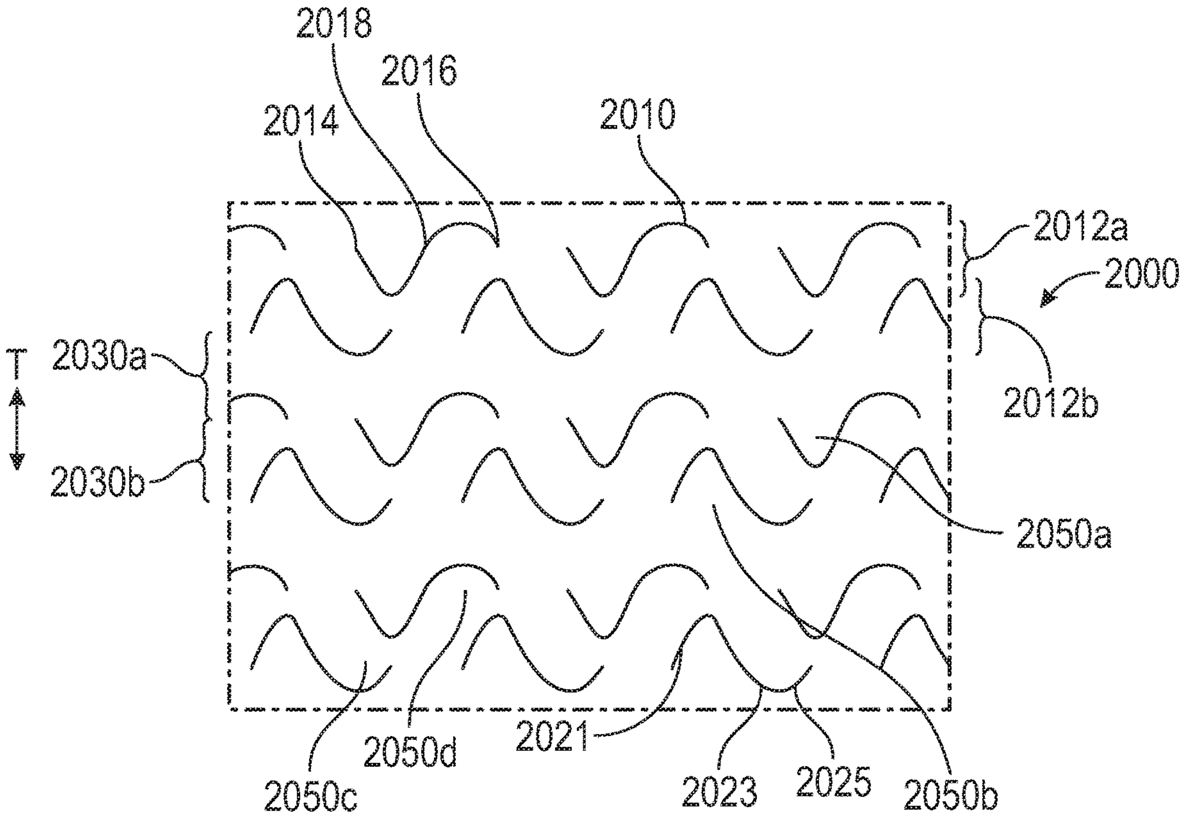
FIG. 20A is a top view schematic drawing of an exemplary single slit pattern.

Another exemplary embodiment of a single slit pattern is shown schematically in FIG. 20A. The pattern of FIG. 20A is substantially similar to that of FIG. 19A except that the slit shapes are more curved or rounded than the slit shapes of FIG. 19A. Further, in the embodiment of FIG. 10A, the right-side end of the slits are curved.

More specifically, the single-slit pattern of FIG. 20A includes a first set of rows 2012*a* that include slits of a first shape and position and a second set of rows 2012*b* that includes the same slit shape but the slits are positioned differently (in this case, inverted). Each slit 2010 includes a first terminal end, 2014, a second terminal end, 2016, and a midpoint 2018. The slit shape in both the first set of rows 2012*a* and the second set of rows 2012*b* includes a first substantially axial slit portion 2021, a second slit portion 2023 that is generally at a 45 degree angle relative to the tension axis, has a length longer than the first 2021 or third 2025 slit portions, and forms an acute angle with the first slit portion 2021 at an acute angle, and a third slit portion 2025 that intersects second slit portion 2023. Each portion has curvature and each intersection of the portions is a curved or rounded intersection. The region between the two lines formed by connecting all the terminal ends 2014 and 2016 of adjacent overlapping rows of slits 2012*a* and 2012*b* with the addition of the connected flap regions 2050*a* and 2050*b* minus the flaps 2050*c* and 2050*d* form a first beam 2030*a*. The region between the two lines formed by connecting the terminal ends 2014, 2016 of adjacent overlapping rows of slits 2012*a* and 2012*b* with the addition of the connected flap regions 2050*c* and 2050*d* minus the flaps 2050*a* and 2050*b* forms a second beam 2030*b*. The flap regions 2050 are generally the area enclosed by the path of slit 2010 and the imaginary straight line between terminal ends 2014 and 2016.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the slit shape and slit length can vary. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown.

Figure 20B:
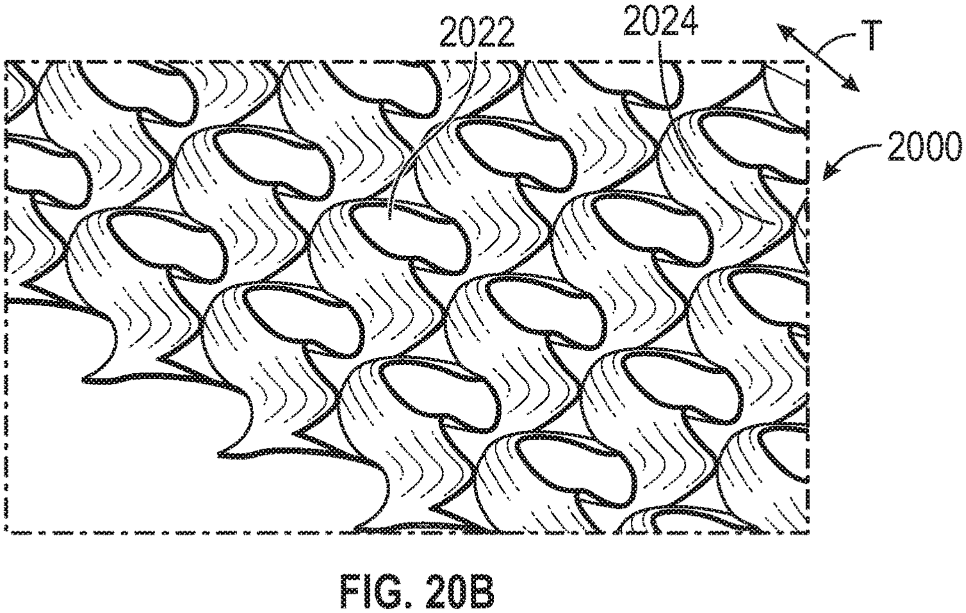
FIG. 20B is a perspective view drawing from a photograph of the pattern shown in FIG. 20A formed in a paper sheet and exposed to tension along the tension axis.
Figure 20C:
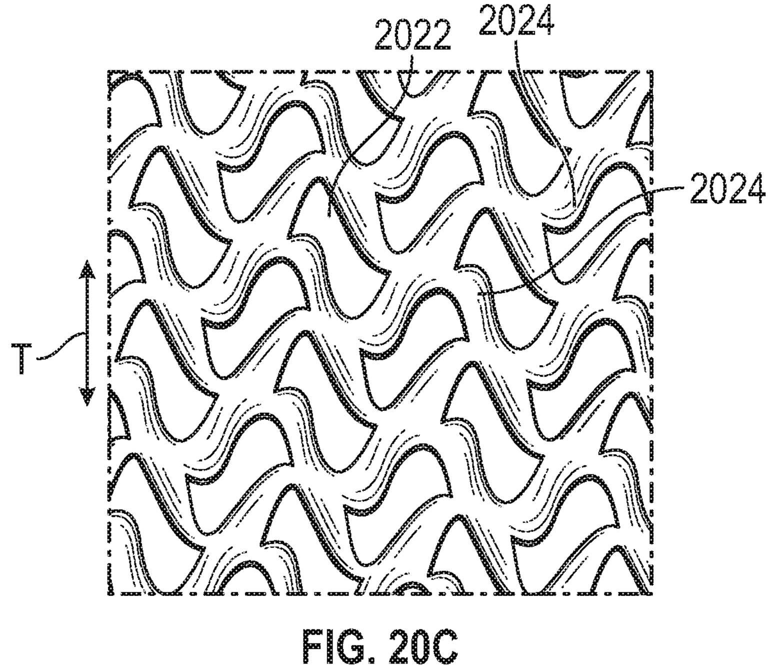
FIG. 20C is a nearly top view drawing from a photograph of the article of FIG. 20B when exposed to tension along the tension axis.
Figure 20D:
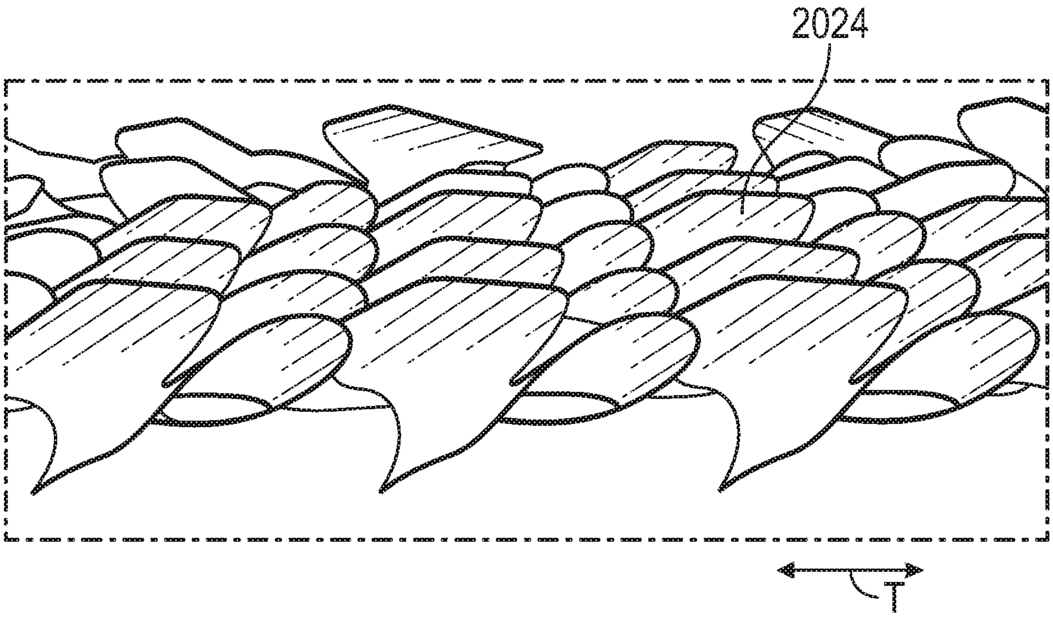
FIG. 20D is an elevated side view of the article shown in FIG. 20B.

FIGS. 20B-20D show the pattern of FIG. 20A formed in a sheet of paper and exposed to tension along the tension axis T. When material 2000 is tension activated or deployed along tension axis T, portions of material 2000 experience tension and/or compression that causes the material to move out of the original plane of material 2000 in its pretensioned format. When exposed to tension along the tension axis, terminal ends 2014, 2016 experience compression and are drawn toward one another, causing flaps 2050 of material 2000 to move or buckle upward or downward relative to the plane of the material 2000 in its pretensioned state (FIG. 20A), creating flaps 2024. The first beam 2030*a*, that includes the flap regions 2050*a* and 2050*b*, will normally rotate substantially in a single direction pushing half the flaps 2024*a* upward and half the flaps 2024*b* downward. The second beam 2030*b*, that includes the flaps regions 2050*c* and 2050*d*, will normally rotate substantially in a single direction pushing half the flaps 2024*c* upward and half the flaps 2024*d* downward. The motion of the flaps 2024 relative to the plane of the material 2000 in its pretensioned state (FIG. 20A) form opening portions 2022. These movements in material 2000 form a series of curved protrusions in both directions (up and down), as seen in FIG. 20D.

When the tension-activated material 2000 is wrapped around an article or placed directly adjacent to itself, the flaps 2024 interlock with one another and/or opening portions 2022, to create an interlocking structure. Interlocking can be measured as stated in the interlocking test articulated in the Examples section of the present disclosure.

Figure 21A:
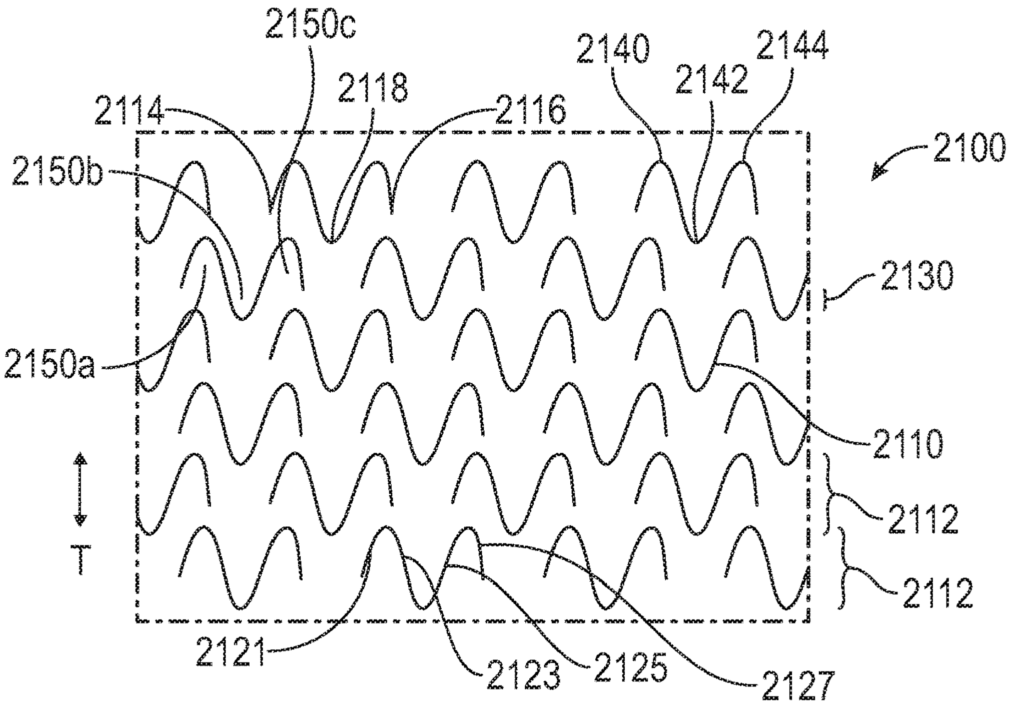
FIG. 21A is a top view schematic drawing of an exemplary single slit pattern.

Another exemplary embodiment of a single slit pattern is shown schematically in FIG. 21A. Slits 2110 each include three or more extrema, wherein an extremum is defined as a region of the slit that defines an axial peak 2140, 2144 or an axial valley 2142. Each slit 2110 includes a first terminal end 2114, a second terminal end 2116, and a midpoint 2118. A plurality of individual slits 2110 are aligned to form rows 2112 that are generally perpendicular to tension axis T. Beams 2130 are formed in the material between directly adjacent rows 2112 of slits 2110. In the exemplary embodiment of FIG. 21A, slits 2110 are not straight lines (like slits 110 of the slit pattern of FIGS. 1C and 2A) but instead include four generally axial (with respect to tension axis T) portions: a first portion 2121, a second portion 2123, a third portion 2125, and a fourth portion 2127. All four portions intersect one another in a curved or rounded manner. Specifically, first and second portions 2121, 2123 intersect to form first maxima curve 2140. Second and third portions 2123, 2125 intersect to form first minima curve 2142. Third and fourth portions 2125, 2127 intersect to form second maxima curve 2144. The region between the two lines formed by connecting all the terminal ends 2114 and 2116 of adjacent rows of slits 2112 with the addition of connected flap regions 2150*a* and 2150*b* and 2150*c* minus the not connected flap regions 2150*a* and 2150*b* and 2150*c* form a beam 2030. The flap regions 2150 are generally the area enclosed by the path of slit 2110 and the imaginary straight line between terminal ends 2114 and 2116.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the shape and slit length can vary. Alternatively, the row size or shape and beam size or shape can vary. Further, the degrees of offset or phase offset can vary from what is shown.

Figure 21B:
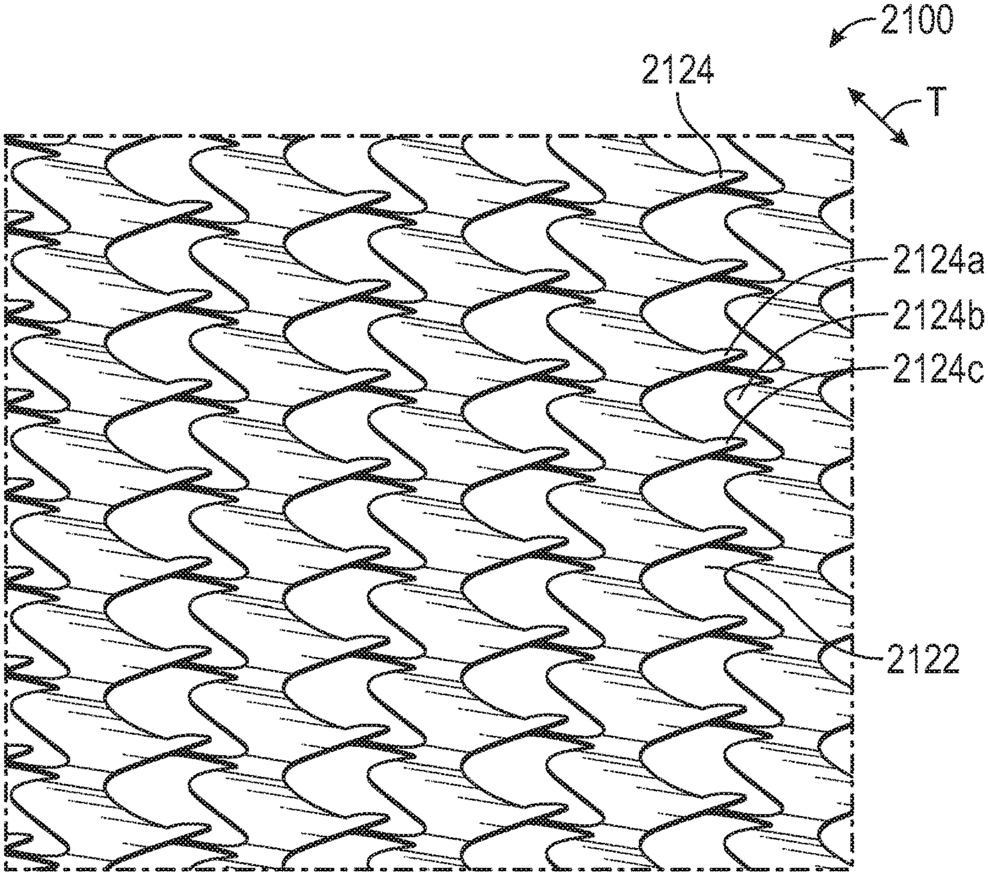
FIG. 21B is a perspective view drawing from a photograph of the pattern shown in FIG. 21A formed in a paper sheet and exposed to tension along the tension axis.
Figure 21C:
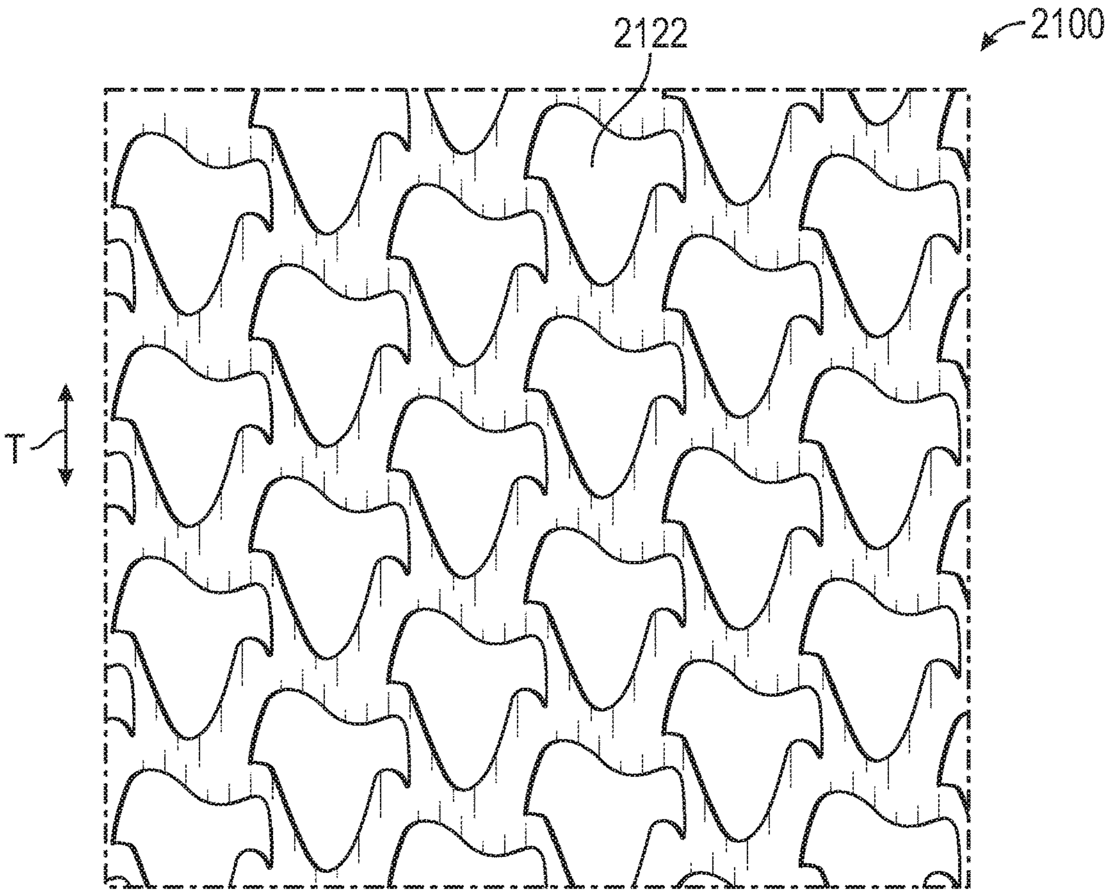
FIG. 21C is a nearly top view drawing from a photograph of the article of FIG. 21B when exposed to tension along the tension axis.
Figure 21D:
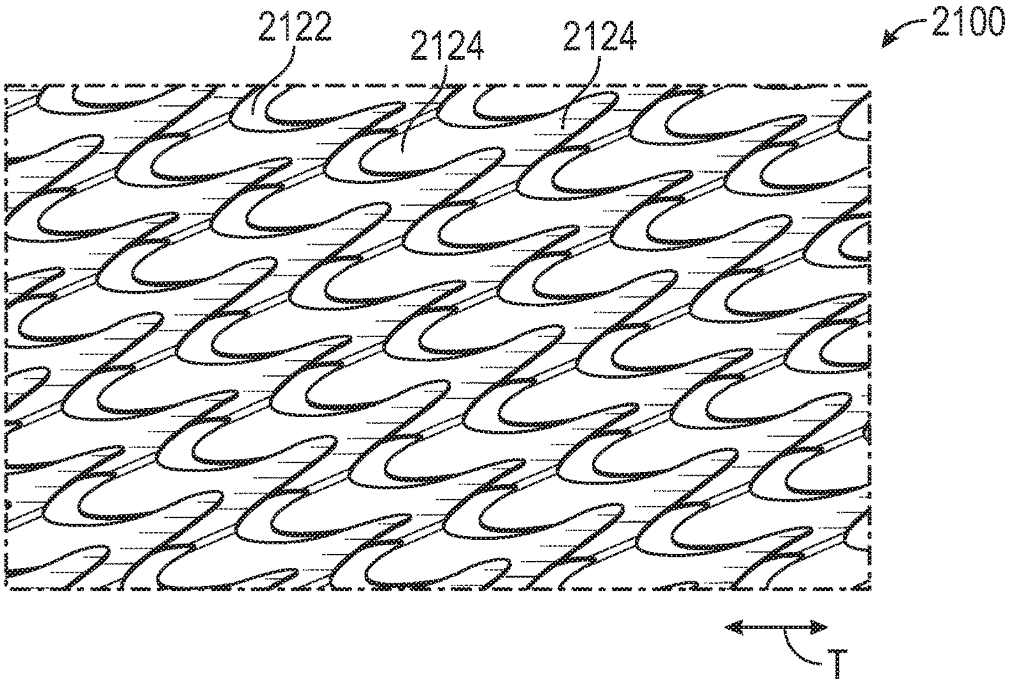
FIG. 21D is an elevated side view of the article shown in FIG. 21B.

FIGS. 21B-21D show the pattern of FIG. 21A formed in a sheet of paper and exposed to tension along the tension axis T. When material 2100 is tension activated or deployed along tension axis T, portions of material 2100 experience tension and/or compression that causes the material to move out of the original plane of material 2100 in its pretensioned format. When exposed to tension along the tension axis, terminal ends 2114, 2116 experience compression and are drawn toward one another, causing flap regions 2150 of the material 2100 to move or buckle upward or downward relative to the plane of the material 2100 in its pretensioned state (FIG. 21A), creating flaps 2124. The beam 2130, that includes the flap regions 2150*a* and 2150*b* and 2150*c*, will normally rotate substantially in a single direction pushing the flaps 2124*a* and 2124*b* downward and pushing the flaps 2124*c* upward. The motion of the flaps 2124 relative to the plane of the material 2100 in its pretensioned state (FIG. 20A) form opening portions 2122. These movements in material 2000 form a series of curved protrusions in both directions (up and down), as seen in FIG. 21D.

When the tension-activated material 2100 is wrapped around an article or placed directly adjacent to itself, the flaps 2124 interlock with one another and/or opening portions 2122, to create an interlocking structure. Interlocking can be measured as stated in the interlocking test articulated above.

In some embodiments, one or more of the slits include hook, loop, sine-wave, square-wave, triangle-wave, or other similar features that can provide enhanced interlocking features and/or capabilities. Two such exemplary embodiments are shown in FIGS. 22-23. Similar enhanced interlocking features could also be applied to any of the other patterns shown in, for example, FIGS. 3-21 or FIGS. 24-26.

Figure 22A:
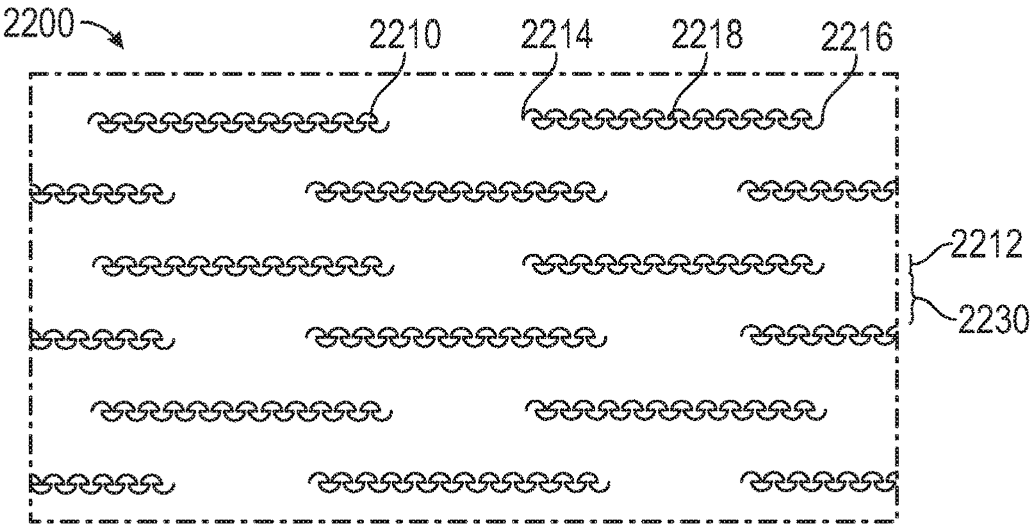
FIG. 22A is a top view schematic drawing of an exemplary single slit pattern.
Figure 22B:
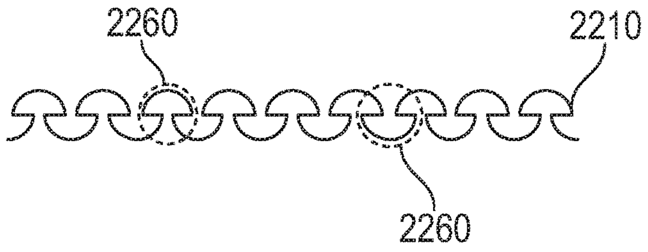
FIG. 22B shows a portion of the single slit pattern of FIG. 22A enlarged.
Figure 23:
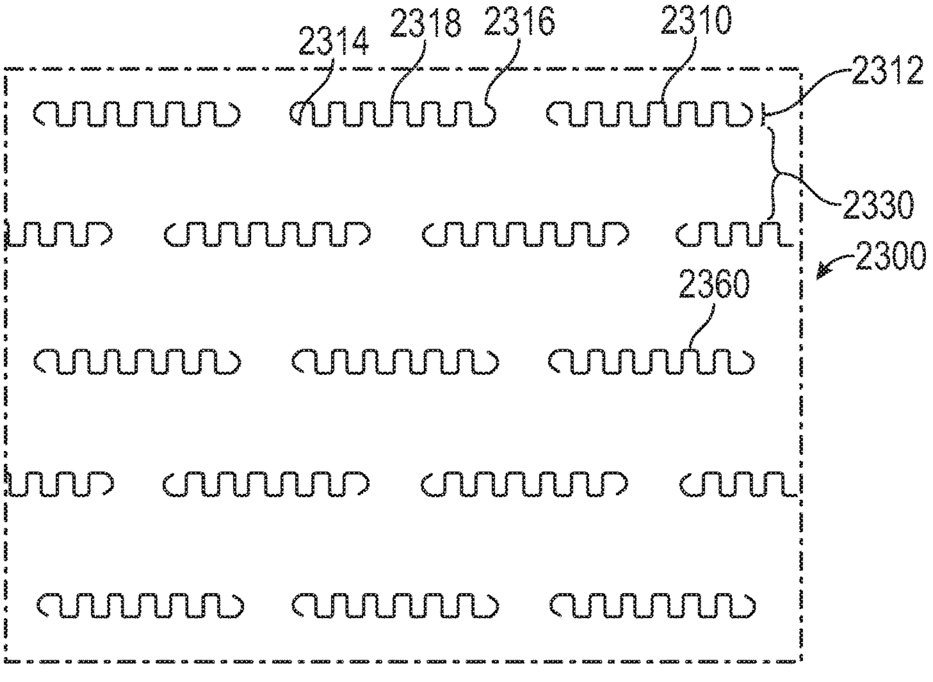
FIG. 23 is a top view schematic drawing of an exemplary single slit pattern.

Specifically, FIGS. 22A and 22B show a material 2200 including a single slit pattern in which the slits 2210 include a plurality of hook features 2260 formed by the shape and size of the slit 2210. In the specific embodiment of FIGS. 22A and 22B, the slits form anchor-shaped hooks 2260 in the upper portion of the slit 2210 and the lower portion of the slit 2210 (see FIG. 22B). These hook features—and including them in both portions of the slit—can result in excellent interlocking. These features can also be included in only one of the upper or lower portions and still provide excellent interlocking.

Each slit 2210 includes a first terminal end 2214, a second terminal end 2216, and a midpoint 2218. A plurality of individual slits 2210 are aligned to form rows 2212 that are generally perpendicular to tension axis T. Beams 2230 are formed in the material between directly adjacent rows 2212 of slits 2210. The ends of the slits are curved.

FIG. 23 shows a material 2300 including a single slit pattern in which the slits 2310 include a plurality of hook features 2360 formed by the shape and size of the slit 2310. In the specific embodiment of FIG. 23, the slits 2310 form generally rectangular-shaped hooks in the upper portion of the slit 2310 and the lower portion of the slit 2310. These square-wave hook features, which may be included in both upper and lower portions of the slit, can result in excellent interlocking. These features can also be included in only one of the upper or lower portions and still provide excellent interlocking.

Each slit 2310 includes a first terminal end 2314, a second terminal end 2316, and a midpoint 2318. A plurality of individual slits 2310 are aligned to form rows 2312 that are generally perpendicular to tension axis T. Beams 2330 are formed in the material between directly adjacent rows 2312 of slits 2310. The ends of the slits are curved.

Those of skill in the art will appreciate that many changes may be made to the pattern while still falling within the scope of the present disclosure. Those of skill in the art will appreciate that the shape and slit length can vary. Alternatively, the row size or shape and beam size or shape can vary. Further, the degrees of offset or phase offset can vary from what is shown.

In some embodiments, one or more of the slits include one or more curved terminal ends. A slit has a curved terminal end if the region of the slit forming a terminal end of the slit has a radius of curvature that is distinct from an adjacent portion of the slit, where the end region is generally less than 10% of the total length of the slit. Materials or articles that include a curved terminal end slit pattern have an increased maximum tension force as compared to a material or article with the same pattern of beams but without curved terminal edges. This increased maximum tension force results in the material or article's ability to sustain increased deployment force or tension without tearing. In some embodiments, materials or articles that include a curved terminal end slit pattern are capable of withstanding larger tension forces without tearing as compared to a material or article with the same pattern except without curved terminal ends. Two exemplary embodiments are shown in FIGS. 24 and 25.

Figure 24A:
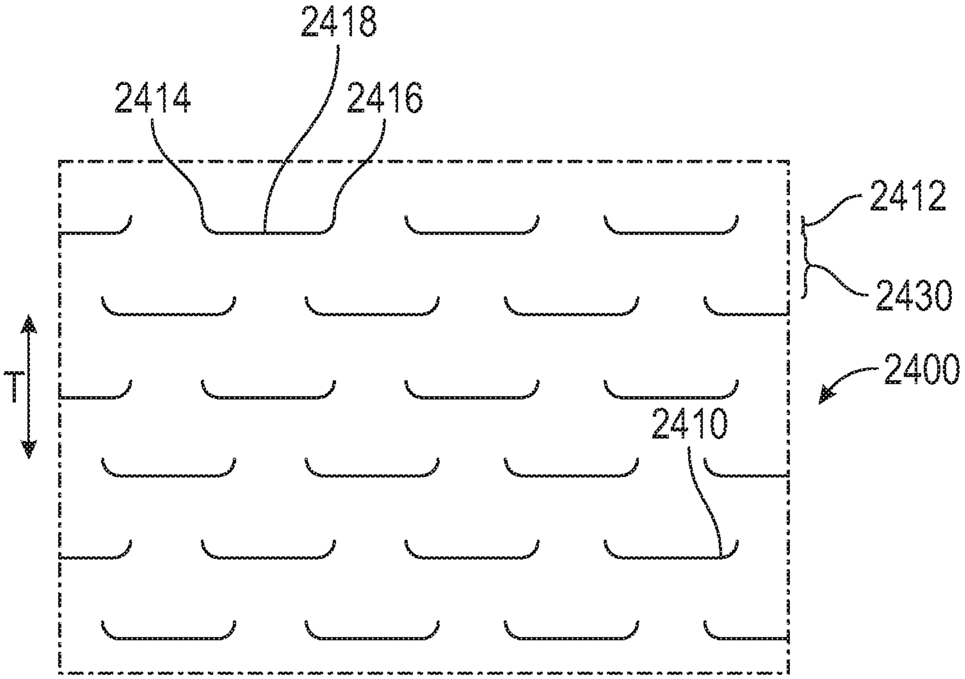
FIG. 24A is a top view schematic drawing of an exemplary single slit pattern.
Figure 24B:
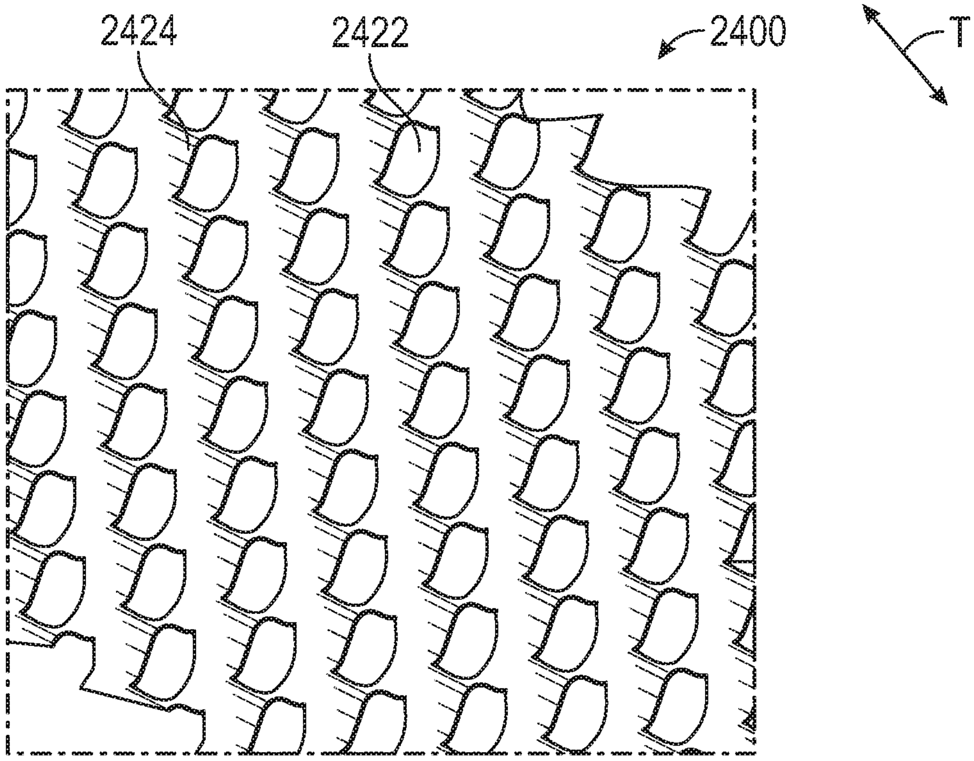
FIG. 24B is a perspective view drawing from a photograph of the pattern shown in FIG. 24A formed in a paper sheet and exposed to tension along the tension axis.
Figure 24C:
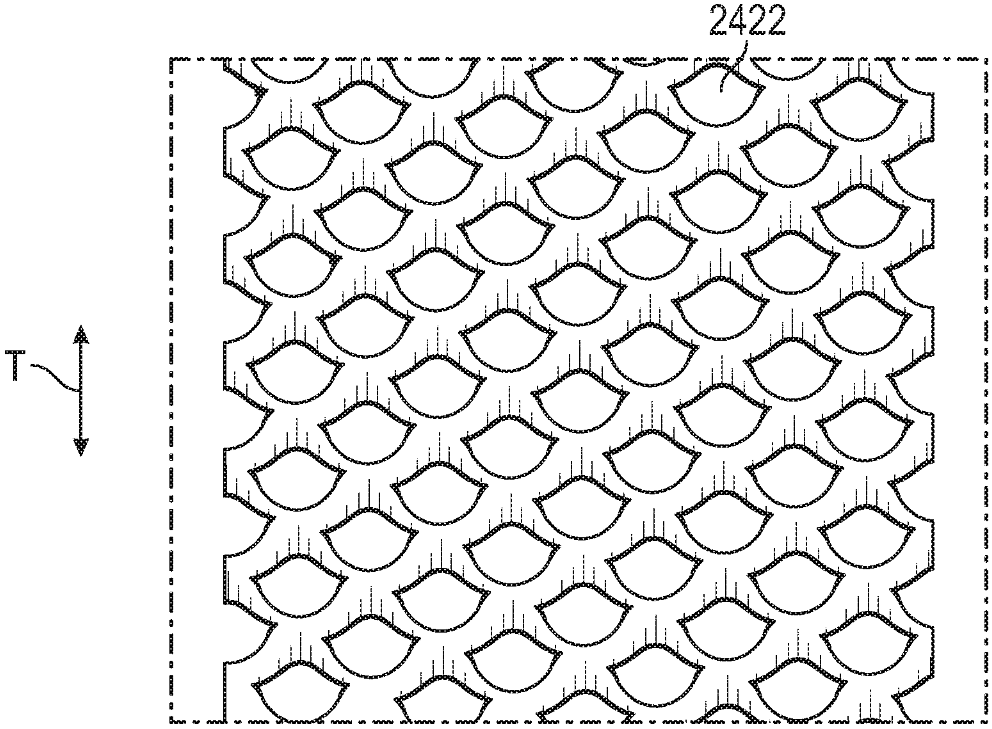
FIG. 24C is a nearly top view drawing from a photograph of the article of FIG. 24B when exposed to tension along the tension axis.
Figure 24D:
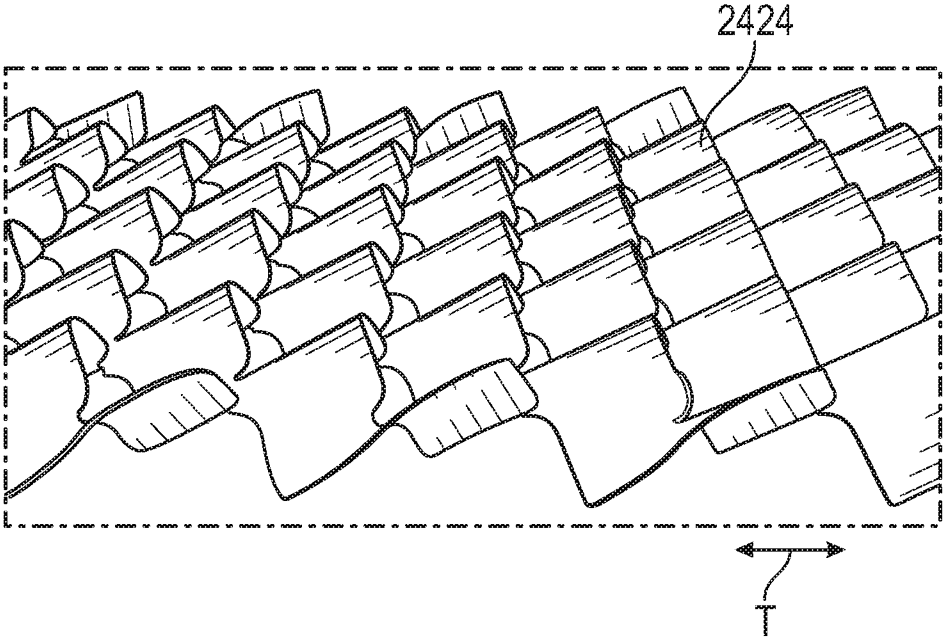
FIG. 24D is an elevated side view of the article shown in FIG. 24B.

FIG. 24A shows a material 2400 including a single slit pattern in which each slit 2410 includes a first terminal end 2414 that is curved upward, a second terminal end 2416 that is curved upward, and a midpoint 2418. A plurality of individual slits 2410 are aligned to form rows 2412 that are generally perpendicular to tension axis T. Beams 2430 are formed in the material between directly adjacent rows 2412 of slits 2410. This embodiment shows that both terminal ends can curve in the same or a similar direction. Deployment of material 2400 along tension axis T operates substantially the same as described above with respect to FIGS. 4-23 and is shown in FIGS. 24B-D.

Figure 25A:
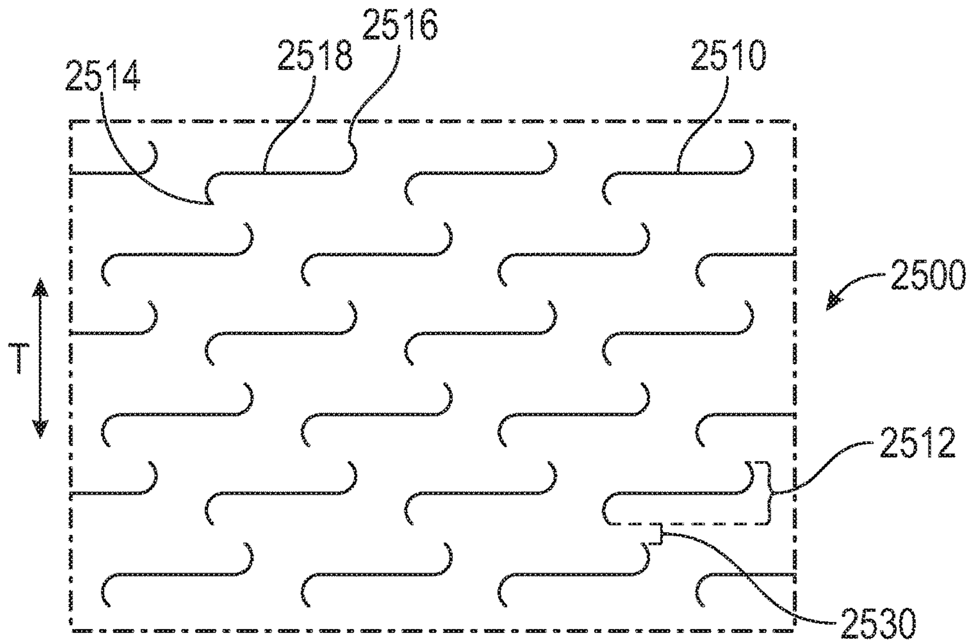
FIG. 25A is a top view schematic drawing of an exemplary single slit pattern.
Figure 25B:
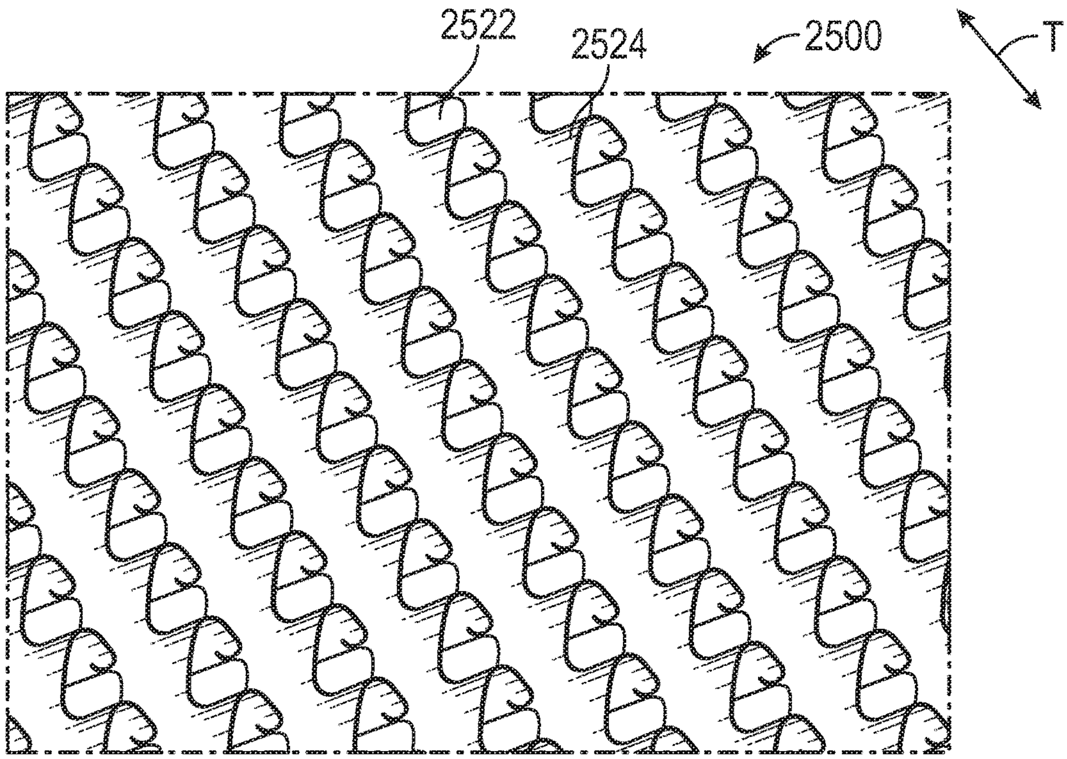
FIG. 25B is a perspective view drawing from a photograph of the pattern shown in FIG. 25A formed in a paper sheet and exposed to tension along the tension axis.
Figure 25C:
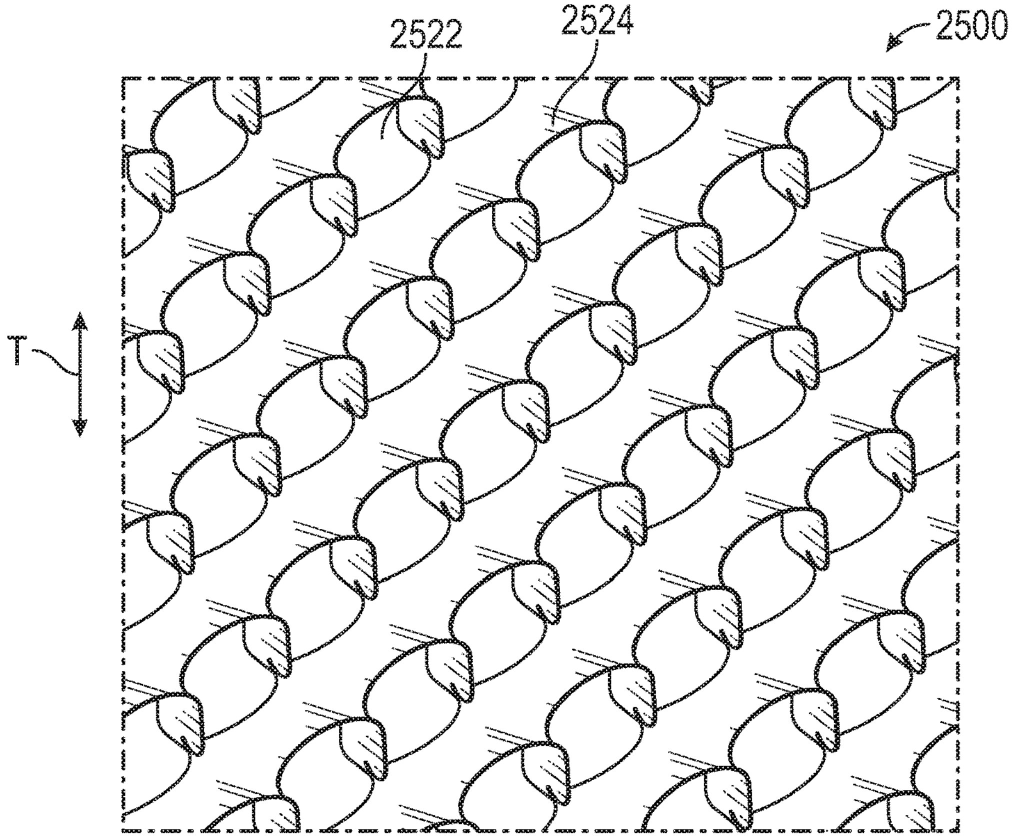
FIG. 25C is a nearly top view drawing from a photograph of the article of FIG. 25B when exposed to tension along the tension axis.
Figure 25D:
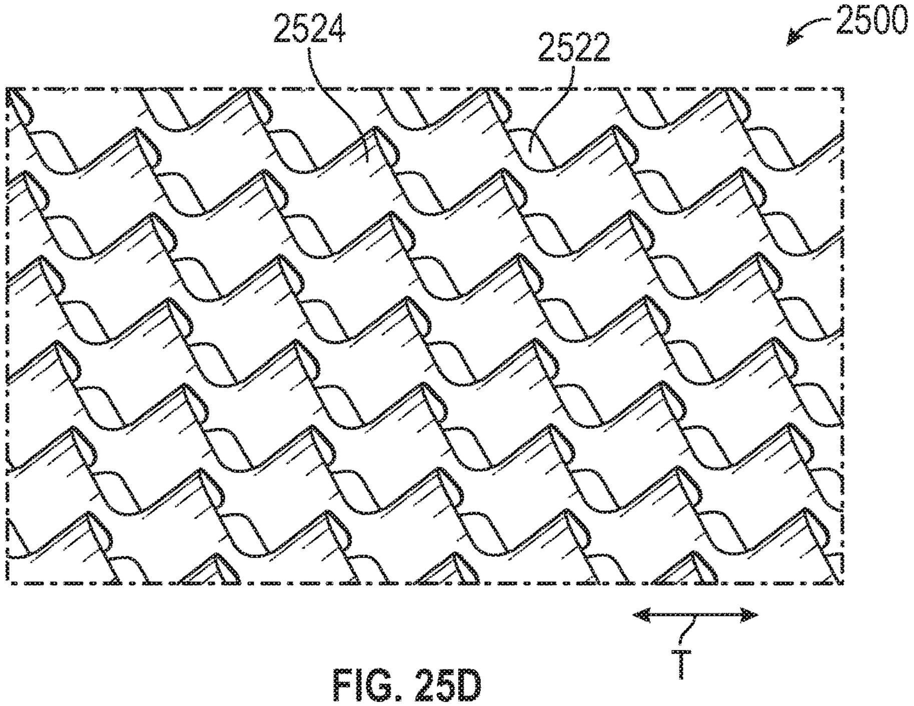
FIG. 25D is an elevated side view of the article shown in FIG. 25B.

FIG. 25A shows a material 2500 including a single slit pattern in which each slit 2510 includes a first terminal end 2514 that is curved downward, a second terminal end 2516 that is curved upward, and a midpoint 2518. A plurality of individual slits 2510 are aligned to form rows 2512 that are generally perpendicular to tension axis T. Beams 2530 are formed in the material between directly adjacent rows 2512 of slits 2510. This embodiment shows that both terminal ends can curve in differing directions. Deployment of material 2500 along tension axis T operates substantially the same as described above with respect to FIGS. 4-24 and is shown in FIGS. 25B-D.

Those of skill in the art will appreciate that many changes may be made to the pattern while still falling within the scope of the present disclosure. Those of skill in the art will appreciate that the shape and slit length can vary. Alternatively, the row size or shape and beam size or shape can vary. Further, the degrees of offset or phase offset can vary from what is shown.

Some single slit pattern embodiments include one or more multibeams formed by a multibeam slit. A multibeam slit refers to one or more simple slits (meaning the slit has no more than two terminal ends) formed between two adjacent slits in the single slit or multi-slit pattern, where the two adjacent slits are either in the same row or adjacent rows. The beam region, and more specifically the direct path between the closest terminal ends of two adjacent slits in adjacent rows such as ends 1216_a_ and 1214_a_ of FIG. 12A, experience the highest concentration of forces when tension is applied to a single slit patterned material. As such, these beam regions experience the greatest stress concentration during deployment (or tension application or activation) of the material. This high stress concentration can result in tearing of the material during deployment. Additional slits added in this region that cross through the direct path between closest terminal ends in adjacent rows can create one or more additional force-carrying paths, or additional beams, which have additional stress concentrating terminal ends that can increase the maximum force bearing capacity of the material. Materials or articles that include multibeam slit patterns have a greater maximum tension force as compared to a material or article with the same pattern of beams but without multibeams. As used herein, the term "maximum tension force" refers to the maximum tensile force that can be applied to a sample of slit-patterned material before it tears. Generally, the maximum tension force occurs just before a slit-patterned material tears. A test method for measuring the maximum tension force is described below. In some embodiments, materials or articles that include a multibeam slit pattern are capable of withstanding larger tension forces without tearing as compared to a material or article with the same pattern except without multibeams.

In some embodiments, materials or articles with multibeam slit patterns have the same or lower deployment force. As used herein, the term "deployment force" refers to the force required to substantially deploy the patterned sheet, it is defined in the test method below.

In some embodiments, it is advantageous to have the maximum tension force (the tension force required to tear the slit patterned material during deployment or tensioning along tension axis T) be greater than the deploy force (the force required to deploy the sample). The Max-Deploy Ratio is the ratio of the maximum tension force divided by the deploy force. In some embodiments, it is advantageous for that ratio to be as large as possible such that the force applied to deploy a patterned sheet is much lower than the maximum force that the sheet can sustain. This prevents users of the sheet from accidentally tearing the material when deploying it.

An exemplary embodiment of a slit pattern including multibeams is shown in FIGS. 26A-26D.

Figure 26A:
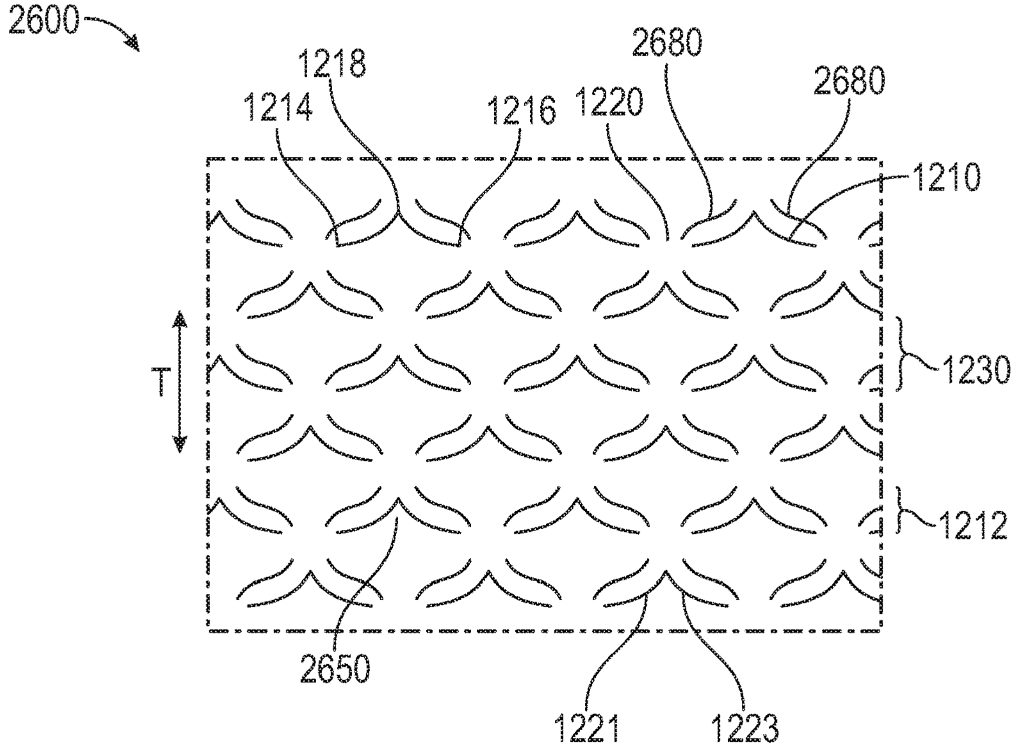
FIG. 26A is a top view schematic drawing of an exemplary single slit pattern.

FIG. 26A is substantially identical to the embodiment shown in FIG. 12A except that the embodiment of FIG. 26A includes multibeams formed by multibeam slits. As such, the description of FIG. 12A is repeated herein. Multibeam slits 2680 are formed between adjacent slits 1210. Specifically, a first multibeam slit 2680 is above and adjacent to curved first portion 1221. A second multibeam slit 2680 is above and adjacent to curved second portion 1223. Whereas first and second portions 1221, 1223 connect at midpoint 1218, first and second multibeam slits do not connect with one another.

Those of skill in the art will appreciate that many changes may be made to the pattern while still falling within the scope of the present disclosure. Those of skill in the art will appreciate that the shape and slit length can vary. The number of multibeam slits can vary. Alternatively, the row size or shape and beam size or shape can vary. Further, the degrees of offset or phase offset can vary from what is shown.

Figure 26B:
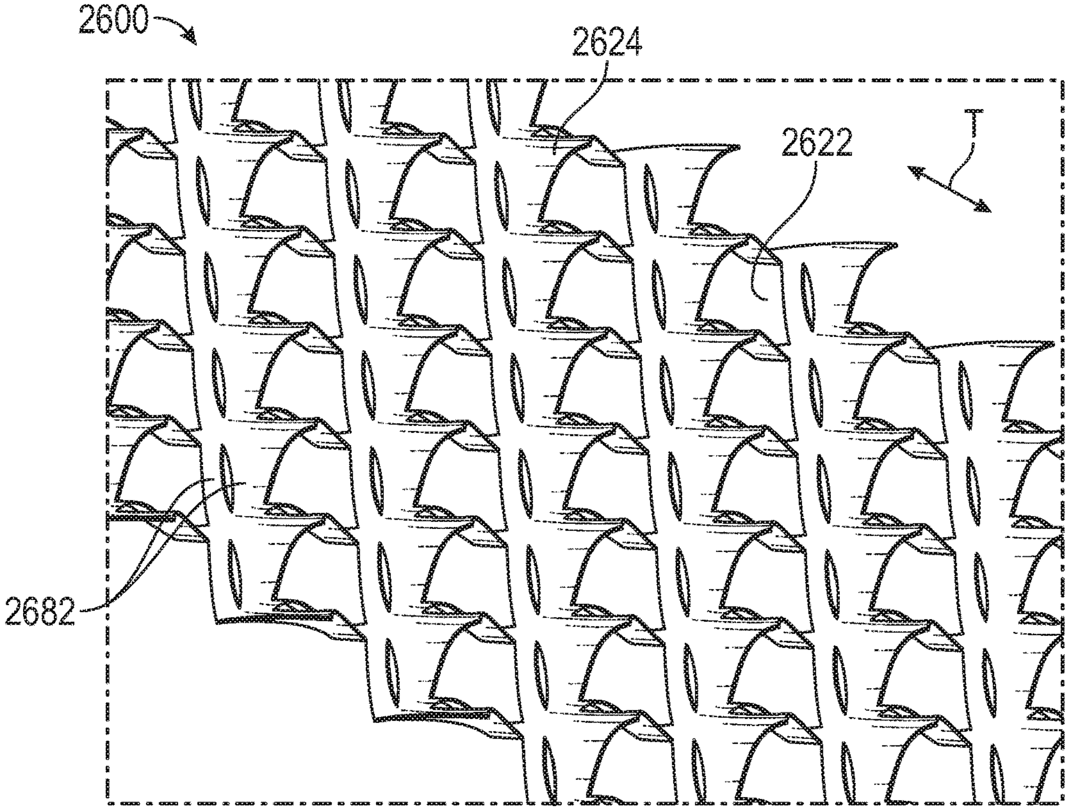
FIG. 26B is a perspective view drawing from a photograph of the pattern shown in FIG. 26A formed in a paper sheet and exposed to tension along the tension axis.
Figure 26C:
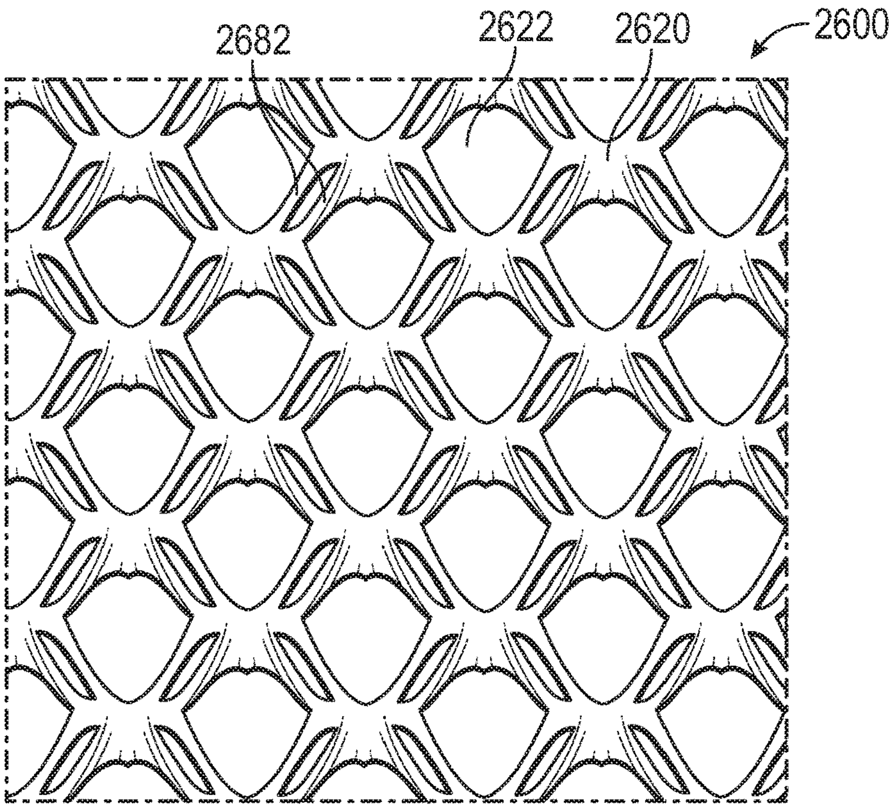
FIG. 26C is a nearly top view drawing from a photograph of the article of FIG. 26B when exposed to tension along the tension axis.
Figure 26D:
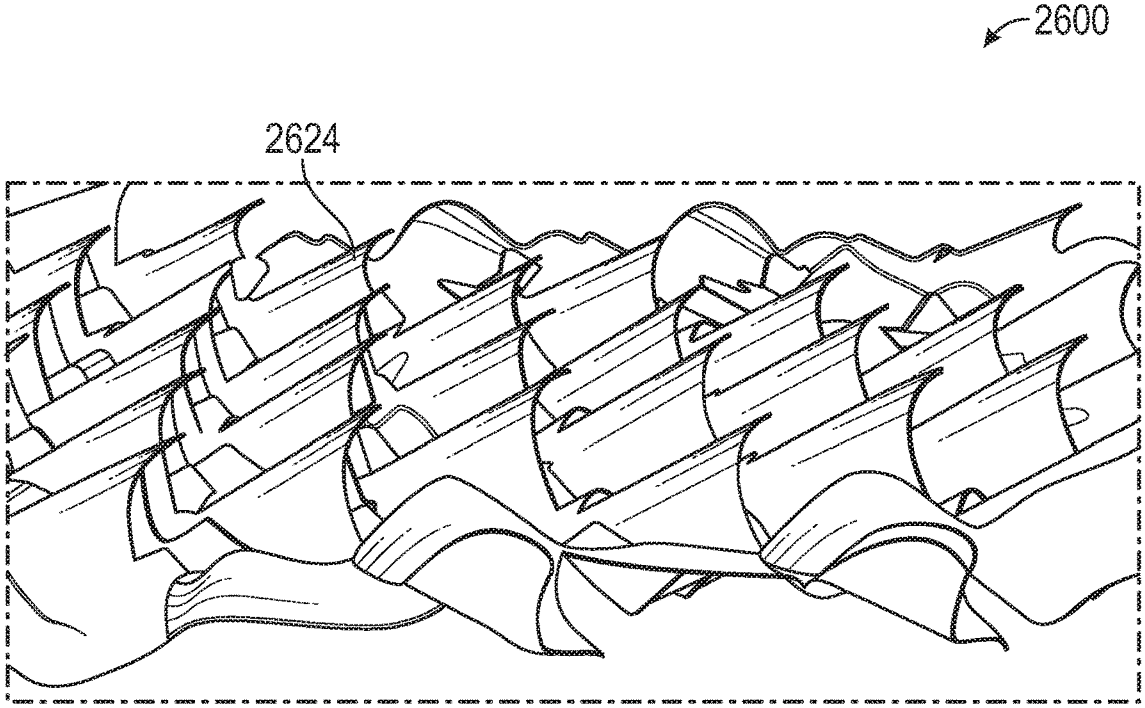
FIG. 26D is an elevated side view of the article shown in FIG. 26B.

FIGS. 26B-26D show the pattern of FIG. 26A formed in a sheet of paper and exposed to tension along the tension axis T. When material 2600 is tension activated or deployed along tension axis T, portions of material 2600 experiences tension and/or compression that causes the material to move out of the original plane of material 2600 in its pretensioned format. When exposed to tension along the tension axis, terminal ends 1214, 1216 experience compression and are drawn toward one another, causing a flap region 2650 of the material 2600 to move or buckle upward relative to the plane of the material 2600 in its pretensioned state (FIG. 26A), creating flap 2624. Portions of beams 1230 move or buckle downward relative to the plane of the material 2600 in its pretensioned state (FIG. 26A), forming an opening portion 2622. The portion of the beam 1230 containing the multibeam slit 2680 between terminal ends 1216 and 1214 forms into two parallel beam sections 2682 that have moved to align closer to the tension axis T. When tension is applied, both beam sections experience some tension in this embodiment. The material 1220 between adjacent slits 1210 in a row 1212 primarily experience tension perpendicular to tension axis T. This region or area does not move substantially out of the original plane and instead bends slightly as compared to the pretensioned form of FIG. 26A. These movements in material 2600 form a series of cusp, pointed protrusions, as seen in FIG. 26D.

In this exemplary embodiment, the slits 1210 have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

When the tension-activated material 2600 is wrapped around an article or placed directly adjacent to itself, the flaps 2624 interlock with one another and/or opening portions 2622, to create an interlocking structure. Interlocking can be measured as stated in the interlocking test articulated above.

Most of the slit patterns shown herein have regions that are described as moving or buckling either upward or downward relative to the original plane of the sheet when tension is applied. The distinction between upward and downward motion is an arbitrary description used for clarity to substantially match the accompanying figures. The samples could all be flipped over turning the downward motions into upward motions and vice versa. In addition, it is normal and expected for occasional inversions to occur where the regions of the sample will flip such that similar features which had moved upward in previous regions are now moving downward and vice versa. These inversions can occur for regions as small as a single slit, or large portions of the material. These inversions are random and natural, they are a result of natural variations in materials, manufacturing, and applied forces. Although some effort was made to represent regions of material without inversions, all samples were tested with the presence of these natural variations and performance is not significantly affected by the number or location of inversions.

All of the slit patterns shown herein are shown as being generally perpendicular to the tension axis. While in many embodiments this can provide superior performance, any of the slit patterns shown or described herein can be rotated at an angle to the tension axis. Angles less than 45 degrees from the tension axis are preferred.

Further, all of the slit patterns shown herein include single slit that are out of phase with one another by approximately one half of the transverse spacing between directly adjacent slits (or 50% of the transverse spacing). However, the patterns may be out of phase by any desired amount including for example, one third of the transverse spacing, one quarter of the transverse spacing, one sixth of the transverse spacing, one eighth of the transverse spacing, etc. In some embodiments, the phase offset is less than 1 or less than three fourths, or less than one half of the transverse spacing of directly adjacent slits in a row. In some embodiments, the phase offset is more than one fiftieth, or more than one twentieth, or more than one tenth of the transverse spacing of directly adjacent slits in a row.

Figure 27:
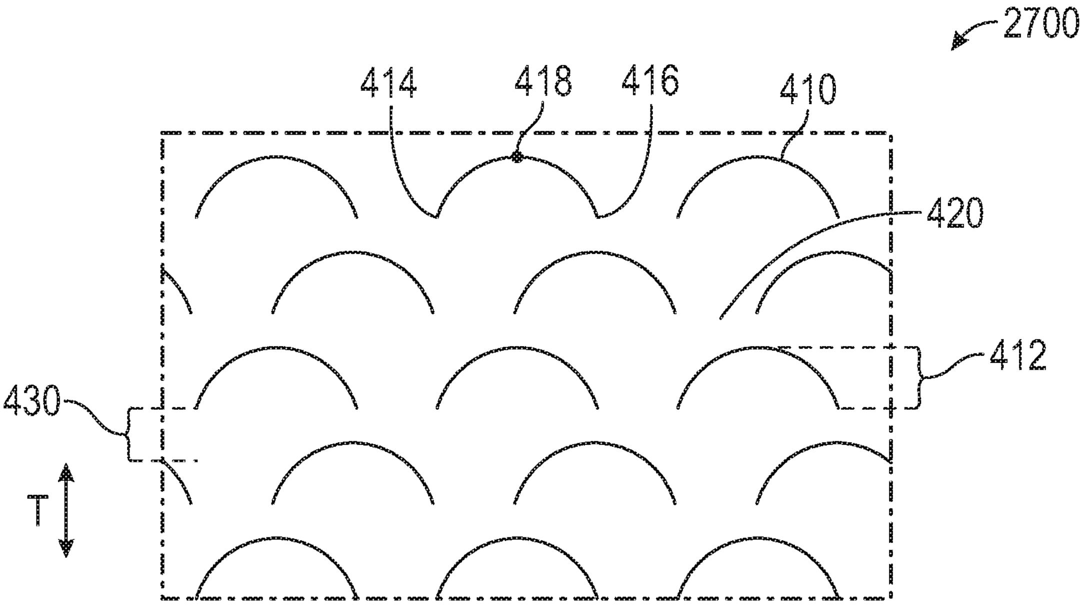
FIG. 27 is a top view schematic drawing of an exemplary single slit pattern.

FIG. 27 shows a material 2700 with an exemplary single slit pattern that is the same as that shown in FIG. 4A except that adjacent rows 412 are phase shifted by 33% instead of 50% (as is shown in FIG. 4A). When choosing the desired phase offset in a single slit pattern, it is desirable, in some embodiments, to avoid forming a continuous path of material parallel to the tension axis because such a path would transmit tension and may limit expansion of the sheet.

In some embodiments, the minimum phase offset is such that the terminal ends of slits in alternate rows intersect a line parallel to the tension axis through the terminal ends of slits in the adjacent rows. In some embodiments, the maximum phase offset is similarly limited by the creation of a continuous path of material. If the width of the slits orthogonal to the tension axis are constant for all slits and have a value w and the gap between slits orthogonal to the tension axis are constant and have a value g, then the minimum and maximum phase offsets are:

$$\text{minimum phase offset} = \frac{g}{w+g},\ \text{maximum phase offset} = \frac{w}{w+g}$$

Articles. The present disclosure also relates to one or more articles or materials including any of the slit patterns described herein. Some exemplary materials into which the slit patterns described herein can be formed include, for example, paper (including cardboard, corrugated paper, coated or uncoated paper, kraft paper, cotton bond, recycled paper); plastic; woven and non-woven materials and/or fabrics; elastic materials (including rubber such as natural rubber, synthetic rubber, nitrile rubber, silicone rubber, urethane rubbers, chloroprene rubber, Ethylene Vinyl Acetate or EVA rubber); inelastic materials (including polyethylene and polycarbonate); polyesters; acrylics; and polysulfones. The article can be, for example, a material, sheet, film, or any similar construction.

"Paper" as used herein refers to woven or non-woven sheet-shaped products or fabrics (which may be folded, and may be of various thicknesses) made from cellulose (particularly fibers of cellulose, (whether naturally or artificially derived)) or otherwise derivable from the pulp of plant sources such as wood, corn, grass, rice, and the like. Paper includes products made from both traditional and non-traditional paper making processes, as well as materials of the type described above that have other types of fibers embedded in the sheet, for example, reinforcement fibers. Paper may have coatings on the sheet or on the fibers themselves. Examples of non-traditional products that are "paper" within the context of this disclosure include the material available under the trade designation TRINGA from PAPTIC (Espoo, Finland), and sheet forms of the material available under the trade designation SULAPAC.

Examples of thermoplastic materials that can be used include one or more of polyolefins (e.g., polyethylene (high density polyethylene (HDPE), medium density polyethylene (MDPE), low density polyethylene (LDPE), linear low density polyethylene (LLDPE)), metallocene polyethylene, and the like, and combinations thereof), polypropylene (e.g., atactic and syndiotactic polypropylene)), polyamides (e.g. nylon), polyurethane, polyacetal (such as DELRIN, available from DuPont, Wilmington, DE, US), polyacrylates, and polyesters (such as polyethylene terephthalate (PET), polyethylene terephthalate glycol (PETG), and aliphatic polyesters such as polylactic acid), fluoroplastics (such as THV from 3M Company, St. Paul, MN, US), and combinations thereof. Examples of thermoset materials can include one or more of polyurethanes, silicones, epoxies, melamine, phenol-formaldehyde resin, and combinations thereof. Examples of biodegradable polymers can include one or more of polylactic acid (PLA) (which as used herein is intended to encompass both poly(lactic acid) and poly (lactide)), polyglycolic acid (PGA) (which as used herein is intended to encompass both poly(glycolic acid) and poly (glycolide)), poly(caprolactone), copolymers of lactide and glycolide, poly(ethylene succinate), polyhydroxybutyrate, copolymers of two or more of lactic acid, glycolic acid, and caprolactone, polyhydroxyalkanoate, polyester urethane, degradeable aliphatic-aromatic copolymers, poly(hydroxybutyrate), copolymers of hydroxybutyrate and hydroxyvalerate, poly(ester amide), and combinations thereof.

The material in which the single slit pattern is formed can be of any desired thickness. In some embodiments, the material has a thickness between about 0.001 inch (0.025 mm) and about 5 inches (127 mm). In some embodiments, the material has a thickness between about 0.01 inch (0.25 mm) and about 2 inches (51 mm). In some embodiments, the material has a thickness between about 0.1 inch (2.5 mm) and about 1 inch (25.4 mm). In some embodiments, the thickness is greater than 0.001 inch, or 0.01 inch, or 0.05 inch, or 0.1 inch, or 0.5 inch, or 1 inch, or 1.5 inches, or 2 inches, or 2.5 inches, or 3 inches (76.2 mm). In some embodiments, the thickness is less than 5 inches or 4 inches, or 3 inches (76.2 mm), or 2 inches, or 1 inch, or 0.5 inch, or 0.25 inch (6.35 mm), or 0.1 inch.

In some embodiments, where the material is paper, the thickness is between about 0.003 inch (0.076 mm) and about 0.010 inch (0.25 mm). In some embodiments where the material is plastic, the thickness is between about 0.005 inch (0.13 mm) and about 0.125 inch (3.2 mm).

In some embodiments, the slit or cut pattern extends through one or more of the edges of the sheet, film, or material, such as the axial edges of the material. In some embodiments, this allows the material to be of unlimited length and also to be deployed by tension, particularly when made with non-extensible materials. "Non-extensible" material is generally defined as a material that when in a cohesive, unadulterated configuration (absent slits) has an ultimate elongation value of under 25%, less than or equal to 10% or, in some embodiments, less than or equal to 5%. The amount of edge material is the area of material surrounding and not including the single slit pattern. In some embodiments, the amount of edge material, or down-web border, can be defined as the width of the rectangle whose long axis is parallel to the tension axis and is infinitely long and can be drawn on the substrate without overlapping or touching any slits. In some embodiments, the amount of edge material is less than 0.010 inch (0.25 mm) or less than 0.001 inch (0.025 mm). In some embodiments, the width of the down-web border is less than 0.010 inch (0.25 mm) or less than 0.001 inch (0.025 mm). In some embodiments, the amount of edge material is less than 5 times the thickness of the substrate. In some embodiments, the width of the down-web border is less than 5 times the thickness of the substrate.

Cross-web slabs can be defined as rectangular regions with a rectangle whose long axis is perpendicular to the tension axis and is infinitely long and whose width is some finite number and can be drawn on the substrate without overlapping or touching any slits or cuts. In some embodiments, cross-web slabs of any width may already exist within the article as an integral part of the pattern. In some embodiments, cross-web slabs of any width may be added to the ends of a finite length article to make the article easier to deploy. In some embodiments, cross-web slabs of any width may be added intermittently to a continuously patterned article.

In some embodiments, the distance between terminal ends of a single slit (also referred to as the slit length) is between about 0.25 inch (6.35 mm) long and about 3 inches (76.2 mm) long, or between about 0.5 inch and about 2 inches, or between about 1 inch and about 1.5 inches. In some embodiments, the distance between terminal ends of a single slit (also referred to as slit length) is between 50 times the substrate thickness and 1000 times the substrate thickness, or between 100 and 500 times the substrate thickness. In some embodiments, the slit length is less than 1000 times the substrate thickness, or less than 900 times, or less than 800 times, or less than 700 times, or less than 600 times, or less than 500 times, or less than 400 times, or less than 300 times, or less than 200 times, or less than 100 times the substrate thickness. In some embodiments, the slit length is greater than 50 times the substrate thickness, or greater than 100 times, or greater than 200 times, or greater than 300 times, or greater than 400 times, or greater than 500 times, or greater than 600 times, or greater than 700 times, or greater than 800 times, or greater than 900 times the substrate thickness.

Figure 28:
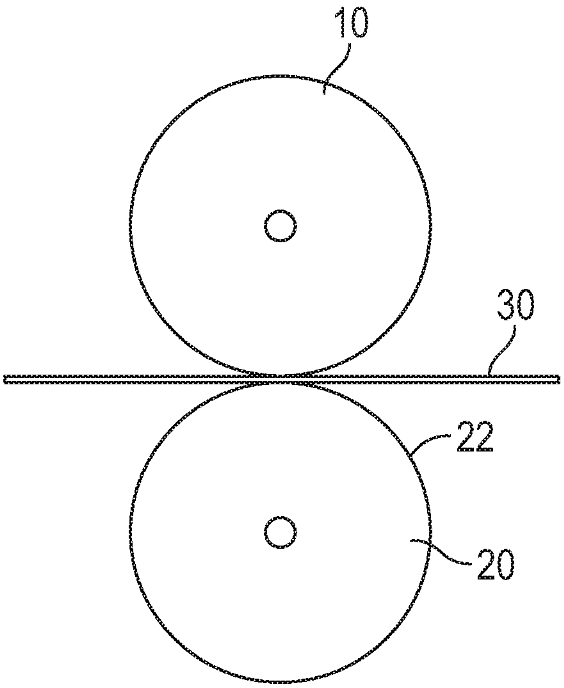
FIG. 28 is an example system for making materials consistent with the technology disclosed herein.

Method of Making. The slit patterns and articles described herein can be made in a number of different ways. For example, the slit patterns can be formed by extrusion, molding, laser cutting, water jetting, machining, stereolithography or other 3D printing techniques, laser ablation, photolithography, chemical etching, die cutting (rotary or otherwise), stamping, other suitable negative or positive processing techniques, or combinations thereof. In particular, with reference to FIG. 28, paper or another sheet material 30 can be fed into a nip consisting of a rotary die 20 and an anvil 10. In this example the material 30 is stored in a roll configuration where the material is rolled around a central axis that may include or may omit a central core. The rotary die 20 has cutting surfaces 22 on it that correspond to the slit pattern desired to be cut into the sheet material 30. The die 20 cuts through the material 30 in desired places and forms the slit pattern described herein. The same process can be used with a flat die and flat anvil.

Method of Using. The articles and materials described herein can be used in various ways. In one embodiment, the two-dimensional sheet, material, or article has tension applied along the tension axis, which causes the slits to form the openings and/or flaps and/or folding walls and/or motions described herein. In some embodiments, the tension is applied by hand or with a machine.

Uses. The present disclosure describes articles that begin as a flat sheet but deploy into a three-dimensional construction upon the application of force/tension. In some embodiments, such constructions form energy absorbing structures. The patterns, articles, and constructions described herein have a large number of potential uses, at least some of which are described herein.

One exemplary use is to protect objects for shipping or storage. As stated above, existing shipping materials have a variety of drawbacks including, for example, they occupy too much space when stored before use (e.g., bubble wrap, packing peanuts) and thus increase the cost of shipping; they require special equipment to manufacture (e.g., inflatable air bags); they are not always effective (e.g., crumpled paper); and/or they are not widely recyclable (e.g., bubble wrap, packing peanuts, inflatable air bags). The tension-activated, expanding films, sheets, and articles described herein can be used to protect items during shipping without any of the above drawbacks. When made of sustainable materials, the articles described herein are effective and sustainable. Because the articles described herein are flat when manufactured, shipped, sold, and stored and only become three-dimensional when activated with tension/force by the user, these articles are more effective and efficient at making the best use of storage space and minimizing shipping/transit/packaging costs. Retailers and users can use relatively little space to house a product that will expand to 10 or 20 or 30 or 40 or more times its original size. Further, the articles described herein are simple and highly intuitive for use. The user merely pulls the product off the roll or takes flat sheets of product, applies tension across the article along the tension axis (which can be done by hand or with a machine), and then wraps the product around an item to be shipped. In many embodiments, no tape is needed because the interlocking features enable the product to interlock with another layer of itself.

In some embodiments, the slit patterns described herein create packaging materials and/or cushioning films that provide advantages over the existing offerings. For example, in some embodiments, the packaging materials and/or cushioning films of the present disclosure provide enhanced cushioning or product protection. In some embodiments, the packaging materials and/or cushioning films of the present disclosure provide similar or enhanced cushioning or product protection when compared to the existing offerings but are recyclable and/or more sustainable or environmentally friendly than existing offerings. In some embodiments, the packaging materials and/or cushioning films of the present disclosure provide similar or enhanced cushioning or product protection when compared to the existing offerings but can be expanded and wrapped around an item to be shipped. Constructions that hold their shape once tension is applied can be preferred because they may eliminate the need for tape to hold the material in place for many applications.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described embodiments (or one or more aspects thereof) may be used in combination with each other. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention can be determined with reference to the appended claims, along with the full scope of equivalents to which such claims are entitled.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present application should, therefore, be determined only by the following claims and equivalents thereof.

What is claimed is:

1. An expanding material having a pretensioned state defining a pretensioned plane, comprising:

a material including a plurality of slits that form a single slit pattern, wherein the material defines a tension axis;

wherein the material is substantially in a plane in the pretensioned state but wherein the single slit pattern enables at least portions of the material to rotate at least 90 degrees relative to the pretensioned plane when tension is applied along a tension axis of the material to form a three-dimensional structure, wherein each of the plurality of single slits comprises a first terminal end and a second terminal end, wherein the single slit pattern includes a plurality of folding walls formed by the path of each of the plurality of slits and an imaginary straight line connects the first and second terminal ends of each of the slits in the plurality of the slits in a row, and wherein the imaginary straight lines in a row of slits are all colinear with one another but not with a region of each of the slits between the terminal ends.

2. The expanding material of claim 1, wherein an imaginary straight line connects the first and second terminal ends of each of the slits in the plurality of the slits in a row, wherein at least a portion of the slit passes through the imaginary straight line connecting the first and second terminal ends, wherein the material has an ultimate elongation value of under 25% when in a configuration absent slits, and wherein the expanding material is a cushioning article.

3. The expanding material of claim 1, wherein each of the slits in the plurality of slits includes three or more extrema, and wherein the material has an ultimate elongation value of under 25% when in a configuration absent slits.

4. The expanding material of claim 1, wherein each of the slits are arranged in rows, wherein the rows are generally perpendicular to the tension axis.

5. The expanding material of claim 1, wherein each slit has a transverse length and each of the slits in the plurality of slits are arranged in a plurality of rows of slits and each row of slits is offset from an adjacent row of slits by 75% or less of the transverse length of each slit in the row.

6. The expanding material of claim 1, wherein the slits are arranged in rows of slits and each of the slits have a slit shape and slit orientation and wherein the slit shape, slit orientation, or both the slit shape and the slit orientation varies within a row of slits.

7. The expanding material of claim 1, wherein the slits are arranged in rows and each of the slits have a slit shape and slit orientation and wherein the slit shape, slit orientation, or both slit shape and slit orientation varies in adjacent rows.

8. The expanding material of claim 1, wherein the material has a thickness of about 0.001 inch (0.025 mm) to about 5 inches (127 mm).

9. The expanding material of claim 1, wherein the single slit pattern extends through one or more of the edges of the material.

10. The expanding material of claim 1, wherein each slit in the plurality of slits has a slit length that is about 0.25 inch (6.35 mm) to about 3 inches (76.2 mm).

11. The expanding material of claim 1, wherein each slit in the plurality of slits has a slit length and the material has a material thickness, and wherein the ratio of slit length to material thickness is about 50 to about 1000.

12. A die capable of forming the single slit pattern of claim 1.

13. A packaging material formed of the expanding material of claim 1.

14. The packaging material of claim 13, wherein the expanding material is in a roll configuration.

15. The packaging material of claim 13, wherein the expanding material is one or more individual sheets.

16. The packaging material of claim 15, further comprising an envelope having the expanding material disposed in the envelope.

17. The expanding material of claim 1, wherein two adjacent rows of terminal ends are aligned.

18. A method of making the expanding material of claim 1, comprising:

forming the single slit pattern in the material by at least one of extrusion, molding, laser cutting, water jetting, machining, stereolithography, laser ablation, photolithography, chemical etching, rotary die cutting, stamping, or combinations thereof.

19. A method of using the expanding material of claim 1, comprising:

applying tension to the expanding material along a tension axis to cause the material to expand, wherein the application of tension causes one or both of (1) the slits to form openings and (2) the material adjacent to the slits to form flaps.

20. The method of claim 19, wherein, when exposed to tension along the tension axis, (1) the terminal ends of the slits in the expanding material are drawn toward one another, causing a flap of the expanding material to move or buckle upward relative to the plane of the material in its pretensioned state, (2) portions of beams of the expanding material move or buckle downward relative to the plane of the material in its pretensioned state forming an opening portion, or both (1) and (2).

* * * * *